(12) United States Patent
Hong

(10) Patent No.: US 12,148,985 B2
(45) Date of Patent: Nov. 19, 2024

(54) ANTENNA MODULE HAVING PLURALITY OF PRINTED CIRCUIT BOARDS LAMINATED THEREIN, AND ELECTRONIC DEVICE COMPRISING SAME

(71) Applicant: Samsung Electronics Co., Ltd., Suwon-si (KR)

(72) Inventor: Eunseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/531,104

(22) Filed: Nov. 19, 2021

(65) Prior Publication Data

US 2022/0077576 A1 Mar. 10, 2022

Related U.S. Application Data

(63) Continuation of application No. 17/330,854, filed on May 26, 2021, now Pat. No. 11,183,753, which is a
(Continued)

(30) Foreign Application Priority Data

Jan. 24, 2019 (KR) .......................... 10-2019-0009284

(51) Int. Cl.
*H01Q 1/38* (2006.01)
*H01Q 1/22* (2006.01)
(Continued)

(52) U.S. Cl.
CPC ............. *H01Q 1/38* (2013.01); *H01Q 1/2283* (2013.01); *H01Q 1/243* (2013.01); *H01Q 7/00* (2013.01);
(Continued)

(58) Field of Classification Search
CPC .. H01Q 1/38; H01Q 1/24; H01Q 7/00; H01Q 1/2283; H01Q 1/243; H01Q 9/0414;
(Continued)

(56) References Cited

U.S. PATENT DOCUMENTS 8,279,131 B2   10/2012 Puzella et al.
8,773,866 B2 *  7/2014 Jin .......................... H01L 23/48
                                                      361/783
(Continued)

FOREIGN PATENT DOCUMENTS

CN    104867912 A    8/2015
CN    107785655 A    3/2018
(Continued)

OTHER PUBLICATIONS

International Search Report dated May 14, 2020, issued in International Application No. PCT/KR2020/001233.
(Continued)

*Primary Examiner* — Dameon E Levi
*Assistant Examiner* — Leah Rosenberg
(74) *Attorney, Agent, or Firm* — Jefferson IP Law, LLP

(57) ABSTRACT

According to an embodiment of the present invention, an electronic device may comprise: a first printed circuit board which includes a first surface facing a first direction and a second surface facing a second direction opposite to the first direction; a second printed circuit board which includes a third surface facing the first direction and a fourth surface facing the second direction and includes at least one first antenna; a first wireless communication circuit which is electrically connected to at least one connection terminal formed on the first printed circuit board and transmits and receives a signal of a first frequency band through the at least one first antenna; and a conductive bonding member which is disposed between the first surface and the fourth surface
(Continued)

and electrically connects the at least one first antenna and the first wireless communication circuit. Various other embodiments may be included.

17 Claims, 25 Drawing Sheets

Related U.S. Application Data continuation of application No. PCT/KR2020/001233, filed on Jan. 23, 2020.

(51) Int. Cl.
- *H01Q 1/24* (2006.01)
- *H01Q 7/00* (2006.01)
- *H01Q 9/04* (2006.01)
- *H01Q 21/06* (2006.01)
- *H01Q 21/28* (2006.01)

(52) U.S. Cl.
CPC ......... *H01Q 9/0414* (2013.01); *H01Q 21/065* (2013.01); *H01Q 21/28* (2013.01)

(58) Field of Classification Search
CPC .. H01Q 21/065; H01Q 21/28; H01L 23/5385; H01L 23/66; H01L 2223/6677; H04M 1/0277
See application file for complete search history.

(56) References Cited

U.S. PATENT DOCUMENTS

| | | | |
|---|---|---|---|
| 8,854,277 B2* | 10/2014 | De Graauw | H01L 23/66 343/904 |
| 9,196,958 B2 | 11/2015 | Arnold et al. | |
| 9,773,613 B2 | 9/2017 | Lee et al. | |
| 9,773,742 B2 | 9/2017 | Kamgaing et al. | |
| 9,831,564 B1 | 11/2017 | Xie | |
| 9,917,368 B2* | 3/2018 | Garcia | G06K 19/07749 |
| 9,972,892 B2 | 5/2018 | Noori et al. | |
| 10,461,420 B2* | 10/2019 | Chen | H01Q 21/0087 |
| 10,673,142 B2 | 6/2020 | Ueda | |
| 11,336,006 B2* | 5/2022 | Niakan | H01Q 1/523 |
| 2005/0168961 A1* | 8/2005 | Ono | H01L 25/0652 257/E25.011 |
| 2010/0033393 A1 | 2/2010 | Myszne et al. | |
| 2013/0078915 A1 | 3/2013 | Zhao et al. | |
| 2015/0325925 A1 | 11/2015 | Kamgaing et al. | |
| 2016/0007480 A1* | 1/2016 | Yosui | H05K 3/4632 29/841 |
| 2017/0229784 A1* | 8/2017 | Kitamura | H01Q 9/0414 |
| 2018/0062263 A1* | 3/2018 | Ueda | H01Q 21/06 |
| 2018/0084637 A1 | 3/2018 | Ueda | |
| 2018/0332151 A1 | 11/2018 | Kamgaing et al. | |
| 2019/0288382 A1* | 9/2019 | Kamgaing | H01Q 21/22 |
| 2019/0305402 A1* | 10/2019 | Dalmia | H01L 23/58 |
| 2020/0052416 A1* | 2/2020 | Yong | H01Q 21/08 |
| 2020/0098709 A1* | 3/2020 | Lin | H01L 23/3128 |
| 2020/0161766 A1 | 5/2020 | Liu et al. | |
| 2020/0196440 A1 | 6/2020 | Tseng et al. | |
| 2021/0013587 A1 | 1/2021 | Li et al. | |
| 2021/0036414 A1* | 2/2021 | Takayama | H01Q 1/40 |
| 2021/0075124 A1 | 3/2021 | Baek et al. | |
| 2021/0242568 A1* | 8/2021 | Zhang | H01Q 21/26 |
| 2021/0307218 A1* | 9/2021 | Paynter | H01L 25/105 |
| 2022/0415802 A1* | 12/2022 | Kim | H01L 24/48 |
| 2023/0187833 A1* | 6/2023 | Baek | H05K 3/368 343/702 |

FOREIGN PATENT DOCUMENTS

| | | |
|---|---|---|
| CN | 108632408 A | 10/2018 |
| CN | 108879114 A | 11/2018 |
| JP | 2008-283676 A | 11/2008 |
| JP | 6336107 B2 | 6/2018 |
| KR | 10-2004-0041132 A | 5/2004 |
| KR | 10-2006-0078635 A | 7/2006 |
| KR | 10-1444905 B1 | 9/2014 |
| KR | 10-1581225 B1 | 12/2015 |
| KR | 10-2114138 B1 | 5/2020 |
| KR | 10-2209123 B1 | 1/2021 |
| WO | 2018/210054 A1 | 11/2018 |

OTHER PUBLICATIONS

European Search Report dated Jan. 4, 2022, issued in European Application No. 20744461.3.
Indian Office Action dated Mar. 9, 2022, issued in Indian Application No. 202117031352.
Korean Office Action dated Feb. 15, 2023, issued in Korean Patent Application No. 10-2019-0009284.
Chinese Office Action with English translation dated Nov. 30, 2023; Chinese Patent Application No. 202080010766.1.
Korean Office Action with English translation dated Jan. 29, 2024; Korean Patent Application No. 10-2019-0009284.
Chinese Office Action with English translation dated Apr. 30, 2024; Chinese Appln. No. 2020800107661.

* cited by examiner

| Frequency [MHz] / Antenna gain [dB] | 25 | 25.5 | 26 | 26.5 | 27 | 27.5 | 28 | 28.5 | 29 | 29.5 | 30 | 30.5 | 31 | 31.5 | 32 |
|---|---|---|---|---|---|---|---|---|---|---|---|---|---|---|---|
| Antenna module (800) implemented by one PCB | -40.91 | 5.10 | 5.48 | 5.74 | 5.86 | 5.85 | 5.70 | 5.38 | 4.68 | 2.84 | -2.57 | -9.20 | -4.63 | -31.79 | -1.60 |
| Antenna module (700) implemented by two PCBs | 0.77 | 1.36 | 1.99 | 2.67 | 3.39 | 4.14 | 4.89 | 5.55 | 6.02 | 6.13 | 5.71 | 4.71 | 3.08 | 0.63 | -3.47 |

FIG.9A

ANTENNA MODULE HAVING PLURALITY OF PRINTED CIRCUIT BOARDS LAMINATED THEREIN, AND ELECTRONIC DEVICE COMPRISING SAME

CROSS-REFERENCE TO RELATED APPLICATION(S)

This application is a continuation application of prior application Ser. No. 17/330,854, filed on May 26, 2021, which has issued as U.S. Pat. No. 11,183,753 on Nov. 23, 2021, which is a continuation application, claiming priority under § 365(c), of an International application No. PCT/KR2020/001233, filed on Jan. 23, 2020, which is based on and claims the benefit of a Korean patent application number 10-2019-0009284, filed on Jan. 24, 2019, in the Korean Intellectual Property Office, the disclosure of which is incorporated by reference herein in its entirety.

TECHNICAL FIELD

Various embodiments of the disclosure relate an antenna module having a plurality of printed circuit boards laminated therein, and an electronic device including the same.

BACKGROUND ART

With the development of digital technology, electronic devices are provided in various forms such as smartphones, tablet personal computers (PCs), personal digital assistants (PDAs), or the like. Electronic devices are developing in a wearable form in order to enhance portability and accessibility of users. As wireless communication technology is developing, electronic devices (for example, electronic devices for communication) are increasingly used in daily life, and accordingly, use of contents is exponentially increasing. An electronic device may include a printed circuit board (PCB) including an antenna. For example, in the PCB, one surface of a dielectric plate may be formed as a ground plane, and the other surface of the dielectric plate may be formed as an antenna.

DISCLOSURE OF INVENTION

Technical Problem

A PCB including an antenna may include a plurality of conductive layers (or a plurality of conductive pattern layers) laminated therein. An insulating material may be disposed between the plurality of conductive layers. At least one portion of one conductive layer may be utilized as an antenna, and at least one portion of another conductive layer may be utilized as a ground plane. The PCB may have a structure in which the same number of conductive layers are disposed on both sides with reference to a center base. For example, the PCB having the same number of conductive layers laminated on both sides with reference to the center base may be formed by a manufacturing method which repeats an operation of laminating two conductive layers making a pair on both sides, respectively. This manufacturing method may prevent a damage to the PCB, such as warpage or tearing, caused by an environment such as temperature or pressure, during a manufacturing process. The plurality of conductive layers may have substantially the same gap therebetween, and the PCB may have substantially the same height (or thickness) on both sides with reference to the center base. Radiation characteristics of the antenna (or antenna performance) may be determined based on a distance between the antenna and the ground plane. In view of the above-described manufacturing method to prevent a damage in manufacturing, it may be difficult to make a different gap between the conductive layer including the antenna and the conductive layer including the ground plane, in comparison with overall thickness of the PCB.

Various embodiments of the disclosure may provide an antenna module having a plurality of PCBs laminated therein, which is capable of enhancing the degree of design freedom regarding antenna radiation characteristics, and an electronic device including the same.

Solution to Problem

According to an embodiment of the disclosure, an electronic device may include: a first PCB which includes a first surface facing in a first direction, and a second surface facing in a second direction which is opposite to the first direction; a second PCB which includes a third surface facing in the first direction and a fourth surface facing in the second direction, the second PCB including at least one antenna; a first wireless communication circuit which is electrically connected with at least one connection terminal formed on the first PCB, and is configured to transmit and/or receive a signal of a first frequency band through the at least one first antenna; and a conductive bonding member which is disposed between the first surface and the fourth surface, and is configured to electrically connect the at least one first antenna and the first wireless communication circuit.

According to an embodiment of the disclosure, an antenna module may include a communication circuit, a first PCB which is formed of a plurality of a first designated plurality of layers, has the communication circuit mounted on a designated layer of the first designated plurality of layers, and has at least one first connection terminal electrically connected with the communication circuit, and a second PCB which is formed of a second designated plurality of layers different from the first designated plurality of layer, and has at least one antenna element formed on least one layer from among the second designated plurality of layers, and at least one second connection terminal electrically connected with the at least one antenna element, and the second PCB may be opposite the first PCB, and the at least one second connection terminal may be electrically connected with the at least one first connection terminal through a conductive bonding member.

Advantageous Effects of Invention

According to various embodiments of the disclosure, a second PCB including at least one antenna, and a first PCB which has a communication circuit (for example, a radio frequency integrated circuit (RFIC)) mounted thereon and includes a wire to connect the communication circuit and the at least one antenna are separately manufactured and are laminated one on the other and are connected. Therefore, the number of conductive layers can be reduced in comparison with those when one PCB is implemented, and also, the degree of design freedom regarding antenna radiation characteristics can be enhanced.

Other effects that can be achieved or predicted based on various embodiments of the disclosure are directly or implicitly disclosed in the detailed descriptions of embodiments of the disclosure. For example, various effects that can

BRIEF DESCRIPTION OF THE DRAWINGS

FIG. 9A is a view illustrating a table showing comparison of the antenna module of FIG. 7 according to an embodiment and the antenna module of FIG. 8 in antenna performance.

BEST MODE FOR CARRYING OUT THE INVENTION

Hereinafter, various embodiments will be described in detail with reference to the accompanying drawings.

Figure 1:
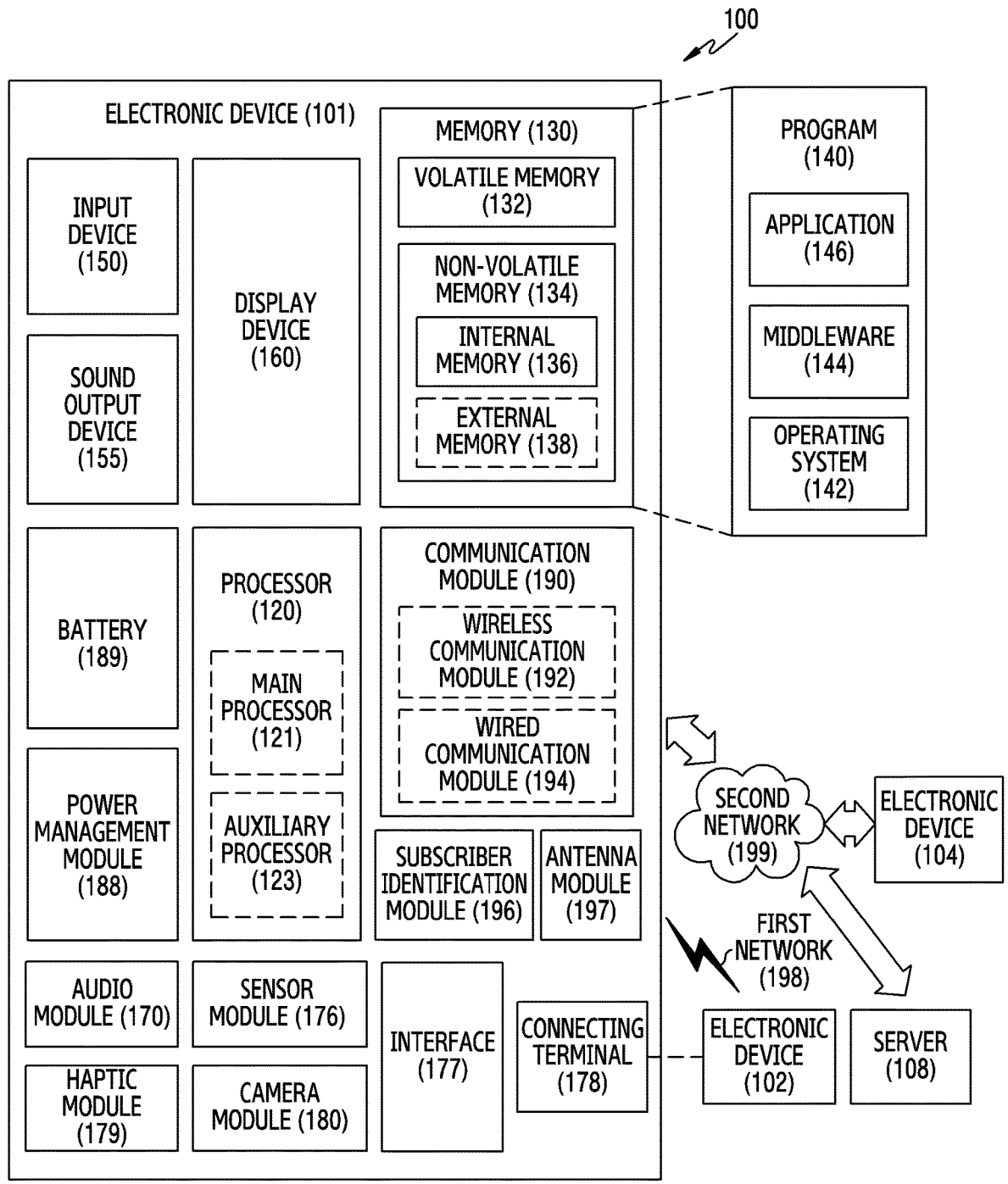
FIG. 1 is a block diagram of an electronic device in a network environment according to an embodiment.

FIG. 1 is a block diagram of an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments disclosed herein may include various types of devices. The electronic device may include, for example, a portable communication device (e.g., a smartphone), a computer device, a portable multimedia device, a portable medical device, a camera, a wearable device, or a home appliance. The electronic device according to the embodiments disclosed herein is not limited to the foregoing devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
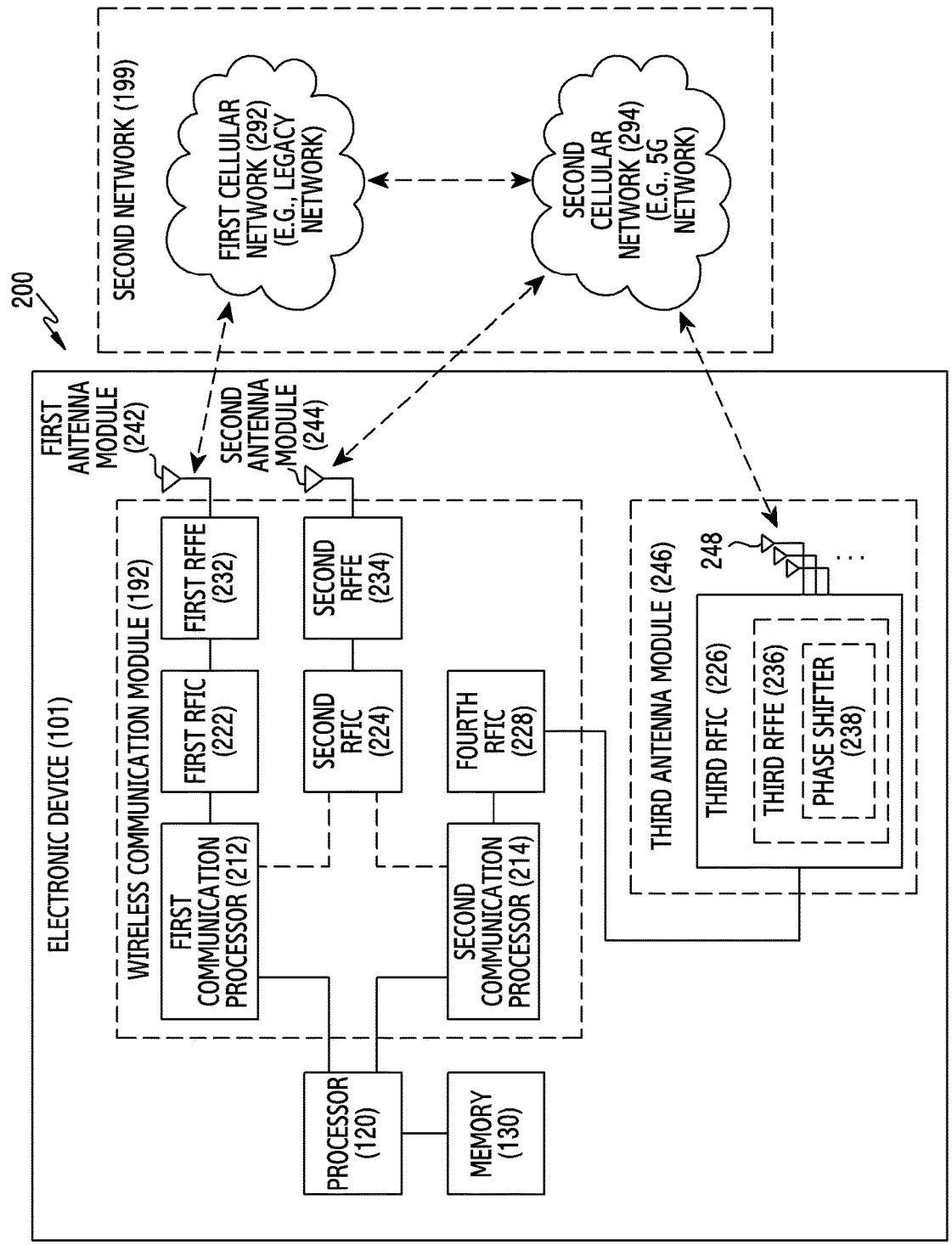
FIG. 2 is a block diagram of an electronic device in a network environment including a plurality of cellular networks according to various embodiments.

FIG. 2 is a block diagram of an electronic device in a network environment including a plurality of cellular networks according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz~ about 60 GHz) of a band to be used for wireless communication with the second cellular network 294 and 5G network communication through the established communication channel According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~ about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~ about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3:
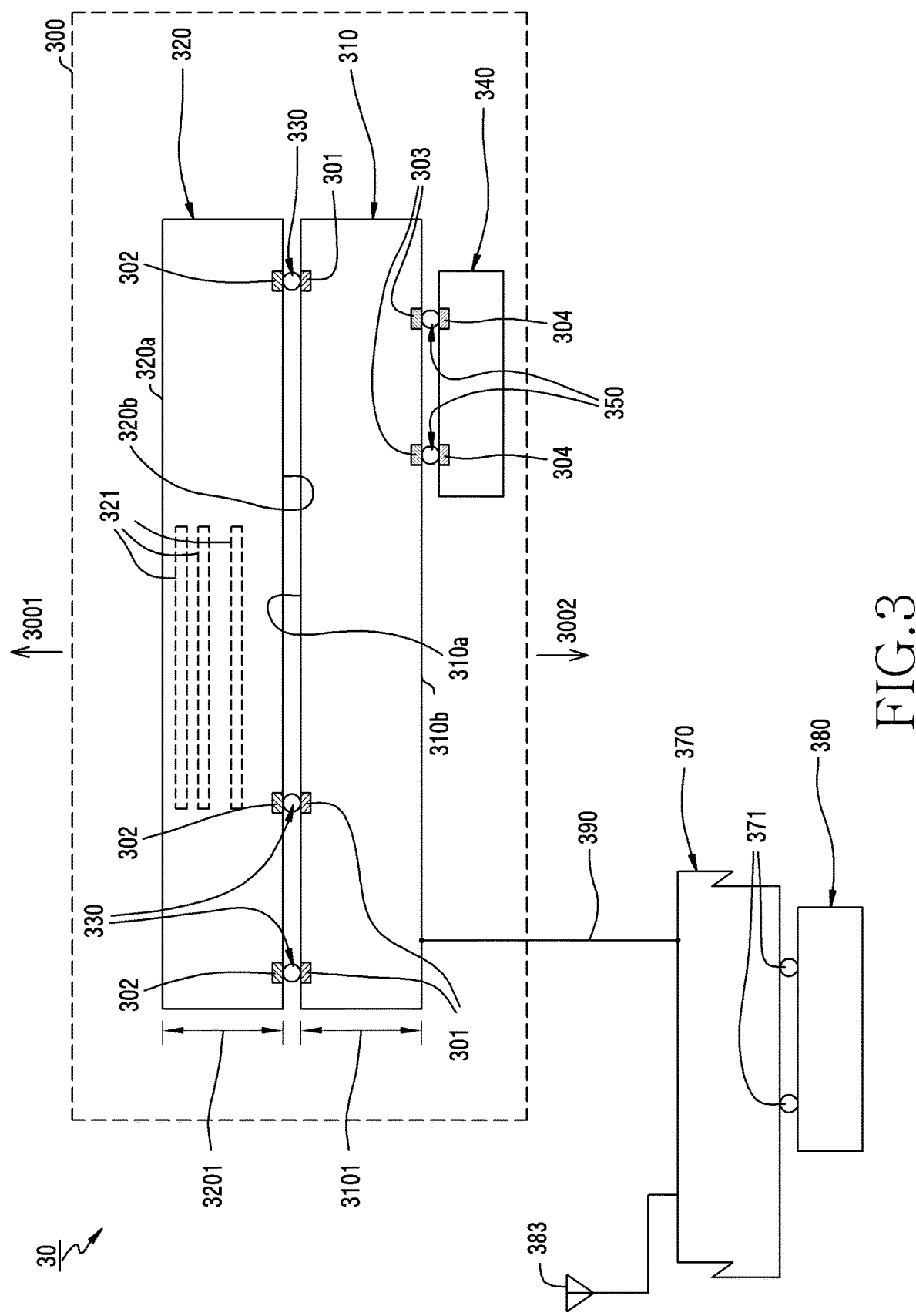
FIG. 3 is a block diagram of an electronic device including an antenna module according to an embodiment.

FIG. 3 is a block diagram of an electronic device including an antenna module according to an embodiment.

Referring to FIG. 3, in an embodiment, the electronic device 30 (for example, the electronic device 101 of FIG. 1 or 2) may include an antenna module 300 (for example, the antenna module 197 of FIG. 1 or the second antenna module 244 or the third antenna module 246 of FIG. 2).

According to an embodiment, the antenna module 300 may include at least one of a first PCB 310, a second PCB 320, a conductive bonding member 330, or a first wireless communication circuit 340.

According to an embodiment, the first PCB 310 may include a first surface 310*a* facing in a first direction 3001, and a second surface 310*b* facing in a second direction 3002 which is opposite to the first direction 3001. The first PCB 310 may have a first designated plurality of layers disposed between the first surface 310*a* and the second surface 310*b*. The first wireless communication circuit 340 may be disposed on a designated layer from among the first designated plurality of layers. According to an embodiment, the first PCB 310 may include at least one third connection terminal 303 disposed on the second surface 310*b*. The first wireless communication circuit 340 may include at least one fourth connection terminal 304, and the at least one fourth connection terminal 304 may be electrically connected with the at least one third connection terminal 303 through a conductive bonding member 350 such as solder.

According to various embodiments (not shown), the first wireless communication circuit 340 may be disposed on various other positions of the first PCB 310. For example, the first wireless communication circuit 340 may be electrically connected with at least one fifth connection terminal (not shown) formed on the first surface 310*a* of the first PCB 310 through a conductive bonding member such as a solder. In this case, the first PCB 310 may be implemented to include an area that is extended not to overlap the second PCB 320 when viewed above a third surface 320*a*, and the at least one fifth connection terminal which is formed on the area to be electrically connected with the first wireless communication circuit 340. The at least one fifth terminal may be electrically connected with the second PCB 320 through the conductive bonding member 330.

According to a certain embodiment (not shown), the first wireless communication circuit 340 may be disposed on the first surface 310*a* between the first PCB 310 and the second PCB 320. For example, when viewed above the second PCB 320, the second PCB 320 may overlap the first wireless communication circuit 340 at least in part. According to various embodiments, the second PCB 320 may include a recess (not shown) formed on a fourth surface 320*b* thereof, which is opposite the first surface 310*a* of the first PCB 310, and the first wireless communication circuit 340 disposed on the first surface 310*a* may be inserted into the recess. According to various embodiments, the second PCB 320 may include a penetrating hole (or opening) (not shown), and the first wireless communication circuit 340 disposed on the first surface 310*a* may be inserted into the penetrating hole. In addition, various arrangement structures for the first wireless communication circuit 340 may be implemented.

According to an embodiment, the second PCB 320 may include the third surface 320*a* facing in the first direction 3001, and the fourth surface 320*b* facing in the second direction 3002. The second PCB 320 may have a second designated plurality of layers disposed between the third surface 320*a* and the fourth surface 320*b*. According to an embodiment, the second PCB 320 may include at least one antenna element 321 formed on at least one layer from among the second designated plurality of layers. For example, the at least one antenna element 321 may include at least a portion of a plurality of conductive layers (for example, a plurality of conductive pattern layers or a plurality of circuit layers) included in the second PCB 320. According to various embodiments, the positions or number of the at least one antenna element 321 are not limited to the example of FIG. 3 and may vary.

According to an embodiment, the second PCB 320 may be coupled with the first PCB 310 to face the first surface 310*a* of the first PCB 310. According to an embodiment, the first PCB 310 may include at least one first terminal 301 disposed on the first surface 310*a*, and the second PCB 320 may include at least one second terminal 302 disposed on the fourth surface 320*b*. According to an embodiment, the at least one first terminal 301 may be electrically connected with the at least one second terminal 302 through the conductive bonding member 330 such as solder.

The first PCB 310 or the second PCB 320 may be formed by using a copper clad laminate (CCL) (or a disc), for example. The first PCB 310 or the second PCB 320 may include, for example, a plurality of conductive layers and an insulating material disposed between the plurality of conductive layers.

According to an embodiment, the first PCB 310 or the second PCB 320 may include the same number of conductive layers on both sides with reference to an insulating center base.

According to various embodiments, the first PCB 310 and the second PCB 320 may be manufactured based on the same CCL. According to various embodiments, the first PCB 310 and the second PCB 320 may be manufactured based on different CCLs.

According to various embodiments, the first PCB 310 may include a different number of conductive layers from those of the second PCB 320. According to a certain embodiment, the first PCB 310 may include the same number of conductive layers as those of the second PCB 320.

According to various embodiments, a gap between the plurality of conductive layers included in the first PCB 310 may be different from a gap between the plurality of conductive layers included in the second PCB 320. According to a certain embodiment, the gap between the plurality of conductive layers included in the first PCB 310 may be substantially the same as the gap between the plurality of conductive layers included in the second PCB 320.

According to various embodiments, an insulating material disposed between the conductive layers included in the first PCB 310 may be different from an insulating material disposed between the plurality of conductive layers included in the second PCB 320. According to various embodiments, the insulating material disposed between the conductive layers included in the first PCB 310 may be the same as the insulating material disposed between the plurality of conductive layers included in the second PCB 320.

According to various embodiments, a thickness of the conductive layer included in the first PCB 310 may be substantially the same as a thickness of the conductive layer included in the second PCB 320. According to a certain embodiment, the thickness of the conductive layer included in the first PCB 310 may be different from the thickness of the conductive layer included in the second PCB 320.

According to various embodiments, a thickness 3101 of the first PCB 310 may be different from a thickness 3201 of the second PCB 320. According to a certain embodiment, the thickness 3101 of the first PCB 310 may be substantially the same as the thickness 3201 of the second PCB 320.

According to an embodiment, the first wireless communication circuit 340 may be electrically connected with the at least one antenna element 321. The first wireless communication circuit 340 may transmit and/or receive signals of various frequency bands through the at least one antenna element 321.

According to various embodiments, the electronic device 30 may further include a third PCB 370 which is electrically connected with the antenna module 300. According to an embodiment, the third PCB 370 may be electrically connected with the second PCB 320 through various conductive members 390 such as a flexible printed circuit board (FPCB) or a coaxial cable.

According to an embodiment, the electronic device 30 may include a second wireless communication circuit 380 (for example, the wireless communication module 192 of FIG. 1) disposed on the third PCB 370 through a conductive bonding member 371 such as solder. The second wireless communication circuit 380 may include a first wireless communication module (not shown) or a second wireless communication module (not shown). For example, the first wireless communication module may support wireless communication related to a first network (for example, the first cellular network 292 of FIG. 2) by utilizing at least one antenna 383 (for example, the first antenna module 242 of FIG. 2). For example, the second wireless communication module may support wireless communication related to a second network (for example, the second cellular network 294 of FIG. 2) by utilizing the antenna module 300 (for example, the second antenna module 244 or the third antenna module 246 of FIG. 2). The second wireless communication circuit 380 may exchange a signal of a corresponding frequency band with the first wireless communication circuit 340 of the antenna module 300.

Figure 4:
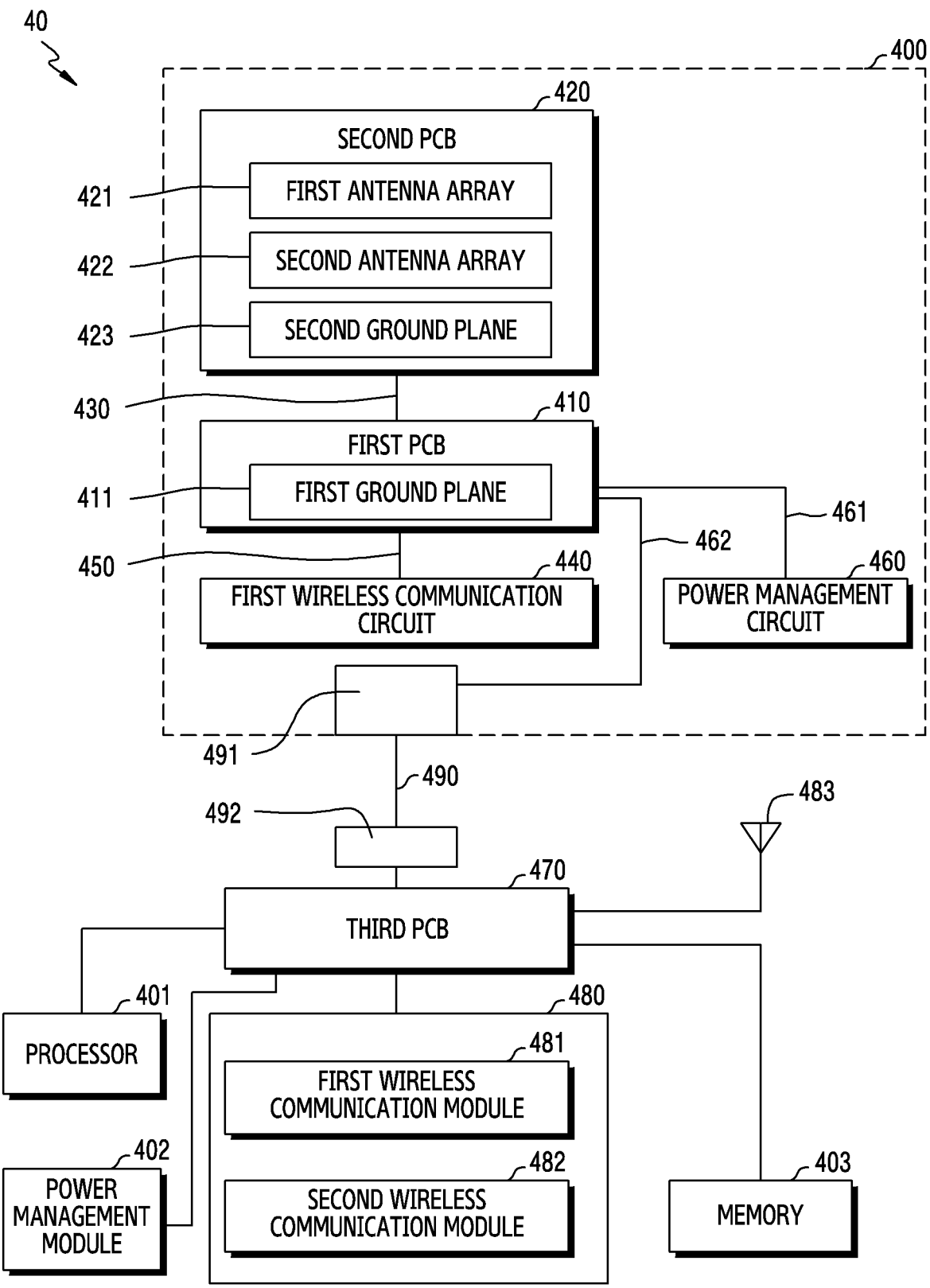
FIG. 4 is a block diagram of an electronic device including an antenna module according to an embodiment.

FIG. 4 is a block diagram of an electronic device including an antenna module according to an embodiment.

Referring to FIG. 4, in an embodiment, the electronic device 40 (for example, the electronic device 101 of FIG. 1 or 2, or the electronic device 30 of FIG. 3) may include at least one of at least one antenna module 400 (for example, the antenna module 197 of FIG. 1, the second antenna module 244 or the third antenna module 246 of FIG. 2, or the antenna module 300 of FIG. 3), a third PCB 470, a processor 401 (for example, the processor 120 of FIG. 1 or 2), a second wireless communication circuit 480 (for example, the wireless communication module 192 of FIG. 1 or 2 or the second wireless communication circuit 380 of FIG. 3), a power management module 402 (for example, the power management module 188 of FIG. 1), at least one antenna 483 (for example, the antenna module 197 of FIG. 1, the first antenna module 242 of FIG. 2, or the at least one antenna 383 of FIG. 3), or a memory 403 (for example, the memory 130 of FIG. 1 or 2).

According to an embodiment, the antenna module 400 may include at least one of a first PCB 410 (for example, the first PCB 310 of FIG. 3), a second PCB 420 (for example, the second PCB 320 of FIG. 3), a first wireless communication circuit 440 (for example, the first wireless communication circuit 340 of FIG. 3), a power management circuit 460 or a first connector 491.

According to an embodiment, the second PCB 420 may include one or more antennas 421, 422 (for example, the at least one antenna element 321 of FIG. 3). For example, the one or more antennas 421, 422 may include at least a portion of a plurality of conductive layers (for example, a plurality of conductive pattern layers or a plurality of circuit layers) included in the second PCB 420.

According to an embodiment, the one or more antennas 421, 422 may include at least one of a first antenna array 421 or a second antenna array 422. The first antenna array 421 or the second antenna array 422 may include a structure in which a plurality of antenna elements having substantially the same shape are arranged, or a structure in which a plurality of antenna elements are arranged at predetermined intervals.

According to an embodiment, the plurality of antenna elements included in the first antenna array 421 or the second antenna array 422 may include, for example, patch antennas, loop antennas, or dipole antennas.

According to an embodiment, a portion of the plurality of antenna elements included in the first antenna array 421 and/or the second antenna array 422 may be electrically connected with the first wireless communication circuit 440 through the first PCB 410. A portion of the plurality of antenna elements included in the first antenna array 421 and/or the second antenna array 422 may be utilized as a dummy element (for example, a dummy antenna). The dummy element may be physically separated from other conductive elements to be in an electrically floating state. The dummy element may be electromagnetically coupled with an antenna element electrically connected with the first wireless communication circuit 440 to adjust radiation characteristics. For example, the dummy element may shift a resonant frequency to a designated frequency, or may shift the resonant frequency as much as designated. For example, the dummy element may enhance antenna performance by reducing an electromagnetic noise.

According to various embodiments, the dummy element may provide a uniform thermal expansion coefficient when the second PCB 420 is manufactured, so that warpage of the PCB, which may be caused by heat of high temperature, can be prevented.

According to an embodiment, the second PCB 420 may be disposed to overlap the first PCB 410 at least in part. A conductive bonding member 430 (for example, the conductive bonding member 330 of FIG. 3) such as solder may be disposed between the first PCB 410 and the second PCB 420, and may electrically and/or mechanically connect the first PCB 410 and the second PCB 420.

According to an embodiment, at least a portion of a plurality of conductive layers (for example, a plurality of conductive pattern layers or a plurality of circuit layers) included in the first PCB 410 or the second PCB 420 may include a ground plane (not shown). The ground plane may block or reduce an electromagnetic noise on a flow of a signal or power in the first PCB 410 or the second PCB 420.

According to an embodiment, the second PCB 420 may include at least one second ground plane 423 which is related to radiation characteristics of the one or more antennas 421, 422. The second PCB 420 may include a plurality of conductive layers, and an insulating material (for example, a prepreg) disposed between the plurality of conductive layers. The plurality of antenna elements of the first antenna array 421 and/or the second antenna array 422 may include at least a portion of the plurality of conductive layers. The second ground plane 423 may include at least a portion of the plurality of conductive layers. According to an embodiment, the plurality of antenna elements may be disposed on different layers. According to an embodiment, at least one antenna element and the second ground plane 423 may be disposed on different layers. The second PCB 420 may have a structure in which the same number of conductive layers are disposed on both sides with reference to a center base. The center base may include an insulating material such as a prepreg. According to a certain embodiment, the center base may be referred to as a core. For example, the second PCB 420 in which the same number of conductive layers are laminated on both side with reference to the center base may be formed by a manufacturing method which repeats an operation of laminating two conductive layers making a pair on both sides, respectively. Radiation characteristics of the antenna module 400 may be changed according to an electric parameter such as a resistance, inductance, capacitance, which is provided to a transmission line between the one or more antennas 421, 422 and the first wireless communication circuit 440. For example, the radiation characteristics of the antenna module 400 may be determined based on shapes (for example, width, length, thickness) of the plurality of antenna elements included in the first antenna array 421 or the second antenna array 422. For example, the radiation characteristics of the antenna module 300 may be determined based on distances of the plurality of antenna elements included in the first antenna array 421 or the second antenna array 422 from the second ground plane 423. For example, the radiation characteristics of the antenna module 400 may be determined based on a shape (for example, width, length, thickness) of the second ground plane 423. For example, the radiation characteristics of the antenna module 400 may be determined based on an insulating material (for example, permittivity) between the plurality of antenna elements included in the first antenna array 421 or the second antenna array 422, and the second ground plane 423.

According to an embodiment, the first PCB 410 may include at least one first ground plane 411 related to the radiation characteristics of the antenna module 400. According to an embodiment, the first PCB 410 may include a plurality of conductive layers and an insulating material (for example, a prepreg) which is disposed between the plurality of conductive layers. The first ground plane 411 may include at least a portion of the plurality of conductive layers. The first PCB 410 may have a structure in which the same number of conductive layers are disposed on both sides with reference to a center base. For example, the first PCB 410 in which the same number of conductive layers are laminated on both sides with reference to the center base may be formed by a manufacturing method which repeats an operation of laminating two conductive layers making a pair on both sides, respectively. The radiation characteristics of the antenna module 400 may be determined based on distances of the plurality of antenna elements included in the first antenna array 421 or the second antenna array 422 from the first ground plane 411. For example, the radiation characteristics of the antenna module 400 may be determined based on a shape (for example, width, length, thickness) of the first ground plane 411. For example, the radiation characteristics of the antenna module 400 may be determined based on an insulating material (for example, a permittivity) between the plurality of antenna elements included in the first antenna array 421 or the second antenna array 422, and the first ground plane 411.

According to various embodiments, the first ground plane 411 of the first PCB 410 and the second ground plane 423 of the second PCB 420 may be electrically connected with each other.

According to various embodiments, as a ground plane related to the radiation characteristics of the antenna module 400, one of the first ground plane 411 of the first PCB 410 and the second ground plane 423 of the second PCB 420 may be omitted.

According to an embodiment, the first wireless communication circuit 440 may be disposed on or coupled to the first PCB 410, and may be electrically connected with the first PCB 410. The first PCB 410 may include, for example, a first surface (for example, the first surface 310a of FIG. 3) which faces in a first direction and is opposite the second PCB 420, and a second surface (for example, the second surface 310b of FIG. 3) which faces in a second direction which is opposite to the first direction. The second PCB 420 may include, for example, a fourth surface (for example, the fourth surface 320b of FIG. 3) which faces in the second direction and is opposite the first surface of the first PCB 410, and a third surface (for example, the third surface 320a of FIG. 3) which faces in the first direction. The conductive bonding member 430 (for example, the conductive bonding member 330 of FIG. 3) such as solder may be disposed between the first surface of the first PCB 410 and the fourth surface of the second PCB 420. According to an embodiment, the first wireless communication circuit 440 may be disposed on or coupled to the second surface of the first PCB 410 though a conductive bonding member 450 (for example, the conductive bonding member 350 of FIG. 3) such as solder, and may be electrically connected with the first PCB 410. The first wireless communication circuit 440 may be electrically connected with the first antenna array 421 and the second antenna array 422 of the second PCB 420 through the first PCB 410. For example, the first wireless communication circuit 440 may include a circuit element (for example, an RFIC) which is mountable on the first PCB 410 by using a conductive bonding member such as solder.

According to an embodiment, the first wireless communication circuit 440 may transmit and/or receive a second signal of at least a portion of frequency bands from about 6 GHz to about 100 GHz (for example, a frequency band between about 24 GHz and about 100 GHz, a frequency band between about 24 GHz and about 30 GHz, or a frequency band between about 37 GHz and about 40 GHz) through the first antenna array 421 and/or the second antenna array 422 of the second PCB 420. According to an embodiment, the first wireless communication circuit 440 may up-convert or down-convert a frequency of a signal transmitted or received through wireless communication. For example, the first wireless communication circuit 440 may receive an IF signal from a second wireless communication module 482 disposed on the third PCB 470, and may up-convert the received IF signal into a radio frequency (RF) signal. For example, the first wireless communication circuit 440 may down-convert an RF signal (for example, a millimeter wave) received through the first antenna array 421 or the second antenna array 422 into an IF signal, and the IF signal may be provided to the second wireless communication module 482 disposed on the third PCB 470.

According to an embodiment, at least a portion of the plurality of conductive layers included in the first PCB 410 may include a transmission line (for example, an RF line) between the one or more antennas 421, 422 and the first wireless communication circuit 440. The transmission line is a structure for transmitting a frequency signal (for example, voltage, current) and may be referred to as a conductor system which uses an operation of transmitting waves caused by an electric parameter (for example, resistance per unit length, inductance, conductance, or capacitance). For example, at least a portion of the plurality of conductive layers included in the first PCB 410 may include a conductive path (or a wire) to supply power to the one or more antennas 421, 422 between the one or more antennas 421, 422 and the first wireless communication circuit 440.

According to an embodiment, the first connector 491 may be disposed on or coupled to the second surface (for example, the second surface 310b of FIG. 3) of the first PCB 410 through a conductive bonding member 462 such as solder, and may be electrically connected with the first PCB 410. At least a portion of the plurality of conductive layers included in the first PCB 410 may include a conductive path to electrically connect the first connector 491 and the first wireless communication circuit 440.

According to an embodiment, a second connector 492 may be disposed on or coupled to the third PCB 470 through a conductive bonding member such as solder, and may be electrically connected with the third PCB 470. According to an embodiment, the electronic device 40 may include a conductive member 490 (for example, the conductive member 390 of FIG. 3) to electrically connect the first connector 491 and the second connector 492. The conductive member 490 may electrically connect the antenna module 400 and the third PCB 470. For example, the conductive member 490 may include an FPCB or a coaxial cable. According to a certain embodiment, the second connector 492 may include a slot, and a portion of the first PCB 410 may include terminals which are inserted into the slot in replacement of the first connector 491 and are electrically connected with the second connector 492.

According to an embodiment, the processor 401, the second wireless communication circuit 480, the power management module 402, the memory 403, or the at least one antenna 483 may be electrically connected with the third PCB 470. The processor 401, the second wireless communication circuit 480, the power management module 402, or the memory 403 may be disposed on or coupled to the third PCB 470 through a conductive bonding member such as solder. According to an embodiment, the at least one antenna 483 may be separated from the third PCB 470 and may be electrically connected with the third PCB 470 through a conductive member. According to a certain embodiment, the at least one antenna 483 may be disposed on the third PCB 470 or may be implemented by a conductive pattern included in the third PCB 470. According to various embodiments, the at least one antenna 483 may be disposed in a housing (not shown) which forms an exterior of the electronic device 40, or may include at least a portion of the housing (for example, at least a portion of a member forming a side surface).

According to an embodiment, the processor 401 may execute software to control at least one component (for example, hardware or software component) of the electronic device 40 that is electrically connected with the processor 401, and may perform various data processing or computation. According to an embodiment, the processor 402 may process a command or data stored in the memory 403. For example, the processor 401 may transmit and/or receive a signal through the second wireless communication circuit 480. The processor 401 may write and read data on and from the memory 403. The processor 401 may perform functions of a protocol stack required by communication standards. A part of the second wireless communication circuit 480 and/or the processor 401 may be referred to as a communication processor (CP).

According to an embodiment, the second wireless communication circuit 480 may perform functions for transmitting or receiving a signal through a wireless channel. For example, the second wireless communication circuit 480 may perform a function of converting between a baseband signal and/or a bit stream according to a physical layer standard of a system. For example, when transmitting data, the second wireless communication circuit 480 may generate complex symbols by encoding and modulating a transmission bit stream. In addition, when receiving data, the second wireless communication circuit 480 may restore a reception bit stream by demodulating and decoding a baseband signal. The second wireless communication circuit 480 may up-convert an RF signal, and then may transmit the signal via at least one antenna, and may down-convert an RF signal received via at least one antenna into a baseband signal. For example, the second wireless communication circuit 480 may include components such as a transmission filter, a reception filter, an amplifier, a mixer, an oscillator, a digital to analog converter (DAC), an analog to digital converter (ADC).

According to various embodiments, the second wireless communication circuit 480 may include a plurality of wireless communication modules to process signals of different frequency bands. For example, the second wireless communication circuit 480 may include a plurality of wireless communication modules to support a plurality of different wireless access technologies. For example, the different wireless access technologies may include Bluetooth low energy (BLE), wireless fidelity (WiFi), WiFi gigabyte (WiGig), or a cellular network (for example, long term evolution (LTE)). In addition, the different frequency bands may include a super high frequency (SHF) (for example, about 2.5 GHz or about 5 GHz) band, a millimeter wave (for example, about 60 HGz) band.

According to an embodiment, the second wireless communication circuit 480 may be electrically connected with the antenna module 400 through the conductive member 490. For example, the second wireless communication circuit 480 may include a baseband processor, or at least one communication circuit (for example, an intermediate frequency integrated circuit (IFIC), or a radio frequency integrated circuit (RFIC)). The second wireless communication circuit 480 may include, for example, a baseband processor which is separate from the processor 401 (for example, an application processor (AP)).

According to an embodiment, the second wireless communication circuit 480 may include at least one of a first wireless communication module 481 or a second wireless communication module 482. The electronic device 40 may further include one or more interfaces to support inter-chip communication between the second wireless communication circuit 480 and the processor 401. The processor 401 and the first wireless communication module 481 or the second wireless communication module 482 may transmit or receive data (or signals) by using the inter-chip interface (for example, an inter processor communication channel).

According to an embodiment, the first wireless communication module 481 or the second wireless communication module 482 may provide an interface to perform communication with other entities. The first wireless communication module 481 may support, for example, wireless communication related to a first network (for example, the first cellular network 292 of FIG. 2) which utilizes the at least one antenna 483. The second wireless communication module 482 may support wireless communication related to a second network (for example, the second cellular network 294 of FIG. 2) which utilizes the at least one antenna module 400. According to an embodiment, the first network may include a 4th generation (4G) network, and the second network may include a 5$^{th}$ generation (5G) network. The 4G network may support, for example, a long term evolution (LTE) protocol prescribed in 3GPP. The 5G network may support, for example, a new radio (NR) protocol prescribed in 3GPP. According to various embodiments, the first network may be related to wireless fidelity (WiFi) or global positioning system (GPS).

According to an embodiment, the first wireless communication module 481 may receive a signal of a high frequency (hereinafter, a radio frequency (RF) signal) related to the first network (for example, a 4G network) through the at least one antenna 483, and may modulate (for example, down-convert) the received RF signal into a signal of a low frequency (hereinafter, a baseband signal) and may transmit the signal to the processor 401. The first wireless communication module 481 may receive a baseband signal related to the first network from the processor 401, and may modulate (for example, up-convert) the received baseband signal into an RF signal and may transmit the signal to the outside through the at least one antenna 483. According to an embodiment, the first wireless communication module 481 may include an RFIC. According to various embodiments, when the RF signal is modulated into the baseband signal or the baseband signal is modulated into the RF signal, an input of a local oscillator (LO) may be utilized.

According to an embodiment, the second wireless communication module 482 may receive a baseband signal related to the second network from the processor 401. The second wireless communication module 482 may up-convert the baseband signal into an IF signal by utilizing an input of the local oscillator (LO) (hereinafter, an LO signal), and may transmit the IF signal to the antenna module 400 through the conductive member 490. The antenna module 400 may receive the IF signal from the second wireless communication module 482 through the conductive member 490. The antenna module 400 may up-convert the IF signal into an RF signal by utilizing the LO signal, and may transmit the RF signal to the outside through the one or more antennas 421, 422 included in the antenna module 400.

According to an embodiment, the antenna module 400 may receive an RF signal through the one or more antennas 421, 422. The antenna module 400 may down-convert the RF signal into an IF signal by utilizing an LO signal, and may transmit the IF signal to the second wireless communication module 482 through the conductive member 490. The second wireless communication module 482 may receive the IF signal from the antenna module 400 through the conductive member 490. The second wireless communication module 482 may down-convert the IF signal into a baseband signal by utilizing an LO signal, and may transmit the baseband signal to the processor 401. According to an embodiment, the second wireless communication module 482 may include an IFIC. The second wireless communication module 482 may transmit and/or receive a first signal of a frequency band between about 5 GHz and about 15 GHz. According to an embodiment, the antenna module 400 may include an RFIC.

According to an embodiment, the second wireless communication module 482 or the first wireless communication circuit 440 may include a plurality of transmission and reception paths. For example, the second wireless communication module 482 or the first wireless communication circuit 440 may include a beam forming system which processes a transmitted or received signal to focus energy radiated from antenna elements of the first antenna array 421 or the second antenna array 422 in a specific direction in a space. The beam forming system may enable a signal of a stronger strength to be received in a desired direction or a signal to be transmitted in a desired direction, or may disable a signal coming in an undesired direction from being received. The beam forming system may adjust a shape and a direction of a beam by using a difference of an amplitude or a phase of a carrier signal in an RF band. According to an embodiment, the second wireless communication module 482 or the first wireless communication circuit 440 may control each antenna element to have a phase difference. For example, the second wireless communication module 482 or the first wireless communication circuit 440 may include a first electric path which is electrically connected with a first point on the first antenna element, and a second electric path which is electrically connected with a second point on the second antenna element. The processor 401, the second wireless communication module 482 or the first wireless communication circuit 440 may provide a phase difference between a first signal at the first point and a second signal at the second point. According to various embodiments (not shown), the electronic device 40 may include one or more phase shifters disposed on the first PCB 410 or the third PCB 470. The one or more phase shifters may adjust phases of the plurality of antenna elements of the first antenna array 421 or the second antenna array 422.

According to an embodiment, the memory 403 may store codebook information regarding beamforming. The processor 401, the second wireless communication module 482 or the first wireless communication circuit 440 may efficiently control (for example, allocate or dispose) a plurality of beams through the plurality of antenna elements of the first antenna array 421 or the second antenna array 422, based on the codebook information.

According to various embodiments, the first wireless communication module 481 and/or the second wireless communication module 482 may form one module with the processor 401. For example, the first wireless communication module 481 and/or the second wireless communication module 482 may be integrally formed with the processor 401. According to a certain embodiment, the first wireless communication module 481 and/or the second wireless communication module 482 may be disposed in one chip or may be formed in the form of an independent chip.

According to an embodiment, the processor 401 and one wireless communication module (for example, the first wireless communication module 481) may be integrally formed with each other within one chip (SoC chip), and the other wireless communication module (for example, the second wireless communication module 482) may be formed in the form of an independent chip.

According to an embodiment, at least a portion of the plurality of layers included in the first PCB 410 may include a conductive path which is utilized to exchange a signal related to various logics (for example, logic related to the second cellular network 294 of FIG. 2) between the first wireless communication circuit 440 and the second wireless communication module 482.

According to an embodiment, the power management module 402 (for example, the power management module 188 of FIG. 1) may manage power supplied to the electronic device 40 by using power of a battery (for example, the battery 189 of FIG. 1) electrically connected with the third PCB 470.

According to an embodiment, the power management circuit 460 may be disposed on or coupled to the second surface (for example, the second surface 310b of FIG. 3) of the first PCB 410 through a conductive bonding member 461 such as solder, and may be electrically connected with the first PCB 410. The power management circuit 460 may receive power from the power management module 402 through the conductive member 490, and may manage power supplied to the antenna module 400 by using the received power. According to an embodiment, the power management circuit 460 may be implemented as at least a part of a power management integrated circuit (PMIC), for example.

According to a certain embodiment, the power management circuit 460 may be omitted from the antenna module 400. The power management module 402 may manage power supplied to the antenna module 400.

According to an embodiment, at least a portion of the plurality of layers included in the first PCB 410 may include a conductive path to connect the first connector 491 and the power management circuit 460.

According to an embodiment, at least a portion of the plurality of layers included in the first PCB 410 may include a conductive path to provide power to load components between the power management circuit 460 and the load components (for example, the first wireless communication circuit 440).

According to various embodiments (not shown), the electronic device 40 may include a frequency adjustment circuit disposed on the first PCB 410. Radiation characteristics and impedance of the one or more antennas 421, 422 may be related to antenna performance, and may vary according to a shape and a size of an antenna element, and a material of the antenna element. The radiation characteristics of the antenna element may include an antenna radiation pattern (or an antenna pattern) which is a directional function indicating a relative distribution of power radiated from the antenna element, and a polarization state (or antenna polarization) of radio waves radiated from the antenna element. The impedance of the antenna element may be related to power transmission from a transmitter to the antenna element, or power transmission from the antenna element to a receiver. To minimize reflection on a connection portion between a transmission line and the antenna element, the impedance of the antenna element may be designed to match impedance of the transmission line, and accordingly, maximum power transmission (or power loss minimization) or efficient signal transmission through the antenna element may be possible. The impedance matching may result in an efficient flow of a signal in a specific frequency (or a resonant frequency). Impedance mismatching may cause power loss or may reduce exchanged signals, and thus may degrade communication performance. According to an embodiment, the frequency adjustment circuit (for example, a passive element) disposed on the first PCB 410 can solve such impedance mismatching. According to an embodiment, the frequency adjustment circuit may shift a resonant frequency to a designated frequency or may shift the resonant frequency as much as designated.

According to an embodiment, at least a portion of the plurality of layers included in the first PCB 410 may include a conductive path to electrically connect the frequency adjustment circuit (for example, a passive element) to the first wireless communication circuit 440 or the one or more antennas 421, 422.

Figure 5A:
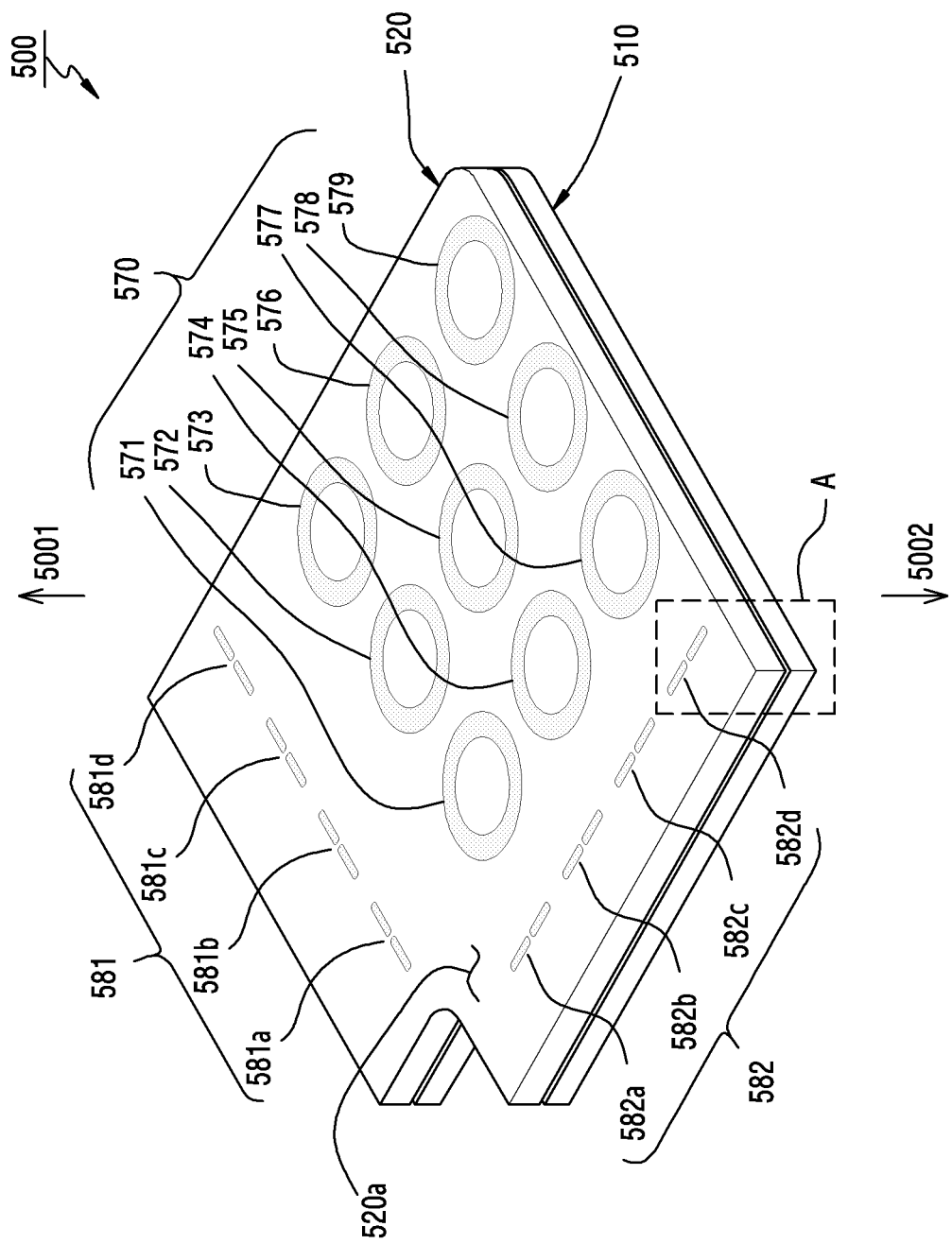
FIG. 5A is a front perspective view of an antenna module according to an embodiment.
Figure 5B:
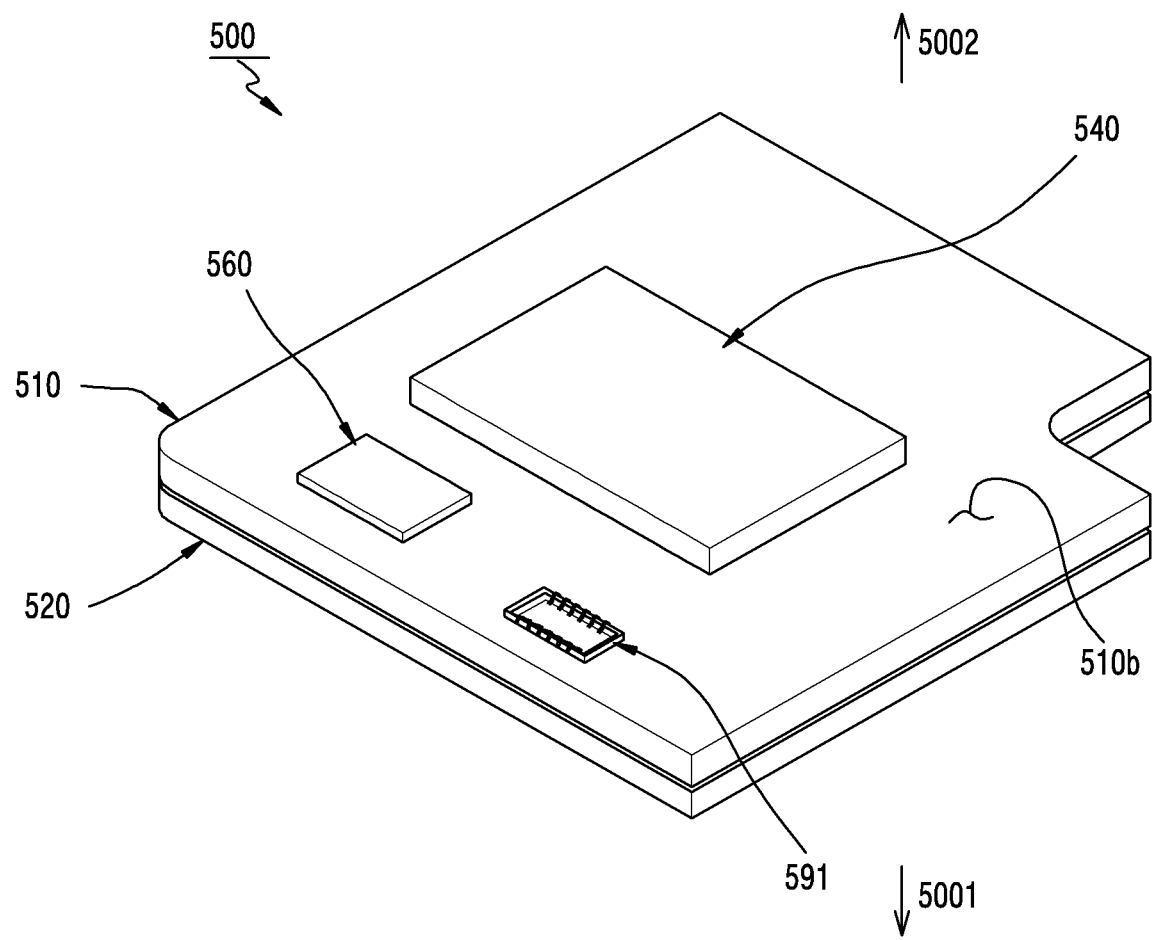
FIG. 5B is a rear perspective view of the antenna module according to an embodiment.
Figure 5C:
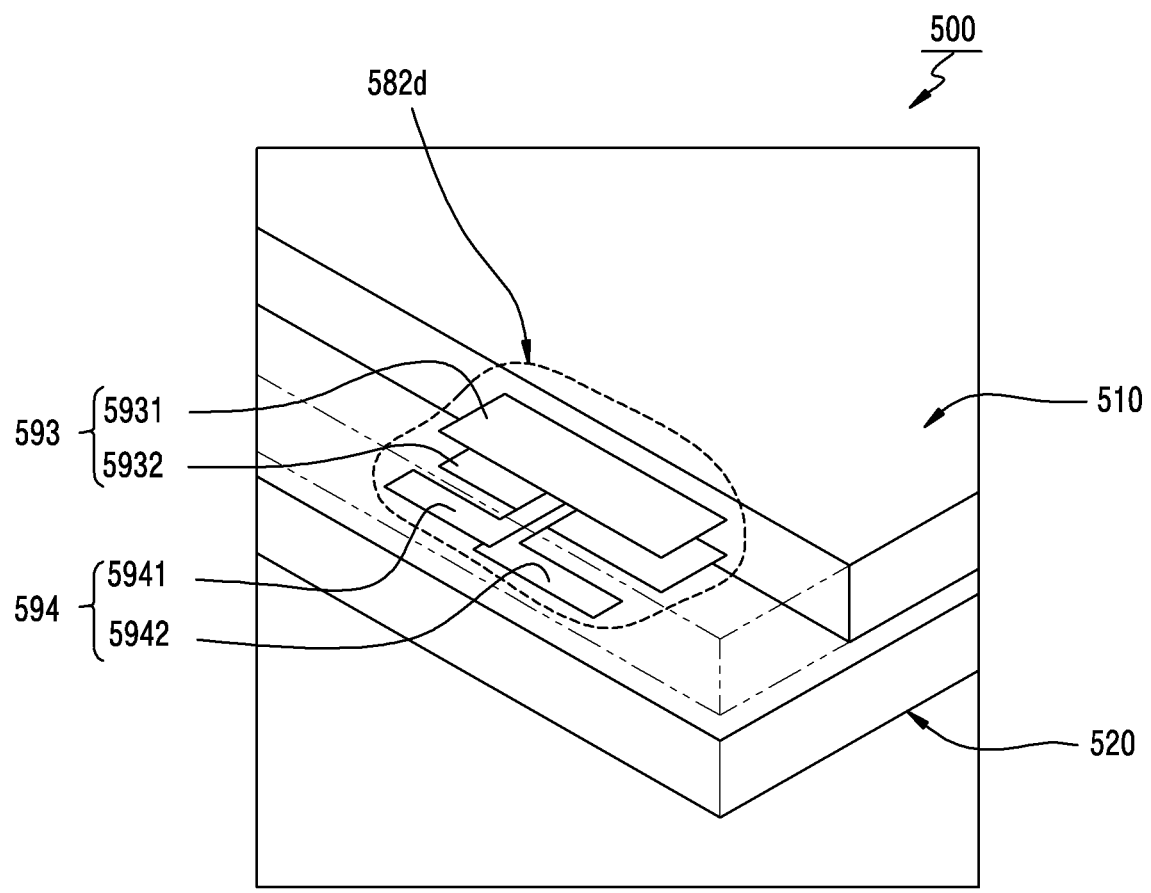
FIG. 5C is a view illustrating a structure of an A portion in FIG. 5A.

FIG. 5A is a front perspective view of an antenna module according to an embodiment. FIG. 5B is a rear perspective view of the antenna module according to an embodiment. FIG. 5C is a view illustrating a structure of the A portion of FIG. 5A.

Referring to FIGS. 5A and 5B, in an embodiment, the antenna module 500 (for example, the antenna module 300 of FIG. 3, or the antenna module 400 of FIG. 4) may include at least one of a first PCB 510 (for example, the first PCB 310 of FIG. 3, or the first PCB 410 of FIG. 4), a second PCB 520 (for example, the second PCB 320 of FIG. 3 or the second PCB 420 of FIG. 4), a communication circuit 540 (for example, the first wireless communication circuit 340 of FIG. 3 or the first communication circuit 440 of FIG. 4), a power management circuit 560 (for example, the power management circuit 460 of FIG. 4), or a connector 591 (for example, the first connector 491 of FIG. 4).

According to an embodiment, the second PCB 520 may include at least one of a first antenna array 570 (for example, the first antenna array 421 of FIG. 4), a second antenna array 581 (for example, the second antenna array 422 of FIG. 4), or a third antenna array 582 (for example, the second antenna array 422 of FIG. 4). According to an embodiment, the first antenna array 570 may include a plurality of antenna elements 571, 572, 573, 574, 575, 576, 577, 578, 579 which are implemented by at least a portion of a plurality of conductive layers of the second PCB 520. According to an embodiment, the second antenna array 581 or the third antenna array 582 may include a plurality of antenna elements 581a, 581b, 581c, 581d, 582a, 582b, 582c, 582d which are implemented by at least a portion of the plurality of conductive layers of the second PCB 520.

According to an embodiment, an electronic device (for example, the electronic device 101 of FIG. 1, the electronic device 30 of FIG. 3, or the electronic device 40 of FIG. 4) including the antenna module 500 may include a housing which provides a front surface, a rear surface, or a side surface surrounding a space between the front surface and the rear surface, and a display disposed in the housing and exposed through the front surface. According to an embodiment, the antenna module 500 may be disposed substantially in parallel with a PCB (for example, the third PCB 370 of FIG. 3, or the third PCB 470 of FIG. 4) between the front surface and the rear surface of the electronic device. At least a portion of the plurality of antenna elements 571, 572, 573, 574, 575, 576, 577, 578, 579 included in the first antenna array 570 may form beams toward the rear surface of the electronic device. At least a portion of the plurality of antenna elements 581a, 581b, 581c, 581d, 582a, 582b, 582c, 582d included in the second antenna array 581 or the third antenna array 582 may form beams toward the side surface of the electronic device.

Referring to FIG. 5C, the antenna element 582d of the third antenna array 582 may include an A antenna element 593 and/or a B antenna element 594. According to an embodiment, the A antenna element 593 may include a first antenna element 5931 and/or a second antenna element 5932. According to an embodiment, the B antenna element 594 may include a third antenna element 5941 and/or a fourth antenna element 5942.

According to an embodiment, the first antenna element 5931 and the second antenna element 5932 may be disposed to be spaced apart from each other on a position where the first antenna element 5931 and the second antenna element 5932 overlap each other at least in part when viewed above the first PCB 510. The communication circuit 540 (see FIG. 5B) may transmit or receive a vertical polarization through the first antenna element 5931 and/or the second antenna element 5932. According to an embodiment, the third antenna element 5941 and the fourth antenna element 5942 may be disposed between the first antenna element 5931 and the second antenna element 5932. The communication circuit 540 may transmit or receive a horizontal polarization through the third antenna element 5941 and/or the fourth antenna element 5942. According to various embodiments, each of the other antenna elements 582a, 582b, 582c of the third antenna array 582 may be implemented by a structure including a first antenna element, a second antenna element, a third antenna element, and/or a fourth antennal element, like the antenna element 582d.

According to various embodiments, each of the plurality of antenna elements 581a, 581b, 581c, 581d of the second antenna array 581 may be implemented by a structure including a first antenna element, a second antenna element, a third antenna element and/or a fourth antenna element, like the antenna element 582d of the third antenna array 582.

According to various embodiments, the positions or number of the antenna arrays are not limited to the example shown in FIG. 5A, and may vary. According to various embodiments, the positions or number of the antenna elements included in the first antenna array 570, the second antenna array 581, or the third antenna array 582 are not limited to the example shown in FIG. 5A, and may vary.

Referring to FIGS. 5A and 5B, in an embodiment, the second PCB 520 may include a third surface 520a (for example, the third surface 320a of FIG. 3) which faces in a first direction 5001, and a fourth surface (for example, the fourth surface 320b of FIG. 3) which faces in a second direction 5002 opposite to the first direction 5001, and is opposite the first PCB 510. The first PCB 510 may include a first surface (for example, the first surface 310a of FIG. 3) which faces in the first direction 5001 and is opposite the fourth surface of the second PCB 520, and a second surface 510b (for example, the second surface 310b of FIG. 3) which faces in the second direction 5002. A conductive bonding member such as solder (for example, the conductive bonding member 330 of FIG. 3, or the conductive bonding member 440 of FIG. 4) may be disposed between the first surface of the first PCB 510 and the fourth surface of the second PCB 520. The conductive bonding member may electrically and/or mechanically connect the first PCB 510 and the second PCB 520.

According to an embodiment, the communication circuit 540 may be disposed on or coupled to the second surface 510b of the first PCB 510 through a conductive bonding member (for example, the conductive bonding member 350 of FIG. 3, or the conductive bonding member 450 of FIG. 4) such as solder, and may be electrically connected with the first PCB 510. The communication circuit 540 may be electrically connected with the first antenna array 570, the second antenna array 581, and the third antenna array 582 of the second PCB 520 through the first PCB 510.

According to an embodiment, the power management circuit 560 may be disposed on or coupled to the second surface 510b of the first PCB 510 through a conductive bonding member (for example, the conductive bonding member 461 of FIG. 4) such as solder, and may be electrically connected with the first PCB 510. The power management circuit 560 may be electrically connected with the communication circuit 540, the connector 591, or various other components (for example, a passive element) disposed on the first PCB 510 through at least one conductive layer included in the first PCB 510.

According to an embodiment, the connector 591 may be disposed on or coupled to the second surface 510b of the first PCB 510 through a conductive bonding member (for example, the conductive bonding member 462 of FIG. 4) such as solder, and may be electrically connected with the first PCB 510. The connector 591 may be electrically connected with the communication circuit 540, the power management circuit 560 or various other components disposed on the first PCB 510 through at least one conductive layer included in the first PCB 510.

Figure 6:
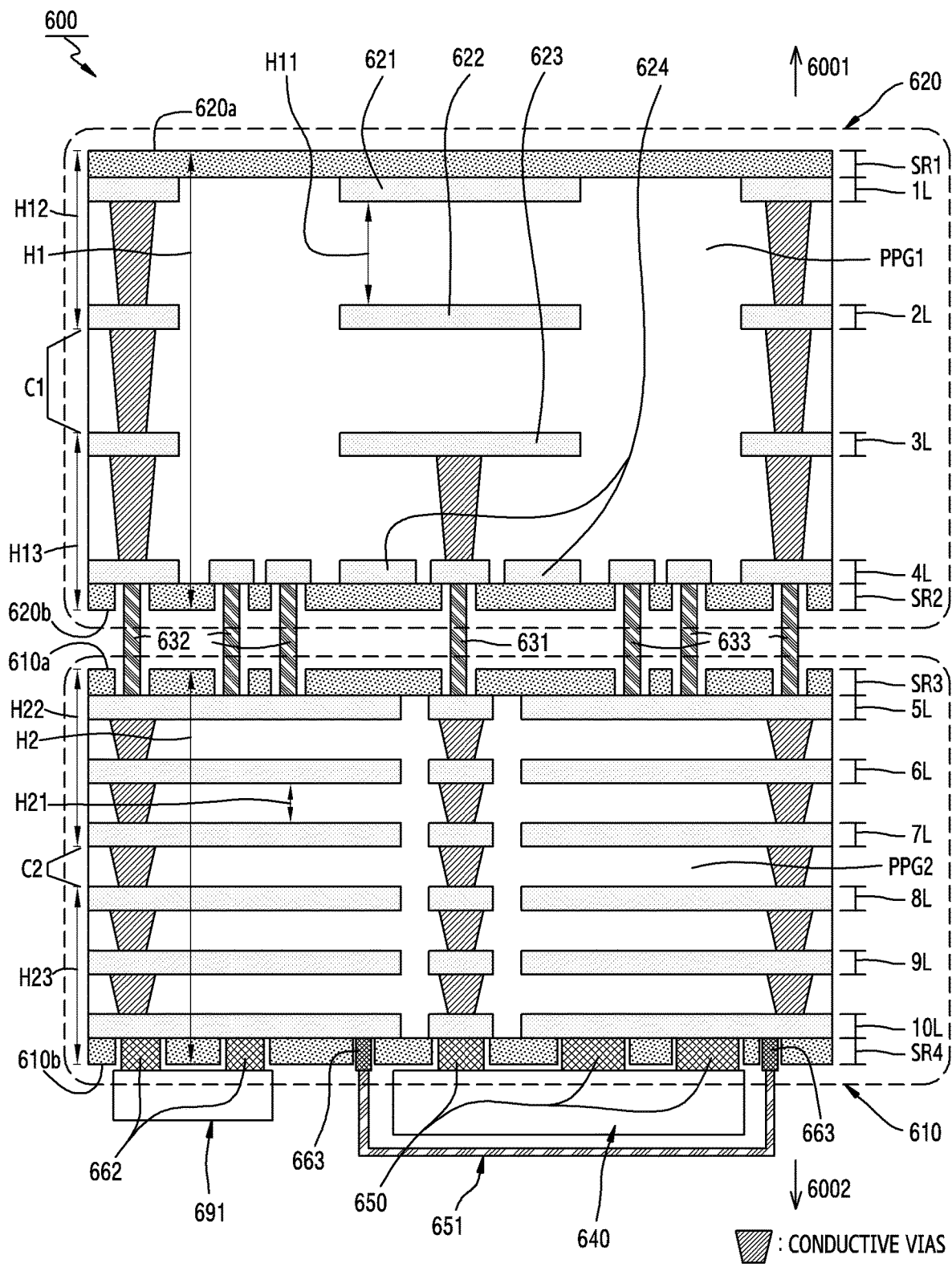
FIG. 6 is a cross-sectional view of an antenna module according to an embodiment.

FIG. 6 is a cross sectional view of an antenna module according to an embodiment.

Referring to FIG. 6, in an embodiment, the antenna module 600 may include at least one of a first PCB 610 (for example, the first PCB 310 of FIG. 3, the first PCB 410 of FIG. 4, or the first PCB 510 of FIG. 5A or 5B), a second PCB 620 (for example, the second PCB 320 of FIG. 3, the second PCB 420 of FIG. 4, or the second PCB 520 of FIG. 5A or 5B), conductive bonding members 631, 632, 633 (for example, the conductive bonding member 330 of FIG. 3, or the conductive bonding member 430 of FIG. 4), a communication circuit 640 (for example, the first wireless communication circuit 340 of FIG. 3, the first wireless communication circuit 440 of FIG. 4, or the communication circuit 540 of FIG. 5B), or a connector 691 (for example, the first connector 491 of FIG. 4, or the connector 591 of FIG. 5B).

According to an embodiment, the second PCB 620 may include a plurality of conductive layers 1L, 2L, 3L, 4L, and a first insulating material (for example, a first prepreg) PPG1 disposed between the plurality of conductive layers 1L, 2L, 3L, 4L. The second PCB 620 may have a structure in which the same number of conductive layers are disposed on both sides with reference to a center base C1. For example, the second PCB 620 in which the same number of conductive layers are laminated on both sides with reference to the center base C1 may be formed by a manufacturing method which repeats an operation of laminating two conductive layers making a pair on both sides, respectively. This manufacturing method can prevent a damage to a PCB, such as warpage or tearing, caused by an environment such as temperature or pressure during a manufacturing process. Gaps between the plurality of conductive layers 1L, 2L, 3L, 4L may be substantially the same, and the second PCB 620 may have substantially the same height (or thickness) H12, H13 on both sides with reference to the center base C1. According to an embodiment, the second PCB 620 may include a conductive via which electrically connects at least a portion of the plurality of conductive layers 1L, 2L, 3L, 4L. The conductive via may include a conductive hole that is pierced for the purpose of disposing a connection conductor to electrically connect the conductive layers 1L, 2L, 3L, 4L disposed on different layers. According to various embodiments, the number of conductive layers included in the second PCB 620 is not limited to the example shown in FIG. 6, and may vary.

According to an embodiment, the second PCB 620 may include insulating layers SR1, SR2 which are formed by applying an insulating material, such as a solder mask insulating ink of an epoxy component, to conductive outer layers (for example, the first conductive layer 1L, the fourth conductive layer 4L). Since an area covered by the insulating layer SR1 on the first conductive layer 1L, and an area covered by the insulating layer SR2 on the fourth conductive layer 4L are not exposed to the outside, oxidation thereof can be prevented. According to an embodiment, an area that is not applied with the insulating layer SR2 on the fourth conductive layer 4L may be utilized as a terminal (or a land) which is electrically connected with the first PCB 610 through the conductive bonding members 631, 632, 633 such as solder. The insulating layer SR2 can prevent a bridge from being generated on solder when the first PCB 610 and the second PCB 620 are connected through solder.

According to an embodiment, the first PCB 610 may include a plurality of conductive layers 5L, 6L, 7L, 8L, 9L, 10L, and a second insulating material (for example, a second prepreg) PPG2 disposed between the plurality of conductive layers 5L, 6L, 7L, 8L, 9L, 10L. The first PCB 610 may have a structure in which the same number of conductive layers are disposed on both sides with reference to a center base C2. For example, the first PCB 610 in which the same number of conductive layers are laminated on both sides with reference to the center base may be formed by a manufacturing method which repeats an operation of laminating two conductive layers making a pair on both sides, respectively. This manufacturing method can prevent a damage to a PCB, such as warpage or tearing, caused by an environment such as temperature or pressure during a manufacturing process. Gaps between the plurality of conductive layers 5L, 6L, 7L, 8L, 9L, 10L may be substantially the same, and the first PCB 610 may have substantially the same height (or thickness) H22, H23 on both sides with reference to the center base C2. According to an embodiment, the first PCB 610 may include a conductive via having a connection lead to electrically connect the plurality of conductive layers 5L, 6L, 7L, 8L, 9L, 10L disposed on different layers. According to various embodiments, the number of conductive layers included in the first PCB 610 is not limited to the example shown in FIG. 6, and may vary.

According to an embodiment, the first PCB 610 may include insulating layers SR3, SR4 which are formed by applying an insulating material (for example, a solder mask insulating ink) to conductive outer layers (for example, the fifth conductive layer 5L, the tenth conductive layer 10L). Since an area covered by the insulating layer SR3 on the fifth conductive layer 5L, and an area covered by the insulating layer SR4 on the tenth conductive layer 10L are not exposed to the outside, oxidation thereof can be prevented. According to an embodiment, an area that is not applied with the insulating layer SR3 on the fifth conductive layer 5L may be utilized as a terminal (or a land) which is electrically connected with the second PCB 620 through the conductive bonding members 631, 632, 633 such as solder. The insulating layer SR3 can prevent a bridge from being generated on solder when the first PCB 610 and the second PCB 620 are connected through solder. An area that is not applied with the insulating layer SR4 on the tenth conductive layer 10L may be utilized as a terminal (or land) for coupling components such as the communication circuit 640, the connector 691 to the first PCB 610. The insulating layer SR4 can prevent a bridge from being generated on solder when components such as the communication circuit 640, the connector 691 are connected to the first PCB 610 through solder.

According to an embodiment, the first PCB 610 or the second PCB 620 may be formed by using a CCL (or disc). The CCL may be a composite CCL that is made by mixing two kinds of strengthening materials. According to an embodiment, the composite CCL may include composite type of laminate material bonded with a flame retardant epoxy resin (CEM)-1 or CEM-3 defined in the NEMA. The CEM-1 may include a center base (or core) which is formed with paper impregnated with epoxy resin, an outer base which is formed with woven glass fibers impregnated with epoxy resin, and a copper foil coupled with the outer base. The CEM-3 may include a center base which is formed with non-woven glass fibers (for example, non-woven glass fabric) impregnated with epoxy resin, an outer base which is formed with woven glass fibers impregnated with epoxy resin, and a copper foil coupled with the outer base. The glass fiber or paper can enhance mechanical processability, heat-resisting property, or dimensional stability. According to a certain embodiment, the CCL may be FR-6 which includes a center base which is formed with non-woven glass fibers (for example, non-woven glass fabric) impregnated with polyester resin, an outer base which is formed with glass fibers impregnated with resin, and a copper foil coupled with the outer base.

According to various embodiments, the CEM-3 may be designed to be substituted for FR-4 or FR-5. Since the CEM-3 has relatively fewer glass fibers than FR-4 or FR-5, its mechanical strength may be relatively low. When the CEM-3 is designed to be substituted for FR-4 or FR-5, the mechanical strength may be considered. According to various embodiment, when a punching process is required, the CEM-3 which is more favorable for the punching process may be applied to manufacturing of a PCB in replacement of FR-4.

According to various embodiments, the CCL may be a CCL for a high frequency that is made to respond to high-speed signal transmission. For example, since a propagation speed of a signal in a PCB is inversely proportional to permittivity, use of a material of low permittivity can increase a propagation speed of a signal.

According to a certain embodiment, the CCL may be formed by disposing a film prepreg of an insulating material on a plate formed with metal such as aluminum or iron, and then coupling a copper foil to the film prepreg.

According to a certain embodiment, the CCL may include a flexible copper clad laminate (FCCL) for a flexible printed circuit board (FPCB). The FCCL may be formed, for example, by coupling a polyester film or a polyimide film having flexibility and a copper foil by an adhesive (for example, an acrylic adhesive).

According to an embodiment, the first PCB 610 and the second PCB 620 may be manufactured based on different CCLs. According to various embodiments, the first PCB 610 and the second PCB 620 may be manufactured based on the same CCL.

According to various embodiments, the first PCB 610 may be manufactured by using a plurality of different CCLs.

According to various embodiments, the second PCB 620 may be manufactured by using a plurality of different CCLs.

According to an embodiment, the number of conductive layers included in the first PCB 610 may be different from the number of conductive layers included in the second PCB 620. For example, the number of conductive layers (for example, four conductive layers) included in the second PCB 610 may be smaller than the number of conductive layers (for example, six conductive layers) included in the first PCB 610. According to a certain embodiment (not shown), the number of conductive layers included in the second PCB 620 may be the same as the number of conductive layers included in the first PCB 610, or may be larger than the number of conductive layers included in the first PCB 610.

According to an embodiment, the first insulating material PPG1 and the second insulating material PPG2 may include different materials. According to a certain embodiment, the first insulating material PPG1 and the second insulating material PPG2 may be the same as each other. The first insulating material PPG1 may vary according to the CCL which is a base for forming the second PCB 620, and an insulating material included therein. The second insulating material PPG2 may vary according to the CCL which is a base for forming the first PCB 610, and an insulating material included therein.

According to an embodiment, first gaps H11 between the plurality of conductive layers 1L, 2L, 3L, 4L of the second PCB 620, or second gaps H21 between the plurality of conductive layers 5L, 6L, 7L, 8L, 9L, 10L of the first PCB 610 may be different from one another. For example, the first gap H11 may be larger than the second gap H21. According to a certain embodiment, the first gap H11 may be substantially the same as the second gap H21 or may be smaller than the second gap H21.

According to an embodiment, a thickness H1 of the second PCB 620 may be different from a thickness H2 of the first PCB 610. For example, the thickness H1 of the second PCB 620 may be larger than the thickness H2 of the first PCB 610. According to a certain embodiment, the thickness H1 of the second PCB 620 may be substantially the same as the thickness H2 of the first PCB 610, or may be smaller than the thickness H2 of the first PCB 610.

According to an embodiment, the second PCB 620 may include a third surface 620a (for example, the third surface 320a of FIG. 3) which faces in a first direction 6001, and a fourth surface 620b (for example, the fourth surface 320b of FIG. 3) which faces in a second direction 6002 opposite to the first direction 6001 and is opposite the first PCB 610. The first PCB 610 may include, for example, a first surface 610a (for example, the first surface 310a of FIG. 3) which faces in the first direction 6001 and is opposite the fourth surface 620b of the second PCB 620, and a second surface 610b (for example, the second surface 310b of FIG. 3) which faces in the second direction 6002. At least one conductive bonding member 631, 632, or 633 such as solder may be disposed between the first surface 610a and the fourth surface 620b, and may electrically and/or mechanically connect the first PCB 610 and the second PCB 620.

According to an embodiment, the communication circuit 640 may be disposed on or coupled to the second surface 610b of the first PCB 610 through a conductive bonding member 650 (for example, the conductive bonding member 350 of FIG. 3 or the conductive bonding member 450 of FIG. 4) such as solder, and may be electrically connected with the first PCB 610.

According to an embodiment, at least a portion of the plurality of conductive layers 1L, 2L, 3L, 4L included in the second PCB 620 may be utilized as a plurality of antenna elements (for example, the at least one antenna element 321 of FIG. 3, or the plurality of antenna elements included in the first antenna array 421 or the second antenna array 422 of FIG. 4).

For example, the third conductive layer 3L may include an antenna element (for example, a patch antenna) 623 electrically connected with the communication circuit 640. The antenna element 623 may receive power from the communication circuit 640, and may transmit or receive a wireless signal. A portion 631 of the conductive bonding members 631, 632, 633 connecting the first PCB 610 and the second PCB 620 may be utilized as a conductive path for transmitting a signal or power between a portion 623 of the third conductive layer 3L and the communication circuit 640.

For example, the first conductive layer 1L, the second conductive layer 2L or the fourth conductive layer 4L may include a dummy element 621, 622 or 624 as an antenna element. The dummy element 621, 622, or 624 may be physically separated from other conductive elements to be in an electrically floating state. According to an embodiment, the dummy element 621, 622 or 624 may be electromagnetically coupled with the antenna element 623 of the third conductive layer 3L to adjust radiation characteristics. For example, the dummy element 621, 622 or 624 may shift a resonant frequency to a designated frequency or may shift the resonant frequency as much as designated. For example, the dummy element 621, 622, or 624 can enhance antenna performance by reducing an electromagnetic noise.

According to an embodiment, the dummy elements 621, 622, 624 may overlap the antenna element 623 of the third conductive layer 3L at least in part. According to various embodiments, the dummy elements 621, 622, 624 may provide a uniform thermal expansion coefficient when the second PCB 620 is manufactured, so that warpage of a PCB caused by heat of high temperature can be prevented.

According to various embodiments (not shown), a portion 622 of the second conductive layer 2L may be utilized as an antenna element which is electrically connected with the communication circuit 640, and at least one of a portion 621 of the first conductive layer 1L, a portion 623 of the third conductive layer 3L, or a portion 624 of the fourth conductive layer 4L may be implemented as a dummy element.

According to an embodiment, at least a portion of the plurality of conductive layers included in the first PCB 610 and the second PCB 620 may include a ground plane. The ground plane may block an electromagnetic noise on a flow of a signal or power in the first PCB 610 or the second PCB 620. According to a certain embodiment, the ground plane may distribute heat generated in the antenna module 600 or transmitted to the antenna module 600 from the outside. According to an embodiment, at least one ground plane (not shown) included in the first PCB 610 may be electrically connected with at least one ground plane included in the second PCB 620 through a conductive bonding member 632 or 633.

According to various embodiments, the antenna module 600 may further include a conductive bonding member (not shown) for mechanically coupling rather than for transmitting a signal between the first PCB 610 and the second PCB 620. For example, the conductive bonding member 631, 632, or 633 for transmitting a signal or mechanically coupling between the first PCB 610 and the second PCB 620 may be formed by a first solder ball, and the conductive bonding member for mechanically coupling rather than for transmitting a signal may be formed by a second solder ball. According to various embodiments, the second solder ball may have a different diameter from that of the first solder ball, for example, a larger diameter than that of the first solder ball.

According to an embodiment, at least a portion of the plurality of conductive layers 1L, 2L, 3L, 4L included in the second PCB 620 may include at least one second ground plane (for example, the second ground plane 423 of FIG. 4) related to radiation characteristics of the antenna elements 621, 622, 623, 624 included in the second PCB 620. For example, the radiation characteristics of the antenna module 600 may be determined based on distances of the plurality of antenna elements 621, 622, 623, 624 included in the second PCB 620 from the second ground plane. For example, the radiation characteristics of the antenna module 600 may be determined based on a shape (for example, width, length, thickness) of the second ground plane. For example, the radiation characteristics of the antenna module 600 may be determined based on an insulating material (for example, permittivity) between the antenna elements 621, 622, 623, 624 included in the second PCB 620, and the second ground plane.

According to an embodiment, at least a portion of the plurality of conductive layers 5L, 6L, 7L, 8L, 9L, 10L included in the first PCB 610 may include at least one first ground plane (for example, the first ground plane 411 of FIG. 4) related to radiation characteristics of the antenna elements 621, 622, 623, 624 included in the second PCB 620. For example, the radiation characteristics of the antenna module 600 may be determined based on distances of the antenna elements 621, 622, 623, 624 included in the second PCB 620 from the first ground plane. For example, the radiation characteristics of the antenna module 600 may be determined based on a shape (for example, width, length, thickness) of the first ground plane. For example, the radiation characteristics of the antenna module 600 may be determined based on an insulating material (for example, permittivity) between the antenna elements 621, 622, 623, 624 included in the second PCB 620, and the first ground plane.

According to various embodiments, as a ground plane related to the radiation characteristics of the antenna elements 621, 622, 623, 624 included in the second PCB 620, one of the first ground plane of the first PCB 610 and the second ground plane of the second PCB 620 may be omitted.

According to an embodiment, the connector 691 may be disposed on or coupled to the second surface 610b of the first PCB 610 through a conductive bonding member 662 (for example, the conductive bonding member 462 of FIG. 4) such as solder, and may be electrically connected with the first PCB 610. The connector 691 may be electrically connected with the communication circuit 640 or various other components disposed on the first PCB 610 through at least one conductive layer included in the first PCB 610.

According to various embodiments (not shown), a power management circuit (for example, the power management circuit 460 of FIG. 4, or the power management circuit 560 of FIG. 5B) may be disposed on or coupled to the second surface 610b of the first PCB 610 through a conductive bonding member (for example, the conductive bonding member 461 of FIG. 4) such as solder, and may be electrically connected with the first PCB 610. The power management circuit may be electrically connected with the communication circuit 640, the connector 691, or various other components (for example, a passive element) disposed on the first PCB 610, through at least one conductive layer included in the first PCB 610.

According to an embodiment, the antenna module 600 may include a conductive cover 651 which is coupled with the first PCB 610 through a conductive bonding member 663 such as solder. The conductive cover 651 may cover at least a portion of the communication circuit 640, and may be electrically connected with the ground plane of the first PCB 610. The conductive cover 651 may reduce an electromagnetic noise from the outside or an electromagnetic noise generated in the antenna module 600 and flowing into the communication circuit 640. According to a certain embodiment, the conductive cover 651 may be referred to as a shielding member or a shield can.

Figure 7:
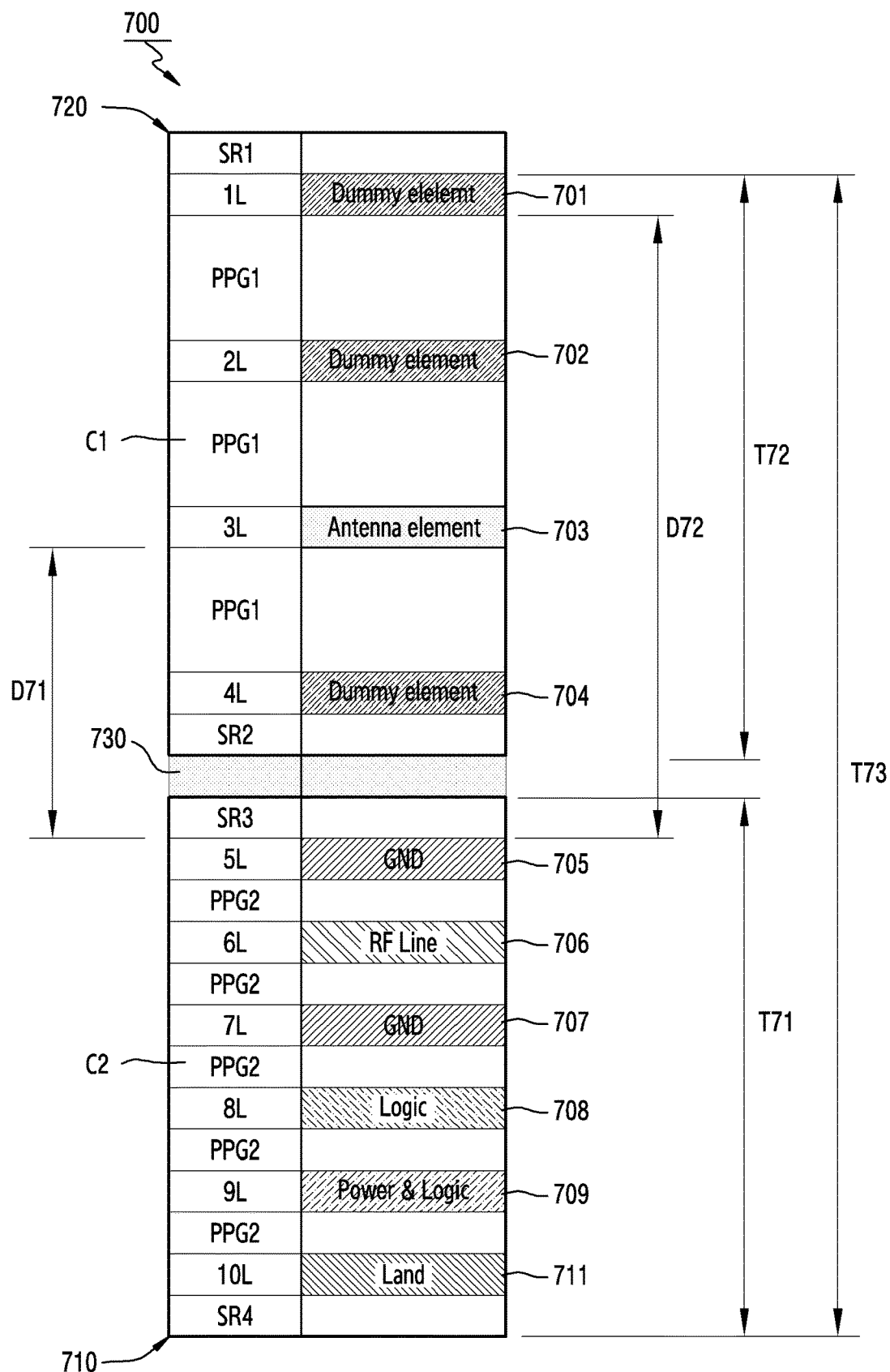
FIG. 7 is a view illustrating a layer structure of an antenna module according to an embodiment.

FIG. 7 is a view illustrating a layer structure (or a stacked-up structure) of an antenna module according to an embodiment.

Referring to FIG. 7, in an embodiment, the antenna module 700 (for example, the antenna module 300 of FIG. 3, the antenna module 400 of FIG. 4, the antenna module 500 of FIG. 5A, or the antenna module 600 of FIG. 6) may include a first PCB 710, a second PCB 720, and conductive bonding members 730 such as solder to electrically and/or mechanically connect the first PCB 710 and the second PCB 720.

According to an embodiment, the second PCB 720 may be a multilayered structure including a plurality of conductive layers 1L, 2L, 3L, 4L, a first insulating material PPG1 disposed between the plurality of conductive layers 1L, 2L, 3L, 4L, and insulating layers SR1, SR2, and may be similar to the second PCB 620 of FIG. 6 at least in part, and a detailed description thereof is omitted. For example, the second PCB 720 may have a structure in which the same number of conductive layers are disposed on both sides with reference to a center base C1.

According to an embodiment, the first conductive layer 1L and/or the fourth conductive layer 4L may have a thickness of about 18 micrometers (um). According to an embodiment, the second conductive layer 2L and/or the third conductive layer 3L may have a thickness of about 15 um. According to an embodiment, a gap between the plurality of conductive layers 1L, 2L, 3L, 4L may be about 150 um. According to an embodiment, the insulating layers SR1, SR2 may have a thickness of about 20 um.

According to an embodiment, the first PCB 710 may be a multilayered structure including a plurality of conductive layers 5L, 6L, 7L, 8L, 9L, 10L, a second insulating material PPG2 disposed between the plurality of conductive layers 5L, 6L, 7L, 8L, 9L, 10L, and insulating layers SR3, SR4, and may be similar to the first PCB 610 of FIG. 6 at least in part, and a detailed description thereof is omitted. For example, the first PCB 710 may have a structure in which the same number of conductive layers are disposed on both sides with reference to a center base C2.

According to an embodiment, the fifth conductive layer 5L and/or the tenth conductive layer 10L may have a thickness of about 18 um. According to an embodiment, the sixth conductive layer 6L, the seventh conductive layer 7L, the eighth conductive layer 8L, and/or the ninth layer 9L may have a thickness of about 15 um. According to an embodiment, a gap between the plurality of conductive layers 5L, 6L, 7L, 8L, 9L, 10L may be about 50 um. According to an embodiment, the insulating layers SR3, SR4 may have a thickness of about 20 um.

According to an embodiment, at least a portion of the conductive bonding members 730 (for example, the conductive bonding members 631, 632, 633 of FIG. 6) may make the first PCB 710 and the second PCB 720 be distanced from each other by a gap of about 150 um, and may electrically connect the fourth conductive layer 4L of the second PCB 720 and the fifth conductive layer 5L of the first PCB 610. According to various embodiments, a portion of the conductive bonding members 730 may be utilized for mechanically coupling rather than for transmitting a signal between the first PCB 710 and the second PCB 720.

According to an embodiment, the second PCB 720 may have a thickness T72 of about 556 um. According to an embodiment, the first PCB 710 may have a thickness T71 of about 386 um. According to an embodiment, the total thickness T73 of the antenna module may be about 1092 um.

According to an embodiment, the second PCB 720 may include a plurality of antenna elements 701, 702, 703, 704 which are implemented by at least a portion of the plurality of conductive layers 1L, 2L, 3L, 4L. For example, the plurality of antenna elements 701, 702, 703, 704 may include a dummy element (for example, a dummy patch) 701 included in the first conductive layer 1L, a dummy element 702 included in the second conductive layer 2L, a dummy element 704 included in the fourth conductive layer 4L, or an antenna element 703 included in the third conductive layer 3L and electrically connected with a communication circuit (for example, the communication circuit 640 of FIG. 6).

According to an embodiment, the fifth conductive layer 5L of the first PCB 710 may include a ground plane (for example, ground (GND)) 705. According to an embodiment, the sixth conductive layer 6L of the first PCB 710 may include a transmission line (for example, an RF line) 706 between the antenna element 703 of the second PCB 720 and the communication circuit (for example, the communication circuit 640 of FIG. 6). According to an embodiment, the seventh conductive layer 7L of the first PCB 710 may include a ground plane 707. According to an embodiment, the eighth conductive layer 8L of the first PCB 710 may include a conductive path 708 related to a logic (for example, a logic regarding a network between the first wireless communication circuit 440 and the second wireless communication module 482 of FIG. 4) regarding the antenna module 700. According to an embodiment, the ninth conductive layer 9L of the first PCB 710 may include a conductive path 709 related to power and a logic regarding the antenna module 700. According to an embodiment, the tenth conductive layer 10L of the first PCB 710 may include a land 711 which is utilized to connect a component such as a communication circuit (for example, the communication circuit 640 of FIG. 6), a connector (for example, the connector 691 of FIG. 6) to the first PCB 710 through a conductive material such as solder.

Radiation characteristics of the antenna module 700 may be determined based on distances between the antenna elements 701, 702, 703, 704 included in the second PCB 720, and the ground plane 705 included in the first PCB 710. According to an embodiment, the antenna element 703 included in the third conductive layer 3L may be spaced apart from the ground plane 705 included in the fifth conductive layer 5L by about 358 um (see D71). According to an embodiment, the dummy element 701 included in the first conductive layer 1L may be spaced apart from the ground plane 705 included in the fifth conductive layer 5L by about 688 um (see D72).

Figure 8:
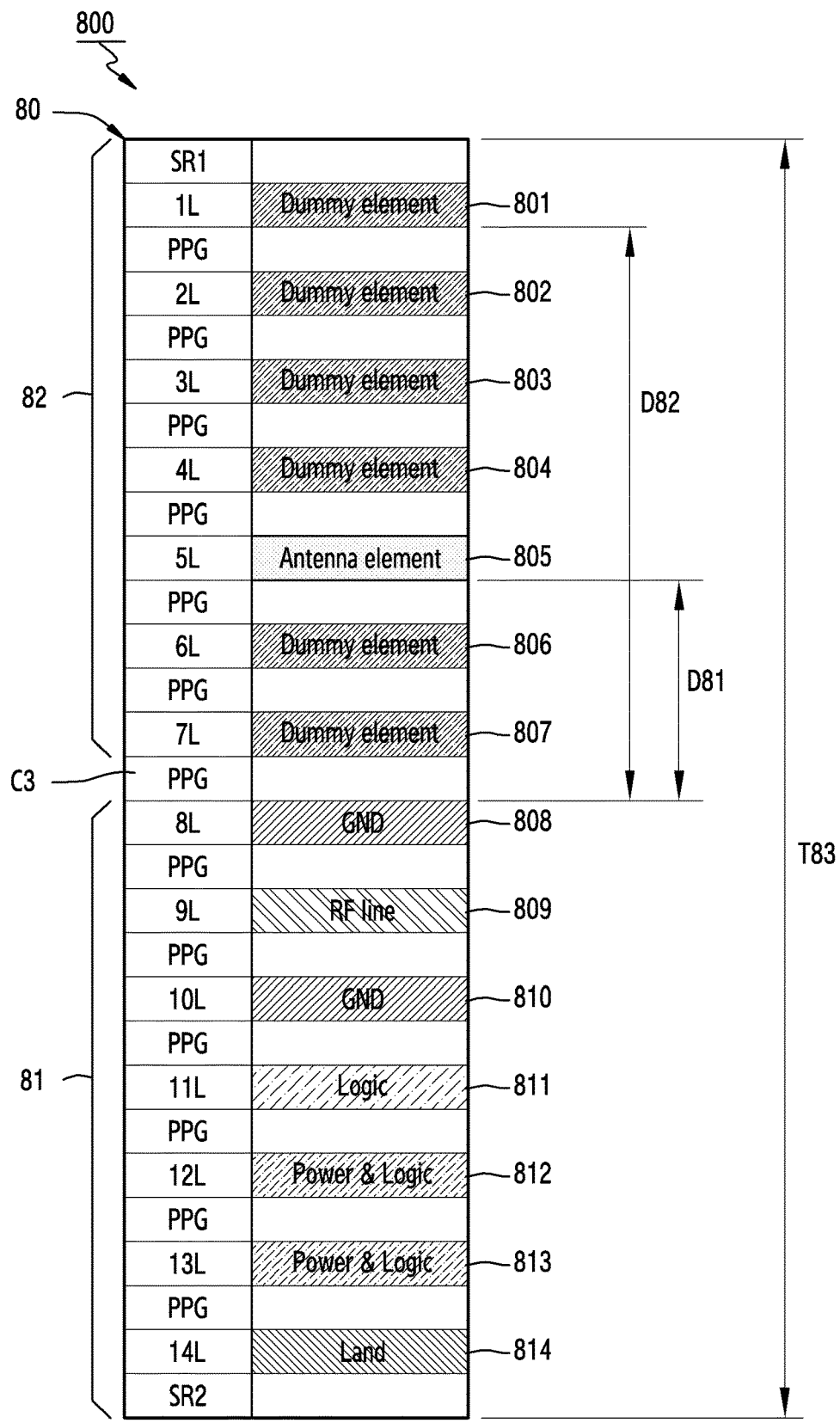
FIG. 8 is a view illustrating a layer structure of an antenna module which is implemented by one PCB.
Figure 9B:
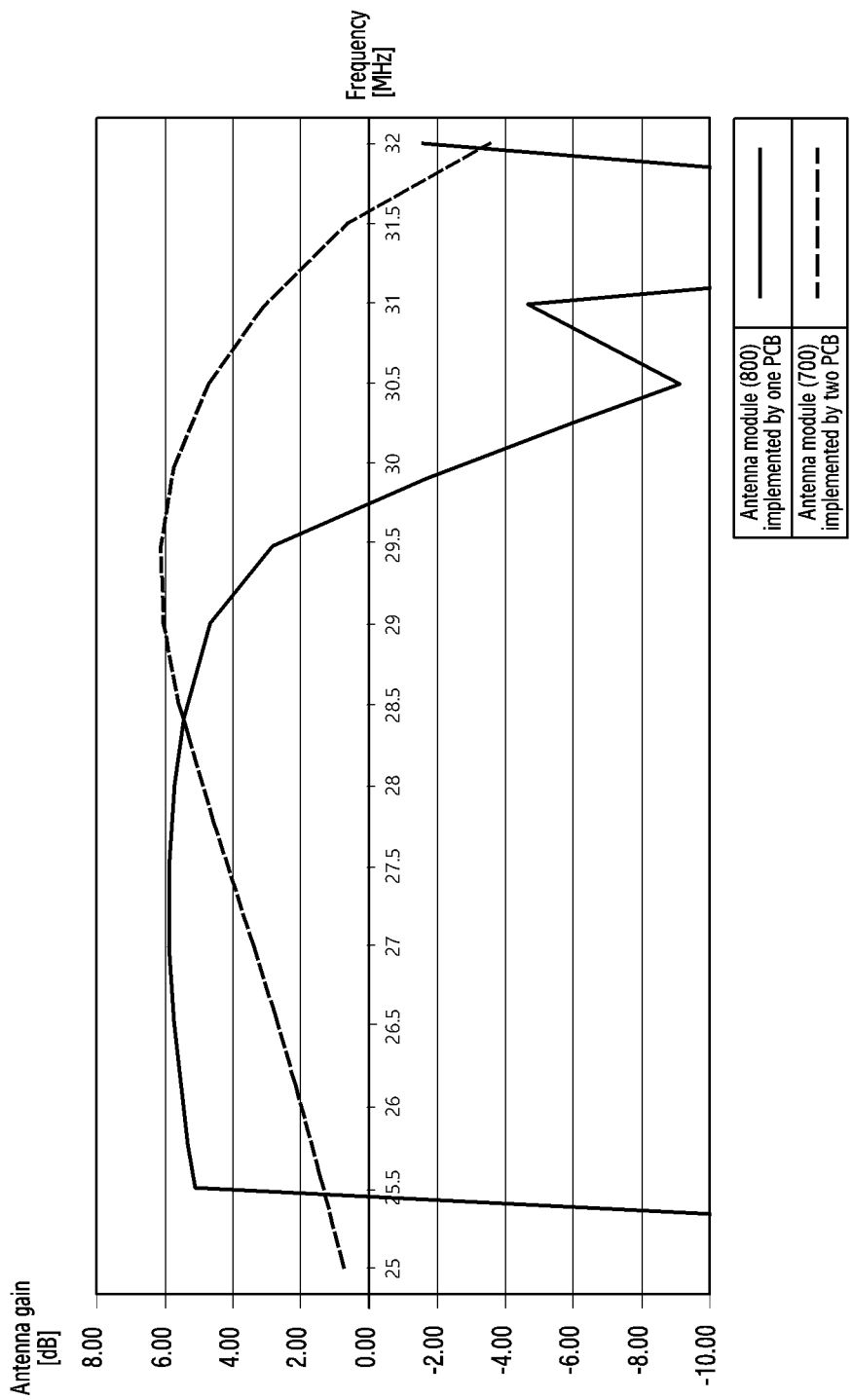
FIG. 9B is a view illustrating a graph thereof.

FIG. 8 is a view illustrating a layer structure of an antenna module which is implemented by one PCB according to an embodiment. FIG. 9A is a table illustrating comparison of the antenna module of FIG. 7 according to an embodiment and the antenna module of FIG. 8 in antenna performance, and FIG. 9B is a graph relating thereto.

The antenna module 800 is merely implemented by one PCB 80 to be compared with the antenna module (for example, the antenna module 300 of FIG. 3, the antenna module 400 of FIG. 4, the antenna module 500 of FIG. 5A or 5B, the antenna module 600 of FIG. 6, or the antenna module 700 of FIG. 7) including two PCBs according to an embodiment, and does not have a position as prior-art technology published before the filing date of the disclosure.

The one PCB 80 is a structure that includes a second laminate portion 82 (for example, an antenna block) including antenna elements 801, 802, 803, 804, 805, 806, 807, and a first laminate portion 81 (for example, a chip block) for mounting a communication circuit (for example, the first wireless communication circuit 340 of FIG. 3), and may be functionally or operatively similar to the antenna module 700 of FIG. 7.

According to an embodiment, the first laminate portion 81 may be implemented to substantially include functions provided by the first PCB 710 of FIG. 7. For example, the first laminate portion 81 may include seven (7) conductive layers 8L, 9L, 10L, 11L, 12L, 13L, 14L to include GNDs (for example, ground planes) 808, 810, an RF line (for example, a transmission line) 809, a conductive path 811 related to a logic, conductive paths 812, 813 related to power and a logic, and a land 814 for mounting components.

According to an embodiment, the PCB 80 may be manufactured to have a structure in which the same number of conductive layers are disposed on both sides with reference to a center base C3, in order to prevent a damage caused by an environment, such as temperature or pressure, applied during a manufacturing process. For example, the one PCB 80 in which the same number of conductive layers are laminated on both sides with reference to the center base C3 may be formed by a manufacturing method which repeats an operation of laminating two conductive layers making a pair on both sides. According to an embodiment, the second laminate portion 82 may include seven (7) conductive layers 1L, 2L, 3L, 4L, 5L, 6L, 7L corresponding to the seven (7) conductive layers 8L, 9L, 10L, 11L, 12L, 13L, 14L included in the first laminate portion 81. For example, the eighth conductive layer 8L and the seventh conductive layer 7L making a pair therewith may be disposed on both sides with reference to the center base C3. In the next manufacturing operation, the ninth conductive layer 9L and the sixth conductive layer 6L making a pair therewith may be disposed on both sides. In the next manufacturing operation, the tenth conductive layer 10L and the fifth conductive layer 5L making a pair therewith may be disposed on both sides. In the next manufacturing operation, the eleventh conductive layer 11L and the fourth conductive layer 4L making a pair therewith may be disposed on both sides. In the next manufacturing operation, the twelfth conductive layer 12L and the third conductive layer 3L making a pair therewith may be disposed on both sides. In the next manufacturing operation, the thirteenth conductive layer 13L and the second conductive layer 2L making a pair therewith may be disposed on both sides. In the next manufacturing operation, the fourteenth conductive layer 14L and the first conductive layer 1L making a pair therewith may be disposed on both sides. In the next manufacturing operation, the insulating layers SR1, SR2 may be disposed on both sides. The PCB 80 may have substantially the same height on both sides with reference to the center base C3. Gaps between the plurality of conductive layers 1L, 2L, 3L, 4L, 5L, 6L, 7L disposed on one side with reference to the center base C3, and gaps between the plurality of conductive layers 8L, 9L, 10L, 11L, 12L, 13L, 14L disposed on the other side may be substantially uniform.

According to an embodiment, the first conductive layer 1L and the fourteenth conductive layer 14L may have a thickness of about 18 um, and the other conductive layers 2L, 3L, 4L, 5L, 6L, 7L, 8L, 9L, 10L, 11L, 12L, 13L may have a thickness of about 15 um, respectively. A gap between the seventh conductive layer 7L and the eighth conductive layer 8L may be about 200 um. The gaps between the plurality of conductive layers 1L, 2L, 3L, 4L, 5L, 6L, 7L disposed on one side with reference to the center base C3, and the gaps between the plurality of conductive layers 8L, 9L, 10L, 11L, 12L, 13L, 14L disposed on the other side with reference to the center base C3 may be about 50 um. The insulating layers SR1, SR2 may have a thickness of about 20 um. According to an embodiment, the total thickness of the PCB 80 may be about 1056 um (see T83).

Referring to FIGS. 7 and 8, the second laminate portion 82 included in the PCB 80 of FIG. 8 may be formed to have the same number of conductive layers as in the first laminate portion 81 to prevent a damage to the PCB during a manufacturing process. However, in the antenna module 700 of FIG. 7, the second PCB 720 may be manufactured separately from the first PCB 710, and then, may be connected with the first PCB 710. The antenna module of FIG. 7 can enhance the degree of design freedom of the second PCB 720 including antenna elements, in comparison with the second laminate portion 82 included in the one PCB 80 of FIG. 8. The antenna module 700 of FIG. 7 can enhance the degree of design freedom of the first PCB 710 having components such as a communication circuit (for example, the first wireless communication circuit 340 of FIG. 3) mounted thereon, in comparison with the first laminate portion 81 included in the one PCB 80 of FIG. 8.

According to an embodiment, the antenna module 700 of FIG. 7 can reduce the number of conductive layers in comparison with the antenna module 800 of FIG. 8. For example, the number of conductive layers (for example, 10 conductive layers) included in the antenna module 700 of FIG. 7 may be smaller than the number of conductive layers (for example, 14 conductive layers) included in the antenna module 800 of FIG. 8, and this can enhance slimness of the antenna module.

According to an embodiment, the antenna module 700 of FIG. 7 can enhance the degree of design freedom regarding antenna radiation characteristics in comparison with the antenna module 800 of FIG. 8. For example, regarding the antenna radiation characteristics, the distance D71 (for example, about 358 um) between the antenna element 703 and the ground plane 705 in the antenna module 700 of FIG. 7 may be larger than a distance (D81) (for example, about 330 um) between the antenna element 805 and the ground plane 808 in the antenna module 800 of FIG. 8. For example, regarding the antenna radiation characteristics, the distance D72 (for example, about 688 um) between the dummy element 701 and the ground plane 705 in the antenna module 700 of FIG. 7 may be larger than a distance D82 (for example, about 590 um) between the dummy element 801 and the ground plane 808 in the antenna module 800 of FIG. 8.

According to an embodiment, the antenna module 700 of FIG. 7 may be relatively more advantageous to guaranteeing antenna characteristics than the antenna module 800 of FIG. 8. Referring to FIGS. 9A and 9B, the antenna module 700 of FIG. 7 may have a relatively high antenna gain in a frequency band from about 28.5 GHz to about 31.5 GHz, compared to the antenna module 800 of FIG. 8.

Figure 10:
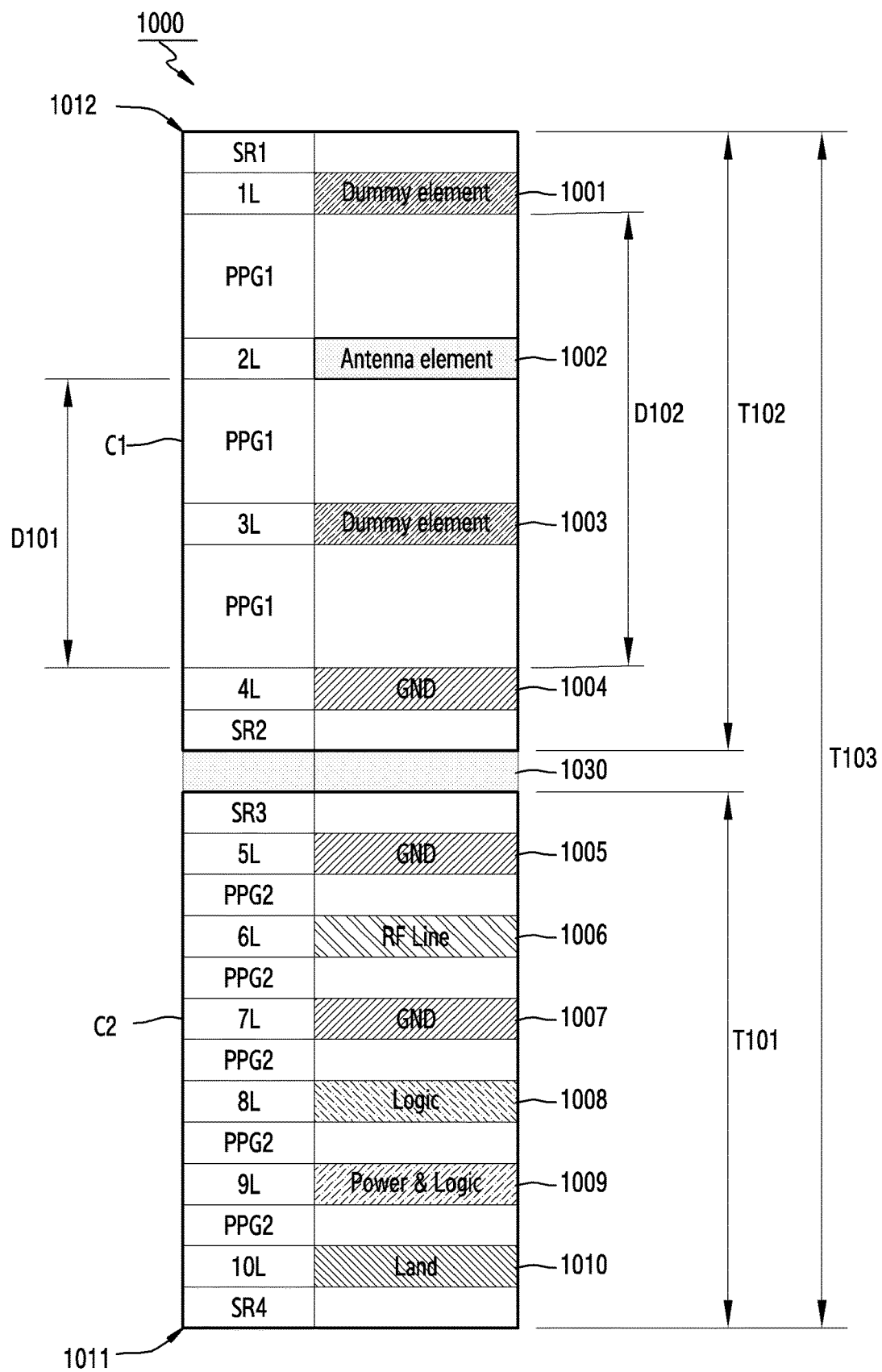
FIG. 10 is a view illustrating a layer structure of an antenna module according to various embodiments.

FIG. 10 is a view illustrating a layer structure of an antenna module according to various embodiments.

Referring to FIG. 10, in an embodiment, the antenna module 1000 (for example, the antenna module 300 of FIG. 3, the antenna module 400 of FIG. 4, the antenna module 500 of FIG. 5A, or the antenna module 600 of FIG. 6) may include a first PCB 1011, a second PCB 1012, and conductive bonding members 1013 such as solder to electrically and/or mechanically connect the first PCB 1011 and the second PCB 1012.

According to an embodiment, the second PCB 1012 is a multilayered structure that includes a plurality of conductive layers 1L, 2L, 3L, 4L, a first insulating material PPG1 disposed between the plurality of conductive layers 1L, 2L, 3L, 4L, and insulating layers SR1, SR2, and may be similar to the second PCB 620 of FIG. 6 at least in part, and a detailed description thereof is omitted. For example, the second PCB 1012 may have a structure in which the same number of conductive layers are disposed on both sides with reference to the center base C1.

According to an embodiment, the first conductive layer 1L and/or the fourth conductive layer 4L may have a thickness of about 18 um. According to an embodiment, the second conductive layer 2L and/or the third conductive layer 3L may have a thickness of about 15 um. According to an embodiment, a gap between the plurality of conductive layers 1L, 2L, 3L, 4L may be about 150 um. According to an embodiment, the insulating layers SR1, SR2 may have a thickness of about 20 um.

According to an embodiment, the first PCB 1011 is a multilayered structure that includes a plurality of conductive layers 5L, 6L, 7L, 8L, 9L, 10L, a second insulating material PPG2 disposed between the plurality of conductive layers 5L, 6L, 7L, 8L, 9L, 10L, and insulating layers SR3, SR4, and may be similar to the first PCB 610 of FIG. 6 at least in part, and a detailed description thereof is omitted. For example, the first PCB 1011 may have a structure in which the same number of conductive layers are disposed on both sides with reference to the center base C2.

According to an embodiment, the fifth conductive layer 5L and/or the tenth conductive layer 10L may have a thickness of about 18 um. According to an embodiment, the sixth conductive layer 6L, the seventh conductive layer 7L, the eighth conductive layer 8L, and/or the ninth conductive layer 9L may have a thickness of about 15 um. According to an embodiment, a gap between the plurality of conductive layers 5L, 6L, 7L, 8L, 9L, 10L may be about 50 um. According to an embodiment, the insulating layers SR3, SR4 may have a thickness of about 20 um.

According to an embodiment, the conductive bonding members 1013 (for example, the conductive bonding member 330 of FIG. 3 or the conductive bonding members 631, 632, 633 of FIG. 6) may make the first PCB 1011 and the second PCB 1012 be spaced apart from each other by a gap of about 150 um, and may electrically connect the fourth conductive layer 4L of the second PCB 1012 and the fifth conductive layer 5L of the first PCB 1011.

According to an embodiment, the second PCB 1012 may have a thickness T102 of about 706 um. According to an embodiment, the first PCB 1011 may have a thickness T101 of about 386 um. According to an embodiment, the total thickness T103 of the antenna module 1000 may be about 1242 um.

According to an embodiment, the second PCB 1012 may include a plurality of antenna elements 1001, 1002, 1003, 1004 which are implemented by at least a portion of the plurality of conductive layers 1L, 2L, 3L, 4L. For example, the plurality of antenna elements 1001, 1002, 1003, 1004 may include a dummy element (for example, a dummy patch) 1001 included in the first conductive layer 1L, a dummy element 1003 included in the third conductive layer 3L, a dummy element 1004 included in the fourth conductive layer 4L, or an antenna element 1002 which is included in the second conductive layer 2L and is electrically connected with a communication circuit (for example, the communication circuit 640 of FIG. 6).

According to an embodiment, the fifth conductive layer 5L of the first PCB 1011 may include a ground plane (for example, ground (GND)) 1005. According to an embodiment, the sixth conductive layer 6L of the first PCB 1011 may include a transmission line (for example, an RF line) 1006 between the antenna element 1003 of the second PCB 1012 and a communication circuit (for example, the communication circuit 640 of FIG. 6). According to an embodiment, the seventh conductive layer 7L of the first PCB 1011 may include a ground plane 1007. According to an embodiment, the eighth conductive layer 8L of the first PCB 1011 may include a conductive path 1008 related to a logic (for example, a logic regarding a network between the first wireless communication circuit 440 and the second wireless communication module 482 of FIG. 4) regarding the antenna module 1000. According to an embodiment, the ninth conductive layer 9L of the first PCB 1011 may include a conductive path 1009 related to power and a logic regarding the antenna module 1000. According to an embodiment, the tenth conductive layer 10L of the first PCB 1011 may include a land 1010 which is utilized when components such as a communication circuit (for example, the communication circuit 640 of FIG. 6), a connector (for example, the connector 691 of FIG. 6) are disposed on the first PCB 1011 through a conductive material such as solder.

Radiation characteristics of the antenna module 1000 may be determined based on distances between the antenna elements 1001, 1002, 1003, 1004 included in the second PCB 1012, and the ground plane 1004 included in the second PCB 1011. According to an embodiment, the antenna element 1002 included in the second conductive layer 2L may be spaced apart from the ground plane 1004 included in the fourth conductive layer 4L by about 415 um (see D101). According to an embodiment, the dummy element 1001 included in the first conductive layer 1L may be spaced apart from the ground plane 1004 included in the fourth conductive layer 4L by about 630 um (see D102).

According to an embodiment, in the antenna module 1000 of FIG. 10, the second PCB 1012 may be manufactured separately from the first PCB 1011, and then, may be connected with the first PCB 1011. For example, the antenna module 1000 of FIG. 10 can enhance the degree of design freedom of the second PCB 1012 including antenna elements, in comparison with the second laminate portion 82 included in one PCB 80 of FIG. 8. For example, the antenna module 1000 of FIG. 10 can enhance the degree of design freedom of the first PCB 1011 having a component such as a communication circuit (for example, the first wireless communication circuit 340 of FIG. 3) mounted thereon, in comparison with the first laminate portion 81 included in one PCB 80 of FIG. 8.

Figure 11:
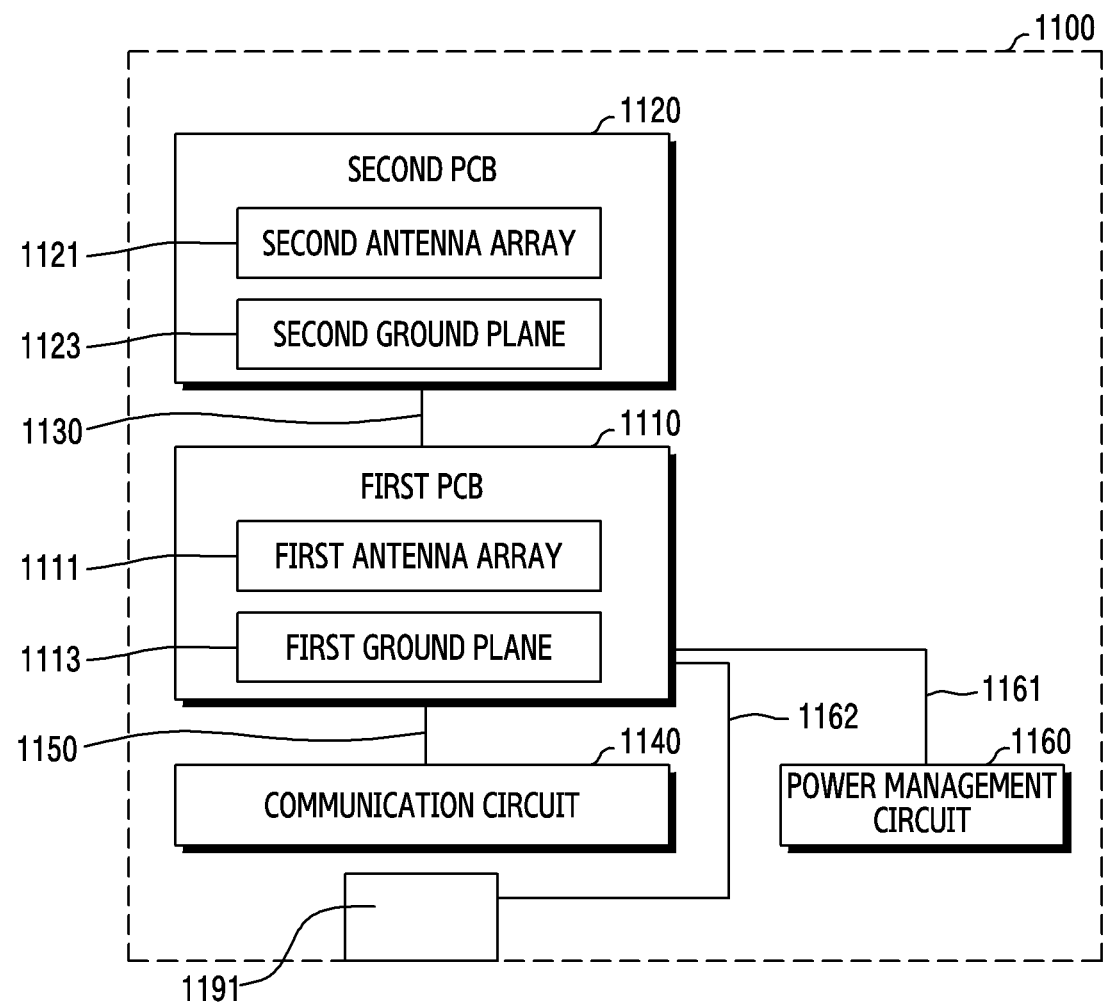
FIG. 11 is a block diagram of an antenna module according to various embodiments.

FIG. 11 is a block diagram of an antenna module according to various embodiments.

Referring to FIG. 11, in an embodiment, the antenna module 1100 may include at least one of a first PCB 1110, a second PCB 1120, a communication circuit (or a wireless communication circuit) 1140 (for example, the first wireless communication circuit 440 of FIG. 4), a power management circuit 1160 (for example, the power management circuit 460 of FIG. 4), or a connector 1191 (for example, the first connector 491 of FIG. 4).

According to an embodiment, the second PCB 1120 may include at least one antenna, and for example, may include a second antenna array 1121. The second antenna array 1121 may include at least a portion of a plurality of conductive layers (for example, a plurality of conductive pattern layers or a plurality of circuit layers) included in the second PCB 1120. According to an embodiment, the plurality of antenna elements included in the second antenna array 1121 may include, for example, patch antennas.

According to an embodiment, the first PCB 1110 may include at least one antenna, and for example, may include a first antenna array 1111. The first antenna array 1111 may include at least a portion of a plurality of conductive layers included in the first PCB 1110. According to an embodiment, a plurality of antenna elements included in the first antenna array 1111 may include, for example, dipole antennas.

According to an embodiment, a portion of the plurality of antenna elements of the second antenna array 1121 may be electrically connected with the communication circuit 1140 through the first PCB 1110. A portion of the plurality of antenna elements of the second antenna array 1121 may be utilized as a dummy element (for example, a dummy antenna). The dummy element may be physically separated from other conductive elements to be in an electrically floating state. The dummy element may be electromagnetically coupled with an antenna element electrically connected with the communication circuit 1140 to adjust radiation characteristics. For example, the dummy element may shift a resonant frequency to a designated frequency, or may shift the resonant frequency as much as designated. For example, the dummy element can enhance antenna performance by reducing an electromagnetic noise. According to various embodiments, the dummy element provides a uniform thermal expansion coefficient when the second PCB 1120 is manufactured, so that warpage of the PCB caused by heat of high temperature can be prevented.

According to an embodiment, at least a portion of the plurality of antenna elements of the first antenna array 1111 may be electrically connected with the communication circuit 1140 through a conductive path included in the first PCB 1110.

According to an embodiment, at least a portion of the plurality of conductive layers included in the first PCB 1110 or the second PCB 1120 may include a ground plane (not shown). The ground plane may block an electromagnetic noise on a flow of a signal or power in the first PCB 1110 or the second PCB 1120. According to an embodiment, the first PCB 1110 may include at least one first ground plane 1113 related to radiation characteristics of the first antenna array 1111 or the second antenna array 1121. According to an embodiment, the second PCB 1120 may include at least one second ground plane 1123 related to radiation characteristics of the first antenna array 1111 or the second antenna array 1121. According to various embodiments, the first ground plane 1113 and the second ground plane 1123 may be electrically connected through a conductive bonding member 1130 such as solder. According to a certain embodiment, as a ground plane related to radiation characteristics of the antenna module 1100, one of the first ground plane 1113 and the second ground plane 1123 may be omitted.

According to an embodiment, the second PCB 1120 may be disposed to overlap the first PCB 1110 at least in part. The conductive bonding member 1130 (for example, the conductive bonding member 330 of FIG. 3, or the conductive bonding member 430 of FIG. 4) may be disposed between the first PCB 1110 and the second PCB 1120, and may electrically and/or mechanically connect the first PCB 1110 and the second PCB 1120. According to an embodiment, the first PCB 1110 or the secondo PCB 1120 may be implemented by a multilayered structure including a plurality of conductive layers and an insulating material (for example, a prepreg) disposed between the plurality of conductive layers.

According to an embodiment, the first PCB 1110 may include a plurality of conductive layers which are formed based on an FCCL. A flexible laminate portion (not shown) including the plurality of conductive layers formed based on the FCCL may include a first area (not shown) that overlaps the second PCB 1120 and a second area (not shown) that does not overlap the second PCB 1120. According to an embodiment, the second area may include the first antenna array 1111. According to an embodiment, the second PCB 1120 may be formed based on a substantially rigid CCL. According to a certain embodiment, the second PCB 1120 may be formed based on an FCCL.

According to an embodiment, the first PCB 1110 may include a plurality of conductive layers which are formed based on a substantially rigid CCL. According to an embodiment, the plurality of conductive layers formed based on the FCCL may be disposed between the plurality of conductive layers formed based on the rigid CCL.

According to an embodiment, the communication circuit 1140 may be disposed on or coupled to the first PCB 1110 through a conductive bonding member 1150 such as solder, and may be electrically connected with the first PCB 1110. For example, the first PCB 1110 may be disposed between the second PCB 1120 and the communication circuit 1140.

According to an embodiment, the communication circuit 1140 may transmit or receive a signal of a corresponding frequency band through the first antenna array 1111 and/or the second antenna array 1121, and is substantially similar to or the same as the first wireless communication circuit 440 of FIG. 4 and thus a detailed description thereof is omitted. For example, the antenna module 1100 of FIG. 11 may be substituted for the antenna module 400 of FIG. 4, and the communication circuit 1140 of the antenna module 1100 may exchange a signal of a corresponding frequency band with a wireless communication module (for example, the wireless communication module 480 of FIG. 4) through the connector 1191 (for example, the first connector 491 of FIG. 4) disposed on the first PCB 1110.

According to an embodiment, the connector 1191 (for example, the first connector 491 of FIG. 4) may be disposed on or coupled to the first PCB 1110 through a conductive bonding member 1162 (for example, the conductive bonding member 462 of FIG. 4) such as solder, and may be electrically connected with the first PCB 1110. At least a portion of the plurality of conductive layers included in the first PCB 1110 may include a conductive path to electrically connect the connector 1191 and the communication circuit 1140.

According to an embodiment, the power management circuit 1160 (for example, the power management circuit 460 of FIG. 4) may be disposed on or coupled to the first PCB 1110 through a conductive bonding member 1161 (for example, the conductive bonding member 461 of FIG. 4) such as solder, and may be electrically connected with the first PCB 1110. According to an embodiment, at least a portion of the plurality of conductive layers included in the first PCB 1110 may include a conductive path to electrically connect the communication circuit 1140 and the power management circuit 1160. According to an embodiment, at least a portion of the plurality of layers included in the first PCB 1110 may include a conductive path to connect the connector 1191 and the power management circuit 1160.

According to a certain embodiment, the power management circuit 1160 may be omitted from the antenna module 1100.

Figure 12A:
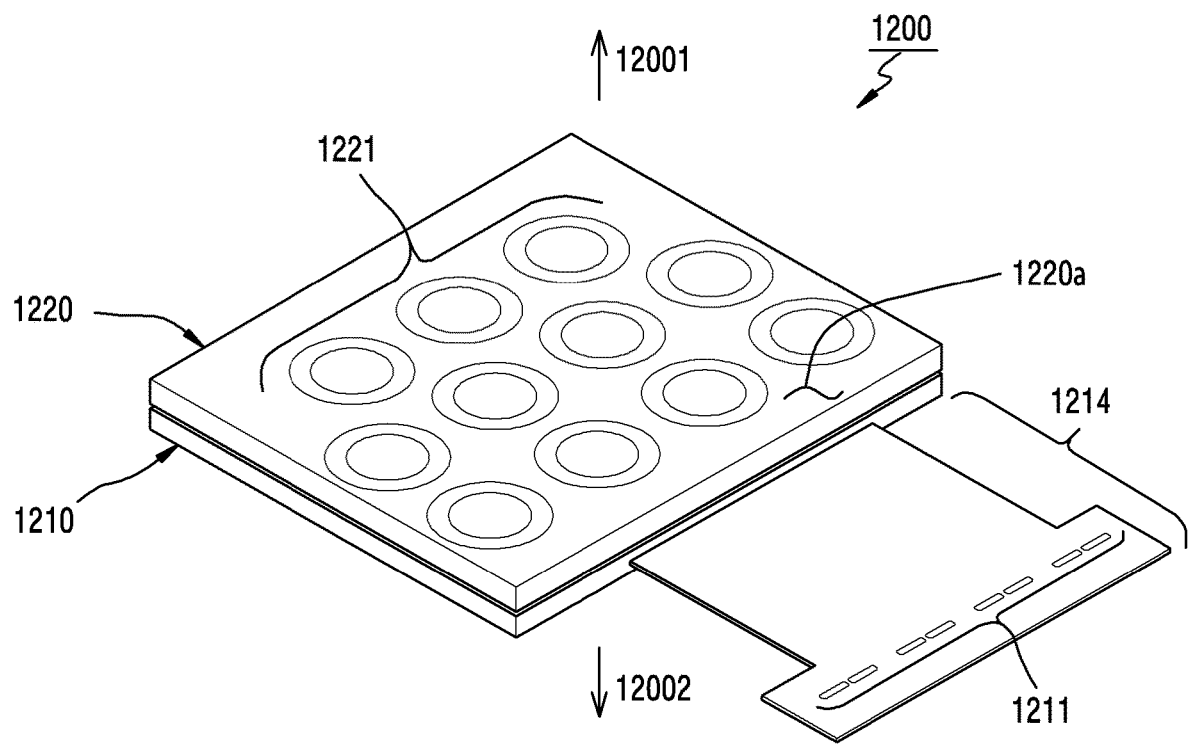
FIG. 12A is a perspective view of a front surface of an antenna module according to an embodiment.
Figure 12B:
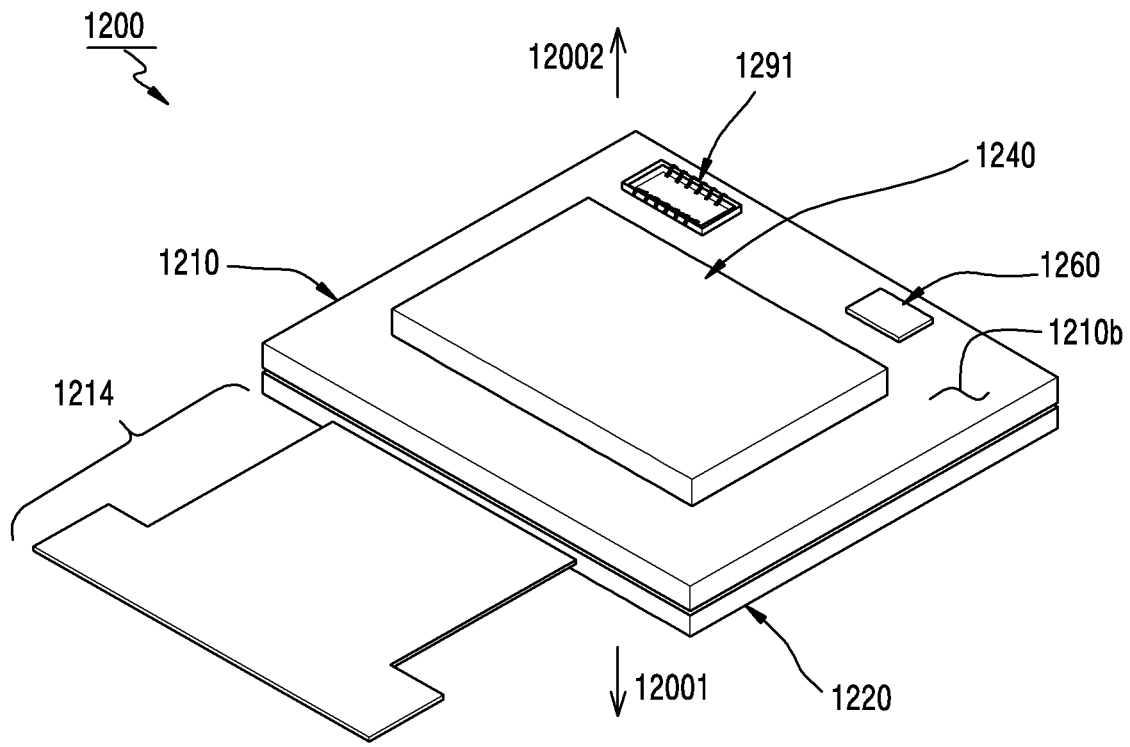
FIG. 12B is a perspective view of a rear surface of the antenna module according to an embodiment.

FIG. 12A is a perspective view of a front surface of an antenna module according to an embodiment. FIG. 12B is a perspective view of a rear surface of the antenna module according to an embodiment.

Referring to FIGS. 12A and 12B, in an embodiment, the antenna module 1200 (for example, the antenna module 1100 of FIG. 11) may include at least one of a first PCB 1210 (for example, the first PCB 1110 of FIG. 11), a second PCB 1220 (for example, the second PCB 1120 of FIG. 11), a communication circuit 1240 (for example, the communication circuit 1140 of FIG. 11), a power management circuit 1260 (for example, the power management circuit 1160 of FIG. 11), or a connector 1291 (for example, the connector 1191 of FIG. 11).

According to an embodiment, the second PCB 1220 may include a second antenna array 1221 (for example, the second antenna array 1121 of FIG. 11). According to an embodiment, the second antenna array 1121 may include a plurality of antenna elements (for example, 571, 572, 573, 574, 575, 576, 577, 578, 579) which are implemented by at least a portion of the plurality of conductive layers of the second PCB 1220.

According to an embodiment, the second PCB 1220 may include a third surface 1220a which faces in a first direction 12001, and a fourth surface (not shown) which faces in a second direction 12002 opposite to the first direction 12001 and is opposite the first PCB 1210. The first PCB 1210 may include, for example, a first surface (not shown) which faces in the first direction 12001 and is opposite the fourth surface of the second PCB 1220, and a second surface 1210b which faces in the second direction 12002. A conductive bonding member (for example, the conductive bonding member 1130 of FIG. 11) such as solder may be disposed between the first surface of the first PCB 1210 and the fourth surface of the second PCB 1220, and may electrically and/mechanically connect the first PCB 1210 and the second PCB 1220.

According to an embodiment, the first PCB 1210 may include a plurality of conductive layers which are formed based on an FCCL. A flexible laminate portion (not shown) including the plurality of conductive layers formed based on the FCCL may include a first area (not shown) that overlaps the second PCB 1220, and a second area 1214 that does not overlap the second PCB 1220.

According to an embodiment, the second area 1214 may include a first antenna array 1211 (for example, the first antenna array 1111 of FIG. 11). The first antenna array 1211 may include a plurality of antenna elements (for example, dipole antennas) which are implemented by at least a portion of the plurality of conductive layers of the first PCB 1210, and for example, may be implemented by a structure including a first antenna element, a second antenna element, a third antenna element, and/or a fourth antenna element like the antenna element 582*d* of FIG. 5C.

According to an embodiment, the first PCB 1210 may include a plurality of conductive layers which are formed based on a substantially rigid CCL. According to an embodiment, the plurality of conductive layers formed based on the FCCL may be disposed between the plurality of conductive layers which are formed based on the rigid CCL.

According to an embodiment, the second PCB 1220 may be formed based on a substantially rigid CCL.

According to an embodiment, the communication circuit 1240 may be disposed on or coupled to the second surface 1210*b* of the first PCB 1210 through a conductive bonding member (for example, the conductive bonding member 1150 of FIG. 11) such as solder, and may be electrically connected with the first PCB 1210. The communication circuit 1240 may be electrically connected with the first antenna array 1211 and/or the second antenna array 1221.

According to an embodiment, the power management circuit 1260 may be disposed on or coupled to the second surface 1210*b* of the first PCB 1210 through a conductive bonding member (for example, the conductive bonding member 1161 of FIG. 11) such as solder, and may be electrically connected with the first PCB 1210. The power management circuit 1260 may be electrically connected with the communication circuit 1240, the connector 1291, or various other components (for example, a passive element) disposed on the first PCB 1210 through at least one conductive layer included in the first PCB 1210.

According to a certain embodiment, the power management circuit 1260 may be omitted from the antenna module 1200.

According to an embodiment, the connector 1291 may be disposed on or coupled to the second surface 1210*b* of the first PCB 1210 through a conductive bonding member (for example, the conductive bonding member 1162 of FIG. 11) such as solder, and may be electrically connected with the first PCB 1210. The connector 1291 may be electrically connected with the communication circuit 1240, the power management circuit 1260, or various other components disposed on the first PCB 1210 through at least one conductive layer included in the first PCB 1210.

Figure 13:
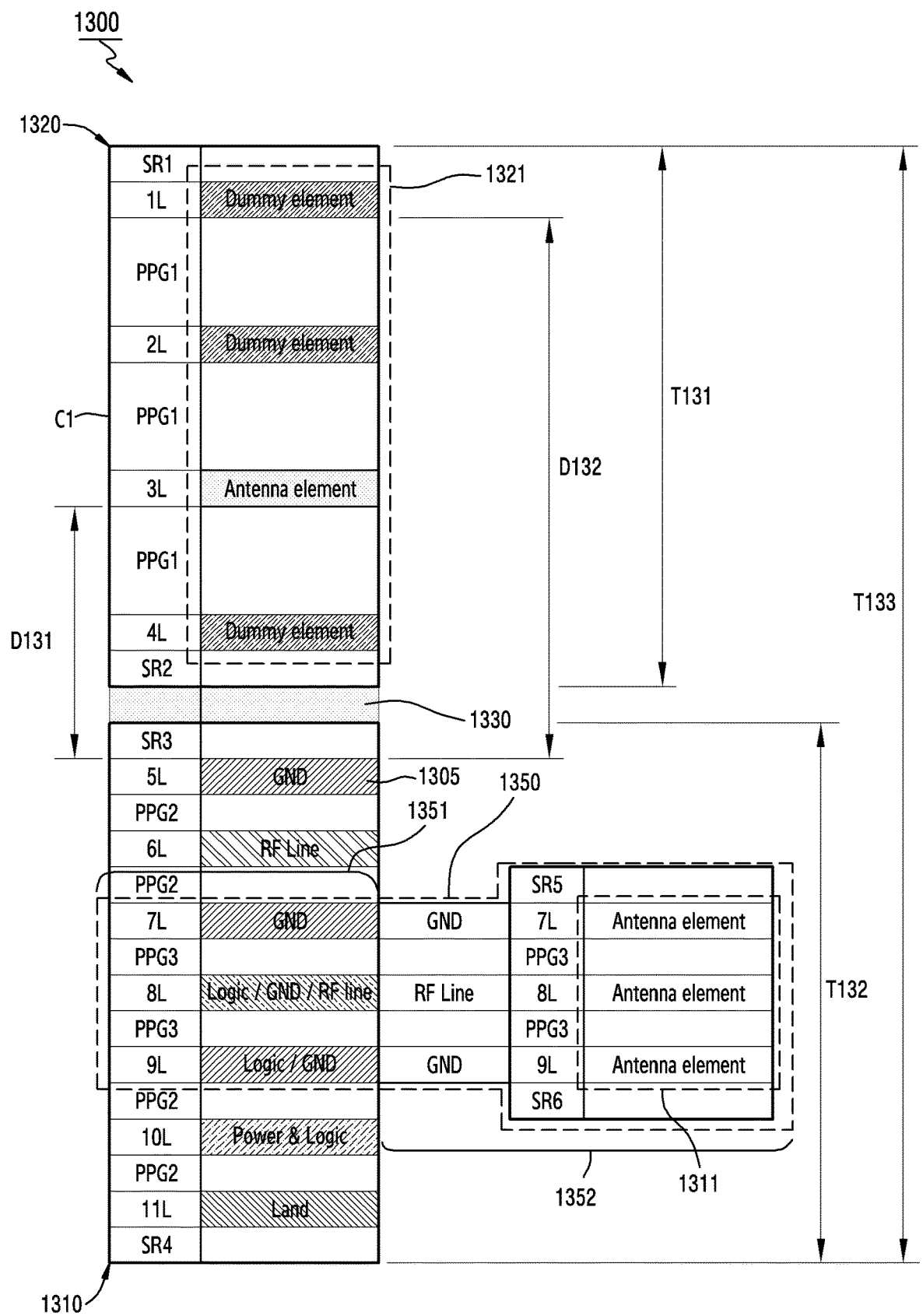
FIG. 13 is a view illustrating a layer structure of an antenna module according to an embodiment.

FIG. 13 is a view illustrating a layer structure of an antenna module according to an embodiment.

Referring to FIG. 13, in an embodiment, the antenna module 1300 (for example, the antenna module 1100 of FIG. 11, or the antenna module 1200 of FIG. 12A) may include a first PCB 1310, a second PCB 1320, and a conductive bonding member 1330 such as solder which electrically connects the first PCB 1310 and the second PCB 1320.

According to an embodiment, the second PCB 1320 is a multilayered structure that includes a plurality of conductive layers 1L, 2L, 3L, 4L, a first insulating material PPG1 disposed between the plurality of conductive layers 1L, 2L, 3L, 4L, and insulating layers SR1, SR2, and may be similar to the second PCB 620 at least in part, and a detailed description thereof is omitted. For example, the second PCB 1320 may have a structure in which the same number of conductive layers are disposed on both sides with reference to a center base C1.

According to an embodiment, the first conductive layer 1L and/or the fourth conductive layer 4L may have a thickness of about 18 um. According to an embodiment, the second conductive layer 2L and/or the third conductive layer 3L may have a thickness of about 15 um. According to an embodiment, a gap between the plurality of conductive layers 1L, 2L, 3L, 4L may be about 150 um. According to an embodiment, the insulation layers SR1, SR2 may have a thickness of about 20 um.

According to an embodiment, the first PCB 1310 may include a multilayered structure that includes a plurality of conductive layers 5L, 6L, 7L, 8L, 9L, 10L, 11L, insulating materials PPG2, PPG3 disposed between the plurality of conductive layers 5L, 6L, 7L, 8L, 9L, 10L, 11L, and insulating layers SR3, SR4, SR5, SR6. According to an embodiment, the first PCB 1310 may include a flexible laminate portion 1350 that includes the plurality of conductive layers 7L, 8L, 9L formed based on an FCCL. According to an embodiment, the first PCB 1310 may have a structure in which the same number of conductive layers are disposed on both sides with reference to the flexible laminate portion 1350.

According to an embodiment, the fifth conductive layer 5L, the sixth conductive layer 6L, the tenth conductive layer 10L, or the eleventh conductive layer 11L which are disposed on both sides with reference to the flexible laminate portion 1350 may be formed based on a rigid CCL.

According to an embodiment, the tenth conductive layer 10L and/or the eleventh conductive layer 11L may have a thickness of about 18 um. According to an embodiment, the fifth conductive layer 5L, the sixth conductive layer 6L, the seventh conductive layer 7L, the eighth conductive layer 8L, and/or the ninth conductive layer 9L may have a thickness of about 15 um. According to an embodiment, a gap between the plurality of conductive layers 5L, 6L, 7L, 8L, 9L, 10L, 11L may be about 50 um. According to an embodiment, the insulating layers SR3, SR4 may have a thickness of about 20 um.

According to an embodiment, the flexible laminate portion 1350 of the first PCB 1310 may include a first area 1351 that overlaps the second PCB 1320, and a second area 1352 (for example, the second area 1214 of FIG. 12A) that does not overlap the second PCB 1320.

According to an embodiment, the conductive bonding member 1330 (for example, the conductive bonding member 1130 of FIG. 11) may make the first PCB 1310 and the second PCB 1320 be spaced apart from each other by a gap of about 150 um, and may electrically connect the fourth conductive layer 4L of the second PCB 1310 and the fifth conductive layer 5L of the first PCB 1310.

According to an embodiment, the second PCB 1320 may have a thickness T131 of about 556 um. According to an embodiment, the first PCB 1310 may have a thickness T132 of about 451 um. According to an embodiment, the total thickness T133 of the antenna module 1300 may be about 1157 um.

According to an embodiment, the second PCB 1320 may include a plurality of antenna elements 1321 (for example, the second antenna array 1121 of FIG. 11) which are implemented by at least a portion of the plurality of conductive layers 1L, 2L, 3L, 4L. For example, the plurality of antenna elements 1321 may include a dummy element included in the first conductive layer 1L, a dummy element included in the second conductive layer 2L, a dummy element included in the fourth conductive layer 4L, or an antenna element included in the third conductive layer 3L and electrically connected with a communication circuit (for example, the communication circuit 1140 of FIG. 11).

According to an embodiment, the fifth conductive layer 5L of the first PCB 1310 may include a ground plane (for example, GND) 1305. According to an embodiment, the sixth conductive layer 6L of the first PCB 1310 may include a transmission line (for example, an RF line). According to an embodiment, the seventh conductive layer 7L of the first PCB 1310 may include a ground plane. According to an embodiment, the eighth conductive layer 8L of the first PCB 1310 may include a conductive path related to a logic, a ground plane, and/or a transmission line regarding the antenna module 1300. According to an embodiment, the ninth conductive layer 9L of the first PCB 1310 may include a conductive path related to a logic regarding the antenna module 1300, and/or a ground plane. According to an embodiment, the tenth conductive layer 10L of the first PCB 1310 may include a conductive path related to power and a logic regarding the antenna module 1300. According to an embodiment, the eleventh conductive layer 11L of the first PCB 1310 may include a land which is utilized when components such as a communication circuit (for example, the communication circuit 1240 of FIG. 12B), a connector (for example, the connector 1291 of FIG. 12B) are disposed on the first PCB 1310 by using a conductive material such as solder.

According to an embodiment, the first PCB 1310 may include a plurality of antenna elements 1311 (for example, the first antenna array 1111 of FIG. 11) which are implemented by at least a portion of the plurality of conductive layers 7L, 8L, 9L included in the second area 1352 (for example, the second area 1214 of FIG. 12A) of the flexible laminate portion 1350.

Radiation characteristics of the antenna module 1300 may be determined, for example, based on distances between the antenna elements included in the second PCB 1320 and the ground plane 1305 included in the first PCB 1310. According to an embodiment, the antenna element included in the third conductive layer 3L may be spaced apart from the ground plane 1205 included in the fifth conductive layer 5L by about 358 um (see D131). According to an embodiment, the dummy element included in the first conductive layer 1L may be spaced apart from the ground plane 1205 included in the fifth conductive layer 5L by about 688 um (see D132).

Figure 14:
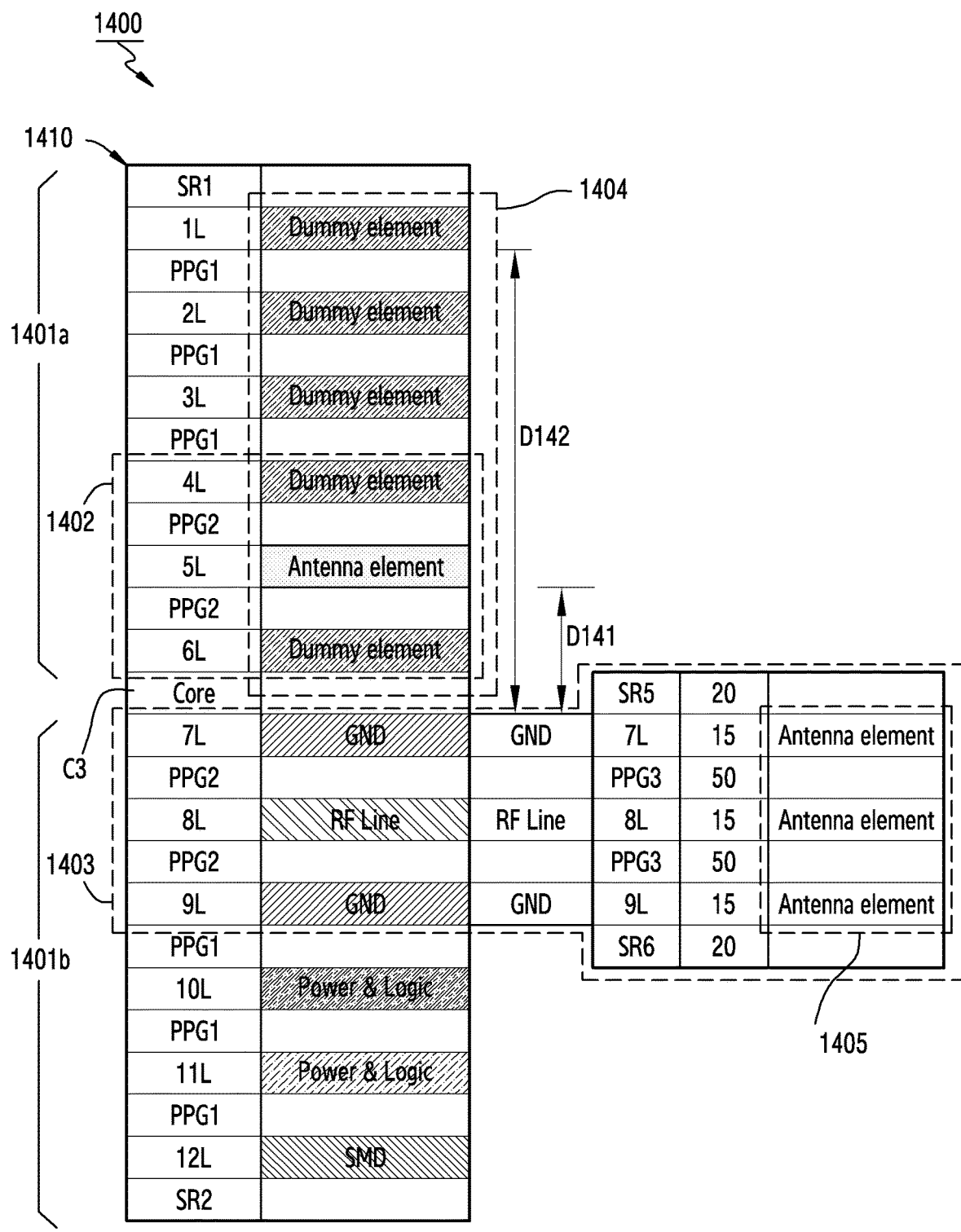
FIG. 14 is a view illustrating a layer structure of an antenna module which is implemented by one PCB according to an embodiment.

FIG. 14 is a view illustrating a layer structure of an antenna module which is implemented by one PCB according to an embodiment.

The antenna module 1400 is merely implemented by one PCB 1410 to be compared with an antenna module (for example, the antenna module 1300 of FIG. 13) including two PCBs according to an embodiment of the disclosure, and does not have a position as prior-art technology published before the filing date of the disclosure.

The one PCB 1410 may be a structure that includes a second laminate portion 1401a (for example, an antenna block) including antenna elements 1404, and a first laminate portion 1401b (for example, a chip block) for mounting a communication circuit (for example, the communication circuit 1140 of FIG. 11), and may be functionally or operatively similar to the antenna module 1300 of FIG. 13.

According to an embodiment, the first laminate portion 1401b may be implemented to substantially include functions provided by the first PCB 1310 of FIG. 13. For example, the first laminate portion 1401b may include six (6) conductive layers 7L, 8L, 9L, 10L, 11L, 12L to include ground planes, an RF line (for example, a transmission line), a conductive path related to a logic, conductive paths related to power and a logic, and a land for mounting components.

According to an embodiment, the PCB 1410 may be manufactured in such a structure that the same number of conductive layers are disposed on both sides with reference to a center base C3, in order to prevent a damage caused by an environment such as temperature or pressure applied during a manufacturing process. For example, the one PCB 1410 in which the same number of conductive layers are laminated on both sides with reference to the center base C3 may be formed by a manufacturing method which repeats an operation of laminating two conductive layers making a pair on both sides, respectively. For example, the second laminate portion 1401a may include six (6) conductive layers 1L, 2L, 3L, 4L, 5L, 6L corresponding to the six conductive layers 7L, 8L, 9L, 10L, 11L, 12L included in the first laminate portion 1401b.

For example, flexible laminate portions 1402, 1403 which are based on an FCCL may be disposed on both sides with reference to the center base C3. In the next manufacturing operation, the third conductive layer 3L and the tenth conductive layer 10L making a pair therewith may be disposed on both sides. In the next manufacturing operation, the second conductive layer 2L and the eleventh conductive layer 11L making a pair therewith may be disposed on both sides. In the next manufacturing operation, the first conductive layer 1L and the twelfth conductive layer 12L making a pair therewith may be disposed on both sides. In the next manufacturing operation, the insulating layers SR1, SR2 may be disposed on both sides. The PCB 1410 may have substantially the same height on both sides with reference to the center base C3. Gaps between the plurality of conductive layers 1L, 2L, 3L, 4L, 5L, 6L disposed on one side with reference to the center base C3, and gaps between the plurality of conductive layers 7L, 8L, 9L, 10L, 11L, 12L disposed on the other side may be substantially uniform.

According to an embodiment, the flexible laminate portion 1403 included in the first laminate portion 1401b may include an area that is extended not to overlap the second laminate portion 1401a, and this area may include a plurality of antenna elements 1405.

According to an embodiment, the first conductive layer 1L and the twelfth conductive layer 12L may have a thickness of about 18 um, and the other conductive layers 2L, 3L, 4L, 5L, 6L, 7L, 8L, 9L, 10L, 11L may have a thickness of about 15 um, respectively. A gap between the sixth conductive layer 6L and the seventh conductive layer 7L may be about 300 um. The gaps between the plurality of conductive layers 1L, 2L, 3L, 4L, 5L, 6L disposed on one side with reference to the center base C3, and the gaps between the plurality of conductive layers 7L, 8L, 9L, 10L, 11L, 12L disposed on the other side with reference to the center base C3 may be about 50 um. The insulating layers SR1, SR2 may have a thickness of about 20 um.

Referring to FIGS. 13 and 14, the second laminate portion 1401a included in the PCB 1410 of FIG. 14 may be formed to have the same number of conductive layers as those of the first laminate portion 1401b in order to prevent a damage to the PCB during a manufacturing process. Alternatively, in the antenna module 1300 of FIG. 13, the second PCB 1320 may be manufactured separately from the first PCB 1310, and then, may be connected with the first PCB 1310. The antenna module 1300 of FIG. 13 can enhance the degree of design freedom of the second PCB 1320 including antenna elements, in comparison with the second laminate portion 1401a included in the one PCB 1410 of FIG. 14. The antenna module 1300 of FIG. 13 can enhance the degree of design freedom of the first PCB 1310 having a component such as a communication circuit (for example, the communication circuit 1140 of FIG. 11) mounted thereon, in comparison with the first laminate portion 1401b included in the one PCB 1410 of FIG. 14.

According to an embodiment, the antenna module 1300 of FIG. 13 can reduce the number of conductive layers in comparison with the antenna module 1400 of FIG. 14. For example, the number of conductive layers (for example, 11 conductive layers) included in the antenna module 1300 of FIG. 13 may be smaller than the number of conductive layers (for example, 12 conductive layers) included in the antenna module 1400 of FIG. 14, and accordingly, slimness of the antenna module can be enhanced.

According to an embodiment, the antenna module 1300 of FIG. 13 can enhance the degree of design freedom regarding antenna radiation characteristics in comparison with the antenna module 1400 of FIG. 14. For example, regarding the antenna radiation characteristics, the distance D131 (for example, about 358 um) between the antenna element of the first conductive layer 3L in the antenna module 1300 of FIG. 13 and the ground plane 1305 of the fifth conductive layer 5L may be smaller than a distance D141 (for example, about 365 um) between the antenna element of the fifth conductive layer 5L in the antenna module 1400 of FIG. 14 and the ground plane of the seventh conductive layer 7L. For example, regarding the antenna radiation characteristics, the distance D132 (for example, 688 um) between the dummy element of the first conductive layer 1L in the antenna module 1300 of FIG. 13 and the ground plane 1205 of the fifth conductive layer 5L may be larger than a distance D142 (for example, about 625 um) between the dummy element of the first conductive layer 1L in the antenna module 1400 of FIG. 14 and the ground plane of the seventh conductive layer 7L.

Figure 15:
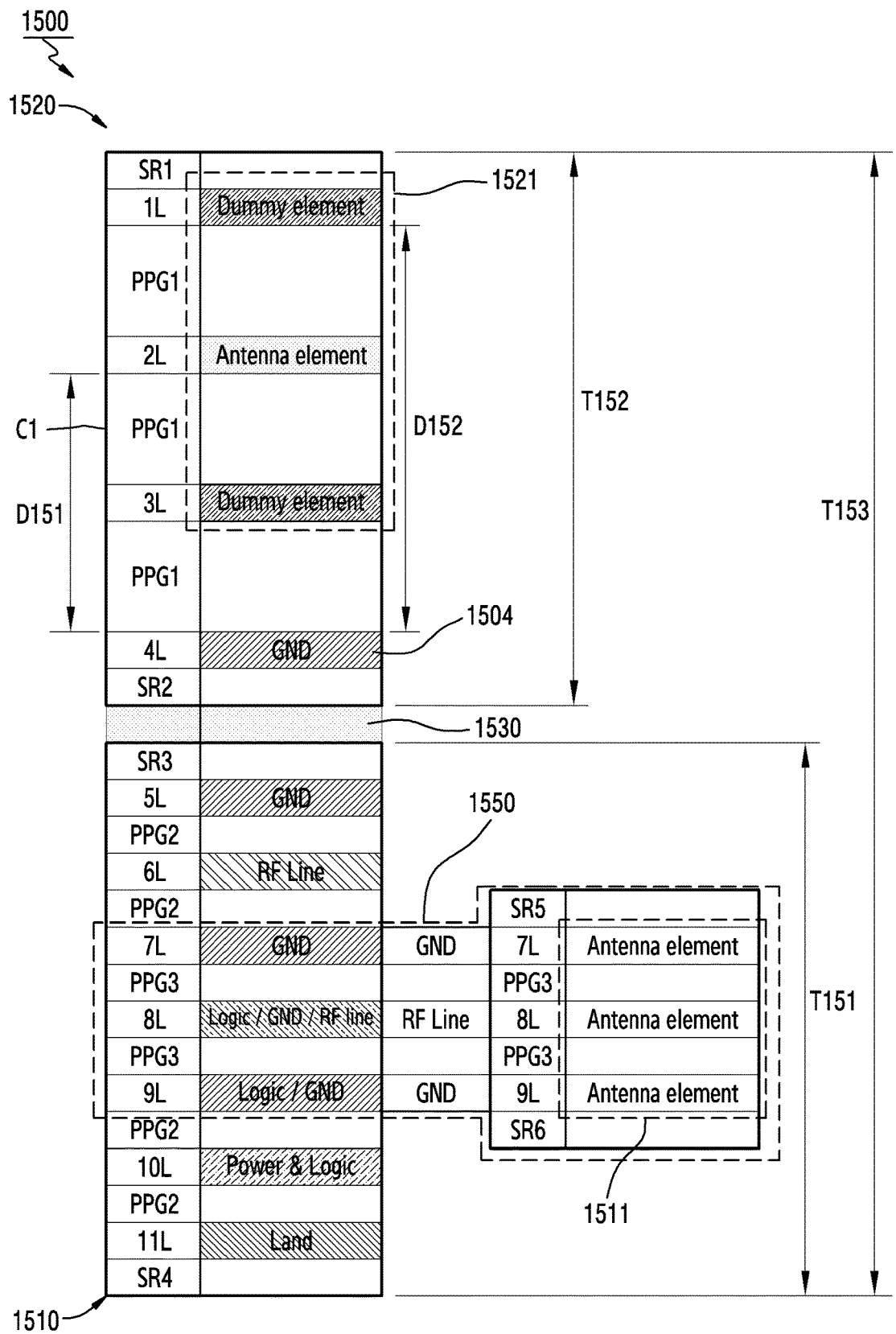
FIG. 15 is a view illustrating a layer structure of an antenna module according to various embodiments.

FIG. 15 is a view illustrating a layer structure of an antenna module according to various embodiments.

Referring to FIG. 15, in an embodiment, the antenna module 1500 (for example, the antenna module 1100 of FIG. 11, or the antenna module 1200 of FIG. 12A) may include a first PCB 1510, a second PCB 1520, and a conductive bonding member 1530 such as solder which electrically connects the first PCB 1510 and the second PCB 1520.

According to an embodiment, the second PCB 1520 may have a multilayered structure that includes a plurality of conductive layers 1L, 2L, 3L, 4L, a first insulating material PPG1 disposed between the plurality of conductive layers 1L, 2L, 3L, 4L, and insulating layers SR1, SR2. For example, the second PCB 1520 may have a structure in which the same number of conductive layers 1L, 2L, 3L, 4L are disposed on both sides with reference to a center base C1.

According to an embodiment, the first conductive layer 1L and/or the fourth conductive layer 4L may have a thickness of about 18 um. According to an embodiment, the second conductive layer 2L and/or the third conductive layer 3L may have a thickness of about 15 um. According to an embodiment, a gap between the plurality of conductive layers 1L, 2L, 3L, 4L may be about 200 um. According to an embodiment, the insulating layers SR1, SR2 may have a thickness of about 20 um.

According to an embodiment, the first PCB 1510 may have a multilayered structure that include a plurality of conductive layers 5L, 6L, 7L, 8L, 9L, 10L, 11L, insulating materials PPG2, PPG3 disposed between the plurality of conductive layers 5L, 6L, 7L, 8L, 9L, 10L, 11L, and insulating layers SR3, SR4, SR5, SR6, and may be substantially similar to or the same as the first PCB 1310 of FIG. 13.

According to an embodiment, the tenth conductive layer 10L and/or the eleventh conductive layer 11L may have a thickness of about 18 um. According to an embodiment, the fifth conductive layer 5L, the sixth conductive layer 6L, the seventh conductive layer 7L, the eighth conductive layer 8L and/or the ninth conductive layer 9L may have a thickness of about 15 um. According to an embodiment, a gap between the plurality of conductive layers 5L, 6L, 7L, 8L, 9L, 10L, 11L may be about 50 um. According to an embodiment, the insulating layers SR3, SR4 may have a thickness of about 20 um.

According to an embodiment, the conductive bonding member 1530 (for example, the conductive bonding member 1130 of FIG. 11) such as solder may make the first PCB 1510 and the second PCB 1520 be spaced apart from each other by about 150 um, and may electrically and/or mechanically connect the fourth conductive layer 4L of the second PCB 1520 and the fifth conductive layer 5L of the first PCB 1510.

According to an embodiment, the second PCB 1520 may have a thickness T152 of about 706 um. According to an embodiment, the first PCB 1510 may have a thickness T151 of about 451 um. According to an embodiment, the total thickness T153 of the antenna module 1500 may be about 1307 um.

According to an embodiment, the second PCB 1520 may include a plurality of antenna elements 1521 (for example, the second antenna array 1121 of FIG. 11) which are implemented by at least a portion of the plurality of conductive layers 1L, 2L, 3L. For example, the plurality of antenna elements may include a dummy element which is included in the first conductive layer 1L, a dummy element which is included in the third conductive layer 3L, and an antenna element which is included in the second conductive layer 2L and is electrically connected with a communication circuit (for example, the communication circuit 1140 of FIG. 11). According to an embodiment, the fourth conductive layer 4L may include a ground plane 1504.

According to an embodiment, the fifth conductive layer 5L of the first PCB 1510 may include a ground plane (for example, a GND). According to an embodiment, the sixth conductive layer 6L of the first PCB 1510 may include a transmission line (for example, an RF line). According to an embodiment, the seventh conductive layer 7L of the first PCB 1510 may include a ground plane. According to an embodiment, the eighth conductive layer 8L of the first PCB 1510 may include a conductive path related to a logic, a ground plane, and/or a transmission line regarding the antenna module 1500. According to an embodiment, the ninth conductive layer 9L of the first PCB 1510 may include a conductive path related to a logic regarding the antenna module 1500, and/or a ground plane. According to an embodiment, the tenth conductive layer 10L of the first PCB 1510 may include a conductive path related to power and a logic regarding the antenna module 1500. According to an embodiment, the eleventh conductive layer 11L of the first PCB 1510 may include a land that is utilized when a component such as a communication circuit (for example, the communication circuit 1240 of FIG. 12B), a connector (for example, the connector 1291 of FIG. 12B) is disposed on the first PCB 1510 by using a conductive bonding member such as solder.

According to an embodiment, the first PCB 1510 may include a flexible laminate portion 1550 (for example, the flexible laminate portion 1350 of FIG. 13) which includes a plurality of conductive layers 7L, 8L, 9L formed based on an FCCL. The flexible laminate portion 1550 may include a plurality of antenna elements 1511 (for example, the first antenna array 1111 of FIG. 11 or the plurality of antenna elements 1311 of FIG. 13) disposed on an area that does not overlap the second PCB 1520.

Radiation characteristics of the antenna module 1500 may be determined based on distances between the antenna elements 1521 included in the second PCB 1520 and the ground plane 1540 included in the second PCB 1520. According to an embodiment, the antenna element included in the second conductive layer 2L may be spaced apart from the ground plane 1504 included in the fourth conductive layer 4L by about 415 um (see D151). According to an embodiment, the dummy element included in the first conductive layer 1L may be spaced apart from the ground plane 1504 included in the fourth conductive layer 4L by about 630 um.

According to an embodiment, in the antenna module 1500 of FIG. 15, the second PCB 1520 may be manufactured separately from the first PCB 1510, and then, may be connected with the first PCB 1510. The antenna module 1500 of FIG. 15 can enhance the degree of design freedom of the second PCB 1420 including antenna elements, in comparison with the second laminate portion 1401a included in the one PCB 1400 of FIG. 14. The antenna module 1500 of FIG. 15 can enhance the degree of design freedom of the first PCB 1410 having a component such as a communication circuit (for example, the communication circuit 1140 of FIG. 11) mounted thereon, in comparison with the first laminate portion 1401b included in the one PCB 1400 of FIG. 14.

Figure 16:
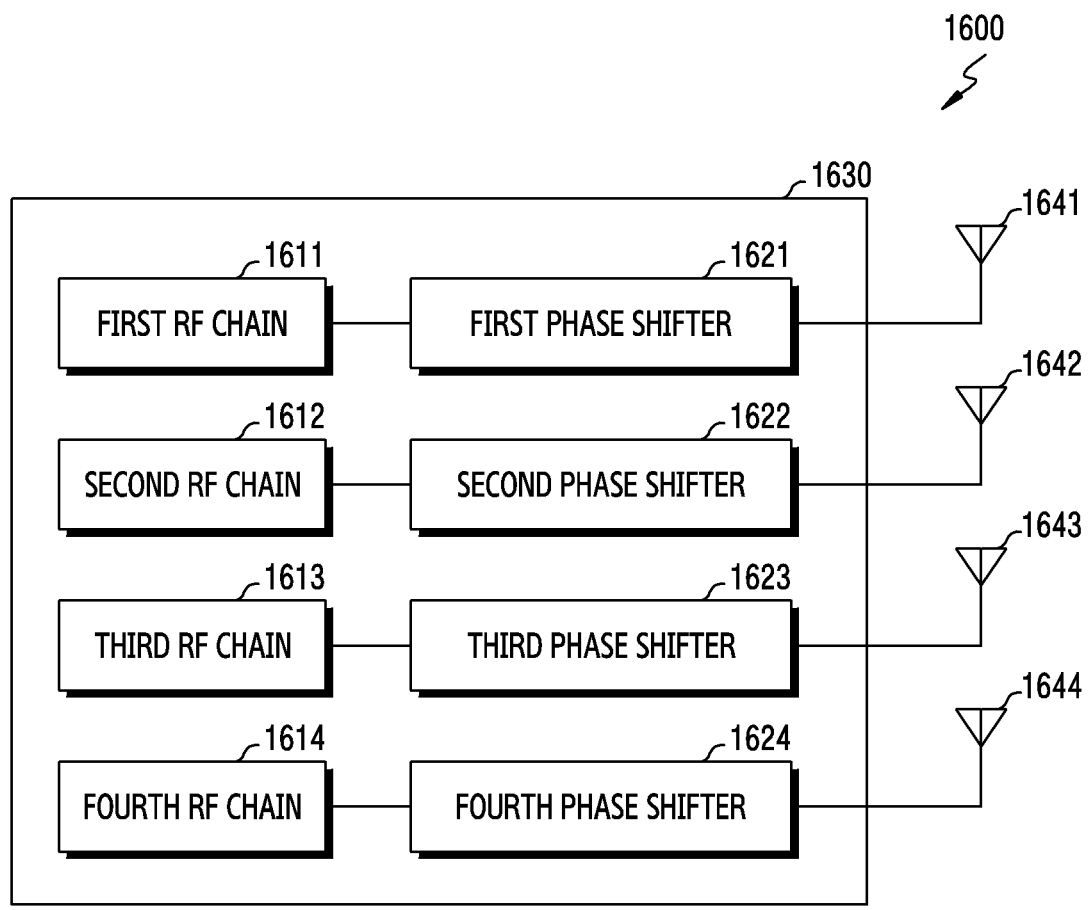
FIG. 16 is a block diagram of an antenna module according to an embodiment.

FIG. 16 is a block diagram of an antenna module according to an embodiment.

Referring to FIG. 16, in an embodiment, the antenna module 1600 may include at least one of a communication circuit 1630, a first antenna element 1641, a second antenna element 1641, a third antenna element 1643, or a fourth antenna element 1644. According to various embodiments, the antenna module 1600 may include the antenna module 300 of FIG. 3, the antenna module 400 of FIG. 4, the antenna module 500 of FIG. 5A or 5B, the antenna module 600 of FIG. 6, the antenna module 700 of FIG. 7, the antenna module 1000 of FIG. 10, the antenna module 1100 of FIG. 11, the antenna module 1200 of FIG. 12A or 12B, the antenna module 1300 of FIG. 13, or the antenna module 1500 of FIG. 15.

According to an embodiment, the first antenna element 1641, the second antenna element 1642, the third antenna element 1643, or the fourth antenna element 1644 may include at least a portion of a plurality of conductive layers included in a second PCB (for example, the second PCB 310 of FIG. 3, the second PCB 420 of FIG. 4, or the second PCB 1120 of FIG. 11).

According to an embodiment, the communication circuit 1630 (for example, the first wireless communication circuit 340 of FIG. 3, the first wireless communication circuit 440 of FIG. 4, or the communication circuit 1140 of FIG. 11) may be disposed on a first PCB (for example, the first PCB 310 of FIG. 3, or the first PCB 1110 of FIG. 11), which is manufactured separately from the second PCB.

According to an embodiment, the first antenna element 1641 may be electrically connected with the communication circuit 1630 through a first RF chain 1611 (for example, a first transmission line) in a single feed method. The second antenna element 1642 may be electrically connected with the communication circuit 1630 through a second RF chain 1612 (for example, a second transmission line) in a single feed method. The third antenna element 1643 may be electrically connected with the communication circuit 1630 through a third RF chain 1613 (for example, a third transmission line) in a single feed method. The fourth antenna element 1644 may be electrically connected with the communication circuit 1630 through a fourth RF chain 1614 (for example, a fourth transmission line) in a single feed method.

According to an embodiment, the antenna module 1600 may include a first phase shifter 1621 which is electrically connected with the first RF chain 1611 to determine a phase of the first antenna element 1641. The antenna module 1600 may include a second phase shifter 1622 which is electrically connected with the second RF chain 1612 to determine a phase of the second antenna element 1642. The antenna module 1600 may include a third phase shifter 1623 which is electrically connected with the third RF chain 1613 to determine a phase of the third antenna element 1643. The antenna module 1600 may include a fourth phase shifter 1624 which is electrically connected with the fourth RF chain 1614 to determine a phase of the fourth antenna element 1644.

For example, the first antenna element 1641 may be fed to have a designated phase by the first phase shifter 1621 through the first RF chain 1611. The second antenna element 1642 may be fed to have a designated phase by the second phase shifter 1622 through the second RF chain 1612. The third antenna element 1643 may be fed to have a designated phase by the third phase shifter 1623 through the third RF chain 1614. The fourth antenna element 1644 may be fed to have a designated phase by the fourth phase shifter 1624 through the fourth RF chain 1614. The phases for the antenna elements 1641, 1642, 1643, 1644 are determined so that set beamforming utilizing the antenna module 1600 can be implemented.

According to an embodiment, the first phase shifter 1621, the second phase shifter 1622, the third phase shifter 1623, or the fourth phase shifter 1624 may be integrally formed with the communication circuit 1630. According to a certain embodiment, at least one of the first phase shifter 1621, the second phase shifter 1622, the third phase shifter 1623, or the fourth phase shifter 1624 may be implemented by a separate element from the communication circuit 1630.

Figure 17:
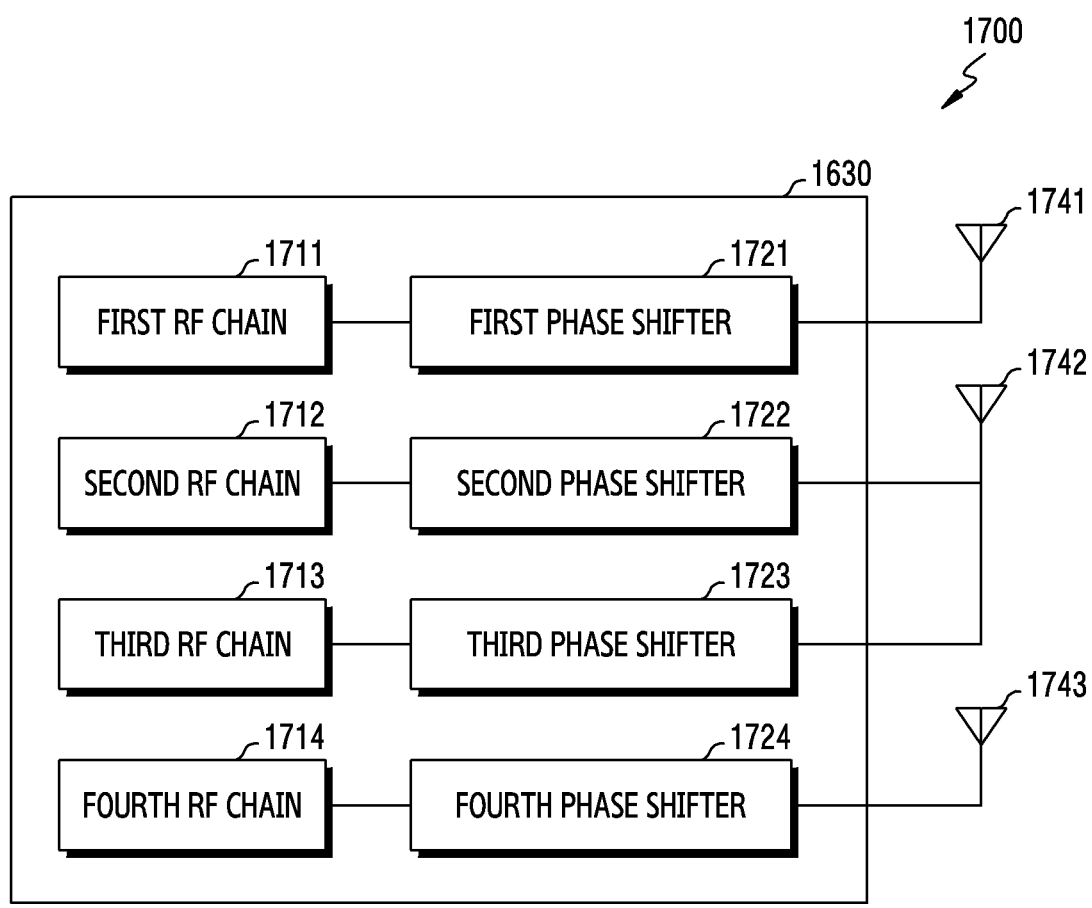
FIG. 17 is a block diagram of an antenna module according to an embodiment.

FIG. 17 is a block diagram of an antenna module according to an embodiment.

Referring to FIG. 17, in an embodiment, the antenna module 1700 may include at least one of a communication circuit 1730, a first antenna element 1741, a second antenna element 1741, or a third antenna element 1743.

According to various embodiments, the antenna module 1700 may include the antenna module 300 of FIG. 3, the antenna module 400 of FIG. 4, the antenna module 500 of FIG. 5A or 5B, the antenna module 600 of FIG. 6, the antenna module 700 of FIG. 7, the antenna module 1000 of FIG. 10, the antenna module 1100 of FIG. 11, the antenna module 1200 of FIG. 12A or 12B, the antenna module 1300 of FIG. 13, or the antenna module 1500 of FIG. 15.

According to an embodiment, the first antenna element 1741, the second antenna element 1742, or the third antenna element 1743 may include at least a portion of a plurality of conductive layers included in a second PCB (for example, the second PCB 310 of FIG. 3, the second PCB 420 of FIG. 4, or the second PCB 1120 of FIG. 11).

According to an embodiment, the communication circuit 1730 (for example, the first wireless communication circuit 340 of FIG. 3, the first wireless communication circuit 440 of FIG. 4, or the communication circuit 1150 of FIG. 11) may be disposed on a first PCB (for example, the first PCB 310 of FIG. 3, the first PCB 410 of FIG. 4, or the first PCB 1110 of FIG. 11) which is manufactured separately from the second PCB.

According to an embodiment, the first antenna element 1741 may be electrically connected with the communication circuit 1730 through a first RF chain 1711 in a single feed method. The second antenna element 1742 may be electrically connected with the communication circuit 1730 through a second RF chain 1712 and a third RF chain 1713 in a dual feed method. The third antenna element 1743 may be electrically connected with the communication circuit 1730 through a fourth RF chain 1714 in a single feed method.

According to an embodiment, the antenna module 1700 may include a first phase shifter 1721 which is electrically connected with the first RF chain 1711 to determine a phase of the first antenna element 1741. The antenna module 1700 may include a second phase shifter 1722 which is electrically connected with the second RF chain 1712 to determine a phase of the second antenna element 1742, and a third phase shifter 1723 which is electrically connected with the third RF chain 1713 to determine a phase of the second antenna element 1742. The antenna module 1700 may include a fourth phase shifter 1724 which is electrically connected with the fourth RF chain 1714 to determine a phase of the third antenna element 1743.

For example, the first antenna element 1741 may be fed to have a designated phase by the first phase shifter 1721 through the first RF chain 1711. The second antenna element 1742 may be fed to have a designated phase by the second phase shifter 1722 through the second RF chain 1712. The second antenna element 1742 may be fed to have a designated phase by the third phase shifter 1723 through the third RF chain 1713. The third antenna element 1743 may be fed to have a designated phase by the fourth phase shifter 1724 through the fourth RF chain 1714. The phases for the antenna elements 1741, 1742, 1643 are determined so that set beamforming utilizing the antenna module 1700 can be implemented.

According to an embodiment, the first phase shifter 1721, the second phase shifter 1722, the third phase shifter 1723, or the fourth phase shifter 1724 may be integrally formed with the communication circuit 1730. According to a certain embodiment, at least one of the first phase shifter 1721, the second phase shifter 1722, the third phase shifter 1723, or the fourth phase shifter 1724 may be implemented by a separate element from the communication circuit 1730.

Figure 18:
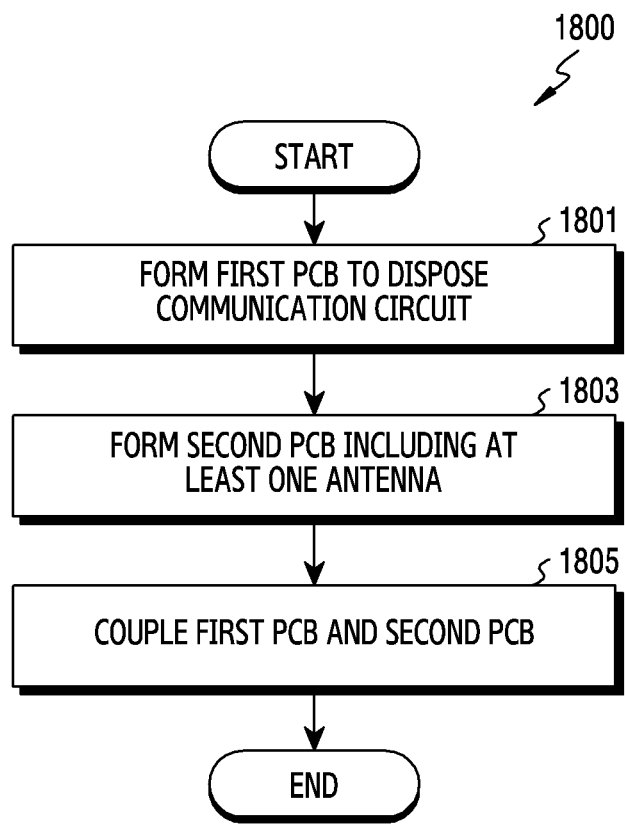
FIG. 18 is a view illustrating a manufacturing flow of an antenna module according to an embodiment.

FIG. 18 is a view illustrating a manufacturing flow 1800 of an antenna module according to an embodiment.

According to various embodiments, an antenna module formed according to the manufacturing flow 1800 of FIG. 18 may include the antenna module 300 of FIG. 3, the antenna module 400 of FIG. 4, the antenna module 500 of FIG. 5A or 5B, the antenna module 600 of FIG. 6, the antenna module 700 of FIG. 7, the antenna module 1000 of FIG. 10, the antenna module 1100 of FIG. 11, the antenna module 1200 of FIG. 12A or 12B, the antenna module 1300 of FIG. 13, or the antenna module 1500 of FIG. 15.

Referring to FIG. 18, in an embodiment, a first PCB for disposing a communication circuit may be formed in operation 1801. For example, a communication circuit (for example, the first wireless communication circuit 340 of FIG. 3, the first wireless communication circuit 440 of FIG. 4, or the communication circuit 1140 of FIG. 11) may be disposed on the first PCB (for example, the first PCB 310 of FIG. 3, the first PCB 410 of FIG. 4, or the first PCB 1110 of FIG. 11) which is manufactured separately from a second PCB. According to an embodiment, the communication circuit may include an RFIC.

According to an embodiment, in operation 1803, a second PCB including at least one antenna may be formed. For example, the second PCB may have at least a portion of a plurality of conductive layers implemented by an antenna, and for example, may include the second PCB 320 of FIG. 3, the second PCB 420 of FIG. 4, or the second PCB 1120 of FIG. 11.

According to an embodiment, in operation 1805, the first PCB (for example, the first PCB 310 of FIG. 3, the first PCB 410 of FIG. 4, or the first PCB 1110 of FIG. 11), and the second PCB (for example, the second PCB 320 of FIG. 3, the second PCB 420 of FIG. 4, or the second PCB 1120 of FIG. 11) may be connected through a conductive bonding member such as solder (for example, the conductive bonding member 330 of FIG. 3, the conductive bonding member 430 of FIG. 4, or the conductive bonding member 1130 of FIG. 11). The second PCB may include a third surface which faces in a first direction, and a fourth surface which faces in a second direction opposite to the first direction and is opposite the first PCB. The first PCB may include, for example, a second surface which faces in the second direction and a first surface which faces in the first direction and is opposite the fourth surface of the second PCB. The conductive bonding member such as solder may be disposed between the first surface of the first PCB and the fourth surface of the second PCB, and may electrically and/or mechanically connect the first PCB and the second PCB. The first surface of the first PCB and the fourth surface of the second PCB may be coupled to each other through the conductive bonding member to face each other.

According to an embodiment, an electronic device (for example, the electronic device of FIG. 3) may include: a first PCB (for example, the first PCB 310 of FIG. 3) which includes a first surface (for example, the third surface 310a of FIG. 3) facing in a first direction (for example, the first direction 3001 of FIG. 3), and a second surface (for example, the second surface 310b of FIG. 3) facing in a second direction (for example, the second direction 3002 of FIG. 3) which is opposite to the first direction; a second PCB (for example, the second PCB 320 of FIG. 3) which includes a third surface (for example, the third surface 320a of FIG. 3) facing in the first direction and a fourth surface (for example, the fourth surface 320b of FIG. 3) facing in the second direction, the second PCB including at least one antenna (for example, the at least one antenna element 321 of FIG. 3); a first wireless communication circuit (for example, the first wireless communication circuit 340 of FIG. 3) which is electrically connected with at least one connection terminal formed on the first PCB, and is configured to transmit and/or receive a signal of a first frequency band through the at least one first antenna; and a conductive bonding member (for example, the conductive bonding member 330 of FIG. 3) which is disposed between the first surface and the fourth surface, and is configured to electrically connect the at least one first antenna and the first wireless communication circuit.

According to an embodiment of the disclosure, the electronic device may further include: a third PCB (for example, the third PCB 370 of FIG. 3) which has a second wireless communication circuit (for example, the second wireless communication circuit 380 of FIG. 3) disposed thereon to transmit and/or receive a signal of a second frequency band through at least one second antenna (for example, the at least one antenna 383 of FIG. 3); and a flexible PCB (for example, the third conductive member 390 of FIG. 3) which is configured to electrically connect the second PCB and the third PCB.

According to an embodiment of the disclosure, the first frequency band may include a frequency band ranging from 6 GHz to 100 GHz, and the second frequency band may include a frequency band ranging from 700 MHz to 3 GHz.

According to an embodiment of the disclosure, the at least one first antenna (for example, the at least one antenna element 321 of FIG. 4) is formed on at least a portion of a plurality of conductive layers included in the second PCB (for example, the second PCB 320 of FIG. 3).

According to an embodiment of the disclosure, the first PCB (for example, the first PCB 310 of FIG. 3) may include a first designated number of conductive layers, and the second PCB (for example, the second PCB 320 of FIG. 3) may include a second designated number of conductive layers which are different from the first designated number.

According to an embodiment of the disclosure, a gap between a plurality of conductive layers included in the first PCB (for example, the first PCB 310 of FIG. 3) may be different from a gap between a plurality of conductive layers included in the second PCB (for example, the second PCB 320 of FIG. 3).

According to an embodiment of the disclosure, an insulating material (for example, the second insulating material PPG2 of FIG. 6) disposed between a plurality of conductive layers included in the first PCB may be different from an insulating material (for example, the first insulating material PPG1 of FIG. 6) disposed between a plurality of conductive layers included in the second PCB.

According to an embodiment of the disclosure, the first PCB (for example, the first PCB 610 of FIG. 6) or the second PCB (for example, the second PCB 620 of FIG. 6) may include the same number of conductive layers disposed on both sides with reference to an insulating center base (for example, the center base C1 or C2 of FIG. 6).

According to an embodiment of the disclosure, a thickness of the first PCB (for example, the first PCB 610 of FIG. 6) may be different from a thickness of the second PCB (for example, the second PCB 620 of FIG. 6).

According to an embodiment of the disclosure, the conductive bonding member (for example, the conductive bonding member 632 or 633 of FIG. 6) may electrically connect a ground plane included in the first PCB and a ground plane included in the second PCB.

According to an embodiment of the disclosure, the at least one first antenna (for example, the at least one antenna element 321 of FIG. 3) may include an antenna array (for example, the antenna array 570, 581 or 582 of FIG. 5A or 5B) having a plurality of antenna elements.

According to an embodiment of the disclosure, at least one of the plurality of antenna elements may include a patch antenna or a dipole antenna.

According to an embodiment of the disclosure, the first PCB (for example, the first PCB 1210 of FIG. 12A or 12B) may include a first portion that overlaps the second PCB (for example, the second PCB 1220 of FIG. 12A or 12B), and a flexible second portion (for example, the second area 1214 of FIG. 12A or 12B) that does not overlap the second PCB, and at least one third antenna (for example, the first antenna array 1211 of FIG. 12A) may be disposed on the second portion.

According to an embodiment of the disclosure, the at least one first antenna (for example, the second antenna array 1221 of FIG. 12A or 12B) may include a patch antenna, and the at least one third antenna (for example, the first antenna array 1211 of FIG. 12A) may include a dipole antenna.

According to an embodiment of the disclosure, the electronic device (for example, the electronic device 40 of FIG. 4) may further include a power management circuit (for example, the power management circuit 460 of FIG. 4) which is disposed on the second surface and is electrically connected with the second PCB and the third PCB.

According to an embodiment of the disclosure, an antenna module (for example, the antenna module 300 of FIG. 3) may include a communication circuit (for example, the first wireless communication circuit 340 of FIG. 3), a first PCB (for example, the first PCB 310) which is formed of a plurality of a first designated plurality of layers, has the communication circuit mounted on a designated layer of the first designated plurality of layers, and has at least one first connection terminal (for example, the first connection terminal 301 of FIG. 3) electrically connected with the communication circuit, and a second PCB (for example, the second PCB 320 of FIG. 3) which is formed of a second designated plurality of layers different from the first designated plurality of layer, and has at least one antenna element (for example, the at least one antenna element 321) formed on least one layer from among the second designated plurality of layers, and at least one second connection terminal (for example, the second connection terminal 302 of FIG. 3) electrically connected with the at least one antenna element. The second PCB may be opposite the first PCB, and the at least one second connection terminal may be electrically connected with the at least one first connection terminal through a conductive bonding member (for example, the conductive bonding member 330 of FIG. 3).

According to an embodiment of the disclosure, the communication circuit (for example, the first wireless communication circuit 340 of FIG. 3) may transmit or receive a signal in a frequency band of a range from 6 GHz to 100 GHz through the at least one antenna element.

According to an embodiment, a first insulating material (for example, the second insulating material PPG2 of FIG. 6) may be disposed between the first designated plurality of layers of the first PCB (for example, the first PCB 610 of FIG. 6), and a second insulating material (for example, the first insulating material PPG1 of FIG. 6) which is different from the first insulating material may be disposed between the second designated plurality of layers of the second PCB (for example, the second PCB 620 of FIG. 6).

According to an embodiment, a gap (for example, the second gap H21 of FIG. 6) between the plurality of conductive layers included in the first PCB may be different from a gap (for example, the first gap H11 of FIG. 6) between the plurality of conductive layers included in the second PCB.

According to an embodiment, a thickness of the first PCB (for example, the first PCB 610 of FIG. 6) may be different from a thickness of the second PCB (for example, the second PCB 620 of FIG. 6).

According to an embodiment, the first PCB (for example, the first PCB 1210 of FIG. 12A or 12B) may include a first portion that overlaps the second PCB (for example, the second PCB 1220 of FIG. 12A or 12B), a flexible second portion (for example, the second area 1214 of FIG. 12A or 12B) that does not overlap the second PCB, and at least one another antenna element (for example, the second antenna array 1211 of FIG. 12A) included in the second portion.

Figure 19:
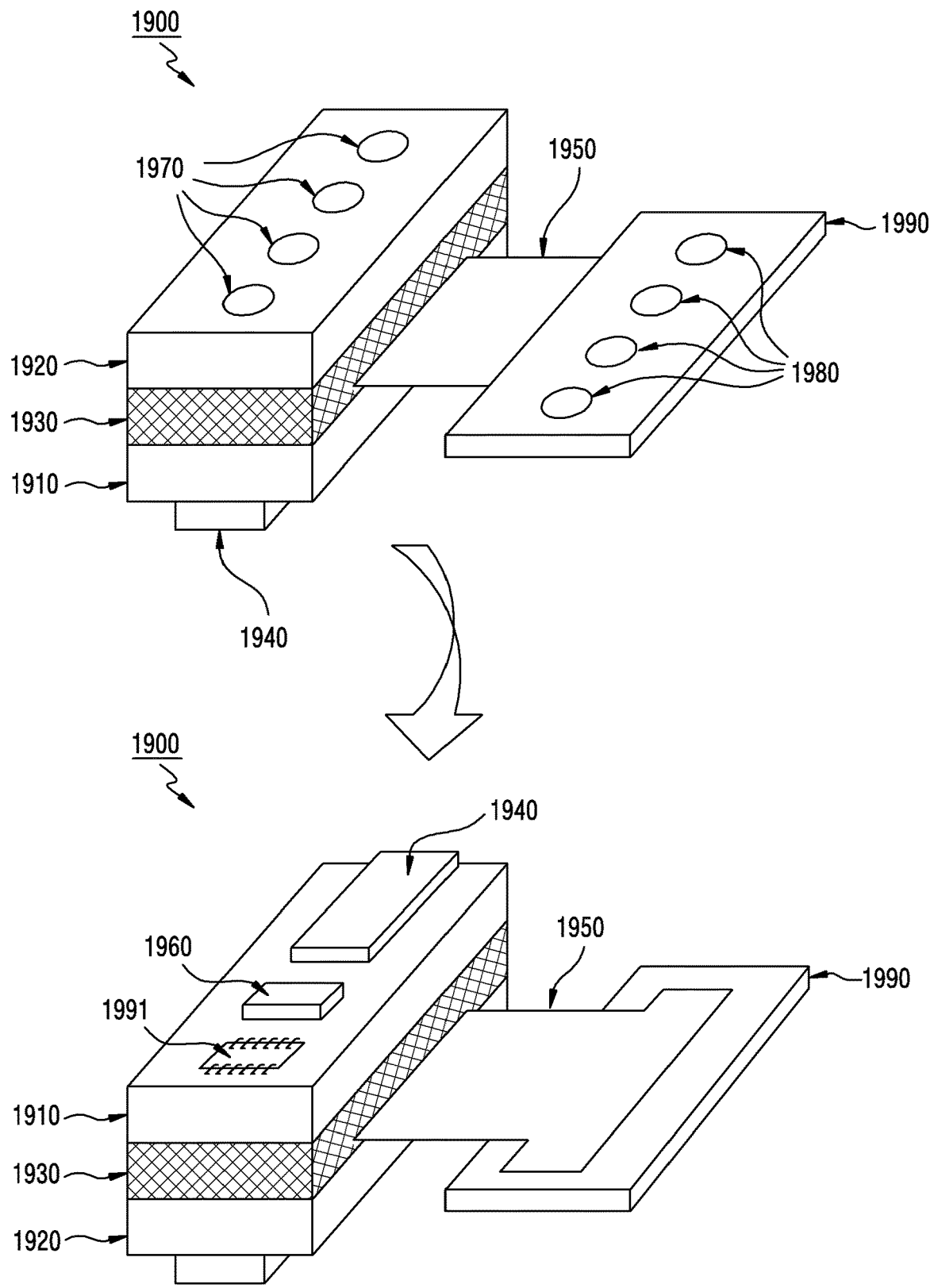
FIG. 19 is front and rear perspective views of an antenna module according to an embodiment.
Figure 20:
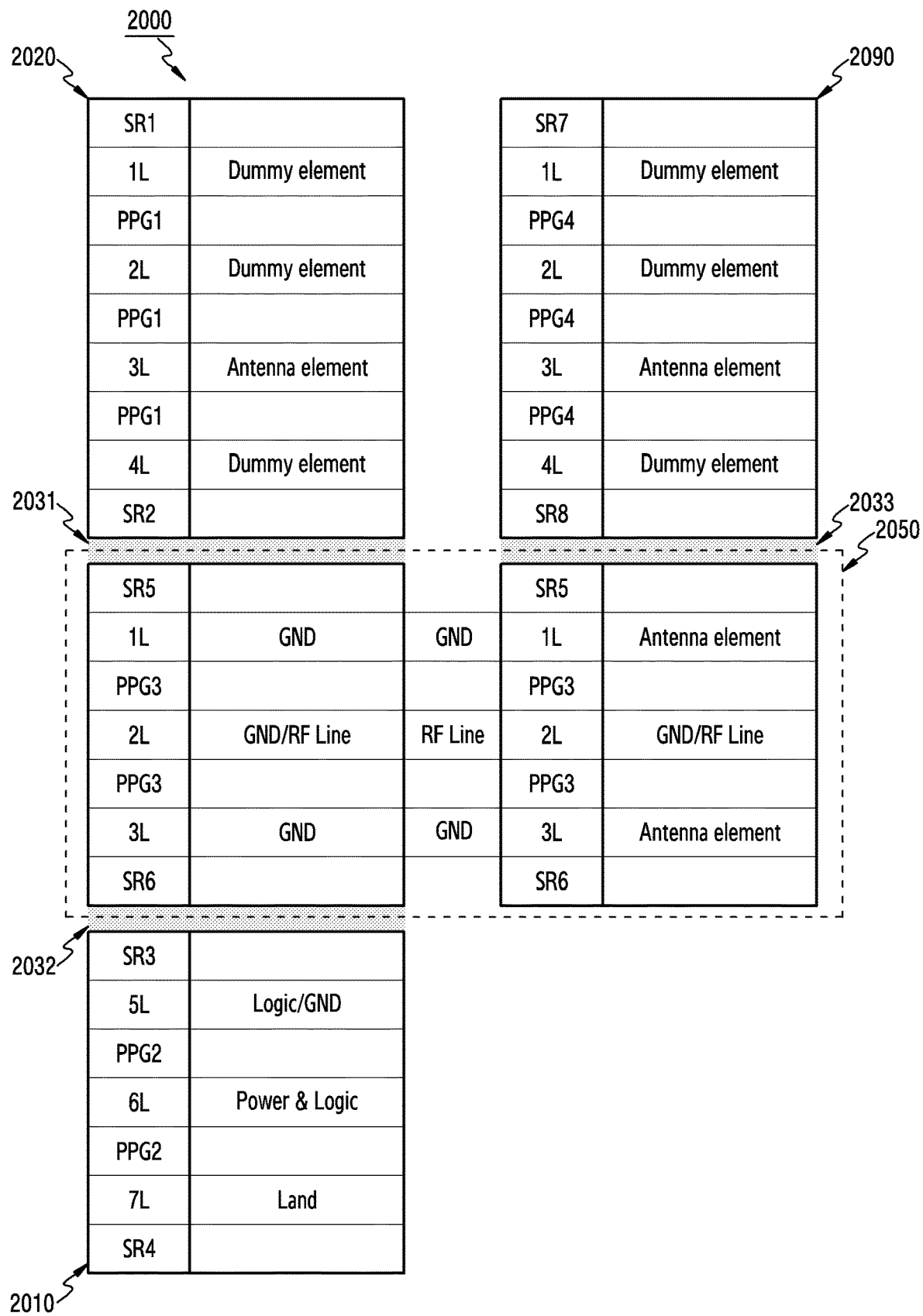
FIG. 20 is a view illustrating a layer structure of an antenna module according to an embodiment.
Figure 21:
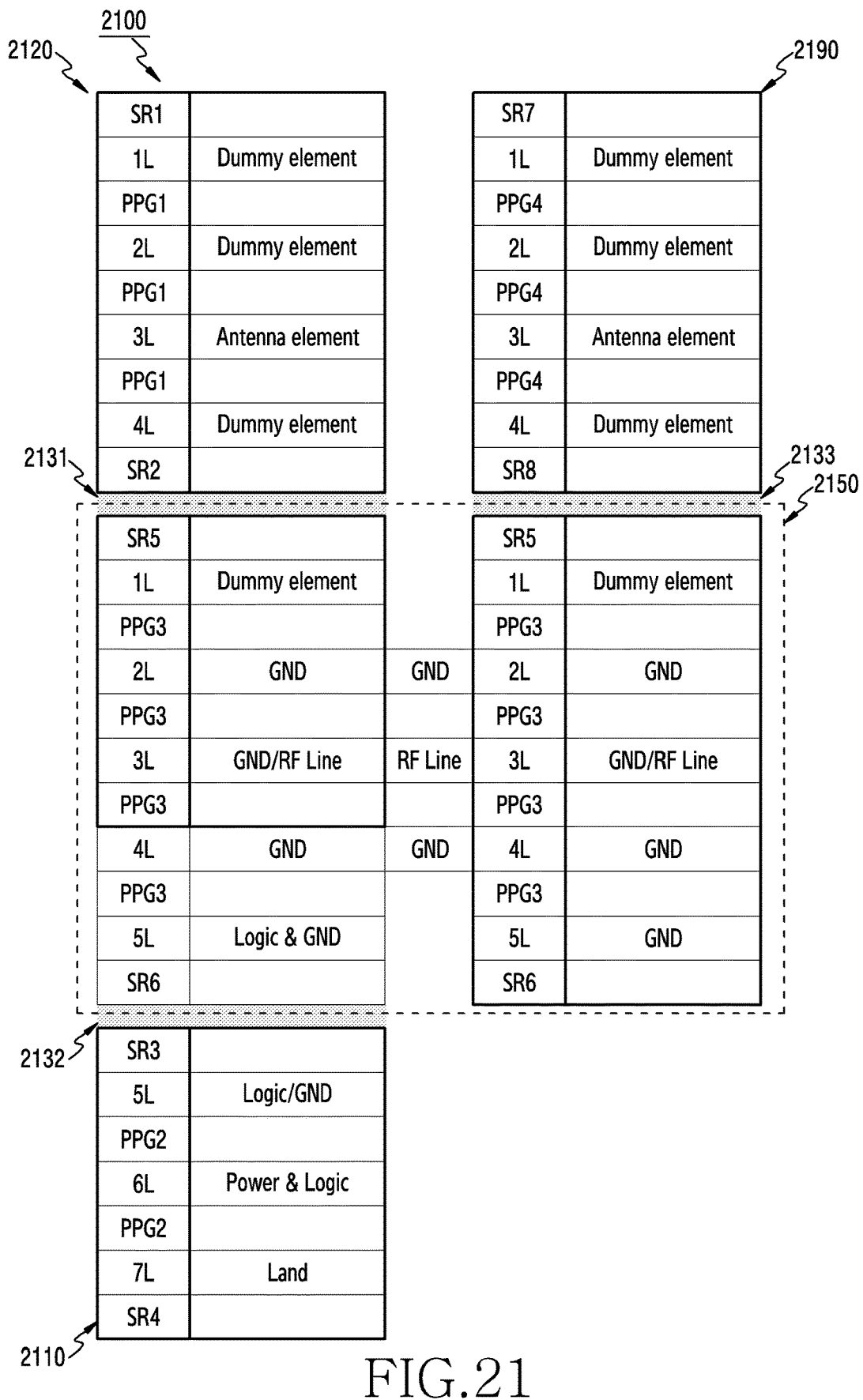
FIG. 21 is a view illustrating a layer structure of an antenna module according to another embodiment.

FIG. 19 is a front perspective view and a rear perspective view of an antenna module according to an embodiment, FIG. 20 is a view illustrating a layer structure of an antenna module according to an embodiment, and FIG. 21 is a view illustrating a layer structure of an antenna module according to another embodiment.

Referring to FIGS. 19 and 20, the antenna module 1900 or 2000 according to an embodiment may include at least one of a first PCB 1910 or 2010, a second PCB 1920 or 2020, a wireless communication circuit 1940, a flexible laminate portion 1950 or 2050, a power management circuit 1960, a fourth PCB 1990 or 2090, and a connector 1991.

According to an embodiment, the second PCB 1920 or 2020 may include a plurality of conductive layers 1L, 2L, 3L, and 4L, a plurality of first insulating materials PPG1 (for example, a prepreg) disposed between the plurality of conductive layers 1L, 2L, 3L, and 4L, and insulating layers SR1 and SR2 which are formed by applying an insulating material (for example, a solder mask insulating ink of an epoxy component) to conductive outer layers 1L and 4L. In an embodiment, the second PCB 1920 or 2020 may further include a conductive via to electrically connect a least a portion of the plurality of conductive layers 1L, 2L, 3L, and 4L. According to various embodiments, the conductive via may include a conductive hole formed to dispose a connection conductor supporting electric connection between the plurality of conductive layers 1L, 2L, 3L, and 4L.

In an embodiment, at least a portion of the plurality of conductive layers 1L, 2L, 3L, and 4L of the second PCB 1920 or 2020 may have the same or different thicknesses. For example, the first conductive layer 1L and the fourth conductive layer 4L may have a thickness of about 18 micrometers, and the second conductive layer 2L and the third conductive layer 3L may have a thickness of about 15 micrometers. In an embodiment, a gap between the plurality of conductive layers 1L, 2L, 3L, and 4L may be determined according to the first insulating material PPG1 having a thickness of about 150 micrometers. In an embodiment, the insulating layers SR1 and SR2 may have a thickness of about 20 micrometers.

According to an embodiment, the second PCB 1920 or 2020 may include a plurality of antenna elements 1970. For example, at least a portion of the first conductive layer 1L, the second conductive layer 2L, and the fourth conductive layer 4L included in the second PCB may include a dummy element, and the third conductive layer 3L may include an antenna element (for example, a patch antenna) electrically connected with the wireless communication circuit 1940. According to various embodiments, the dummy element included in at least a portion of the first conductive layer 1L, the second conductive layer 2L, and the fourth conductive layer 4L may be physically separated from other conductive element to be in an electrically floating state, and may be electromagnetically coupled with the antenna element included in the third conductive layer 3L to adjust signal radiation characteristics of the antenna element 1900 or 2000.

Similarly, the firs PCB 1900 or 2000 may include a plurality of conductive layers 5L, 6L, and 7L, a plurality of second insulating materials PPG2 (for example, a prepreg) disposed between the plurality of conductive layers 5L, 6L, and 7L, and insulating layers SR3 and SR4 which are formed by applying an insulating material (for example, a solder mask insulating ink of an epoxy component) to conductive outer layers 5L and 7L. According to an embodiment, the first PCB 1910 or 2010 may further include a conductive via to electrically connect at least a portion of the plurality of conductive layers 5L, 6L, and 7L, and the conductive via may include a conductive hole.

In an embodiment, the fifth conductive layer 5L and the seventh conductive layer 7L of the first PCB 1910 or 2010 may have a thickness of about 18 micrometers, and the sixth conductive layer 6L may have a thickness of about 15 micrometers. The plurality of second insulating materials PPG2 may have a thickness of about 30 micrometers, and a gap between the plurality of conductive layers 5L, 6L, and 7L may be determined based on the thickness of the second insulating material PPG2. In an embodiment, the insulating layers SR3 and SR4 may have a thickness of about 20 micrometers.

According to an embodiment, the fifth conductive layer 5L may include a conductive path related to a logic (for example, a logic regarding a network between the first wireless communication circuit 440 and the second wireless communication circuit 482 of FIG. 4) which is used for operating the antenna module 1900 or 2000, or may include a ground (GND) plane. The ground (GND) plane can block an electromagnetic noise on a flow of a signal or power in the first PCB 1910 or 2010. Alternatively, the ground (GND) plane may distribute heat generated in the antenna module 1900 or 2000 or transmitted to the antenna module 1900 or 2000 from the outside. In an embodiment, the sixth conductive layer 6L may include a conductive path related to power and a logic which are used for operating the antenna module 1900 or 2000. According to an embodiment, the seventh conductive layer 7L may include an area that is not applied by the insulating layer SR4, and this area may function as a land to couple or electrically connect a component such as the wireless communication circuit 1940, the power management circuit 1960, or the connector 1991 to the first PCB 1910 or 2010.

In an embodiment, the flexible laminate 1950 or 2050 may be disposed between the first PCB 1910 or 2010 and the second PCB 1920 or 2020, and may be coupled or electrically connected with the first PCB 1910 or 2010 and the second PCB 1920 or 2020 based on a conductive bonding member 1930, or 2031 and 2032. The conductive bonding member 1930, or 2031 and 2032 may be implemented by a plurality of solder balls, for example, and may mechanically and/or electrically connect the first PCB 1910 or 2010 and the second PCB 1920 or 2020 and the flexible laminate portion 1050 or 2050. According to various embodiments, a portion of the plurality of solder balls included in the conductive bonding member 1930 or, 2031 and 2032 may have a thickness of about 150 micrometers, and may mechanically and/or electrically connect the first PCB 1910 or 2010 and the second PCB 1920 or 2020, and the flexible laminate portion 1950 or 2050, and the other portion of the solder balls may have a thickness smaller than the thickness of about 150 micrometers, and may mechanically connect the first PCB 1910 or 2010 and the second PCB 1920 or 2020, and the flexible laminate portion 1950 or 2050.

In an embodiment, at least a portion of the flexible laminate portion 1950 or 2050 may be extended to the outside of the first PCB 1910 or 2010 and the second PCB 1920 or 2020 not to overlap the first PCB 1910 or 2010 and the second PCB 1920 or 2020. For example, the flexible laminate portion 1950 or 2050 may include a first area that overlaps the first PCB 1910 or 2010 and the second PCB 1920 or 2020, and a second area that is extended to the outside not to overlap.

According to an embodiment, the flexible laminate portion 1950 or 2050 may include a plurality of conductive layers 1L, 2L, and 3L, a plurality of third insulating materials PPG3 (for example, a prepreg) disposed between the plurality of conductive layers 1L, 2L, and 3L, and insulating layers SR5 and SR6 which are formed by applying an insulating material (for example, a solder mask insulating ink of an epoxy component) to conductive outer layers 1L and 3L. In an embodiment, the flexible laminate portion 1950 or 2050 may further include a conductive via to electrically connect at least a portion of the plurality of conductive layers 1L, 2L, and 3L. According to various embodiments, the conductive via may include a conductive hole formed to dispose a connection conductor supporting electric connection between the plurality of conductive layers 1L, 2L, and 3L.

In an embodiment, at least a portion of the plurality of conductive layers 1L, 2L, and 3L of the flexible laminate portion 1950 or 2050 may have the same or different thickness. For example, the first conductive layer 1L and the third conductive layer 3L may have a thickness of about 18 micrometers, and the second conductive layer 2L may have a thickness of about 15 micrometers. In an embodiment, the plurality of third insulating materials PPG3 disposed between the plurality of conductive layers 1L, 2L, and 3L may have a thickness of about 40 micrometers, and the insulating layers SR5 and SR6 may have a thickness of about 20 micrometers.

According to an embodiment, the plurality of conductive layers 1L, 2L, and 3L of the flexible laminate portion 1950 or 2050 may be implemented to function differently according to the first area that overlaps the first PCB 1910 or 2010 and the second PCB 1920 or 2020, and the second area that is extended to the outside not to overlap. For example, the first conductive layer 1L and the third conductive layer 3L may include a ground (GND) plane on the first area and one portion of the second area, and may include an antenna element (for example, a dipole antenna) on another portion of the second area. According to various embodiments, the one portion and another portion of the second area may be divided according to the presence or absence of the insulating layers SR5 and SR6. For example, the insulating layers SR5 and SR6 may be excluded from the one portion of the second area. According to an embodiment, the second conductive layer 2L may include a ground (GND) plane or a transmission line (RF line) (or a conductive wire) on the first area. The transmission line (RF line) may support transmission of a signal or data between the second PCB 1920 or 2020 or the antenna element included in the flexible laminate portion 1950 or 2050, and the wireless communication circuit 1940. In addition, the second conductive layer 2L may include a transmission line (RF line) on a portion of the second area, and may include a ground (GND) plane or a transmission line (RF line) on another portion of the second area.

According to an embodiment, another portion of the second area of the flexible laminate portion 1950 or 2050 may support disposal of the fourth PCB 1990 or 2090. For example, another portion of the second area of the flexible laminate portion 1950 or 2050 may be coupled or electrically connected with the fourth PCB 1990 or 2090 based on a conductive bonding member 2033.

According to an embodiment, the fourth PCB 1990 or 2090 may be designed the same as or similarly to the second PCB 1920 or 2020. For example, the fourth PCB 1990 or 2090 may include a plurality of conductive layers 1L, 2L, 3L, and 4L, a plurality of fourth insulating materials PPG4 (for example, a prepreg) disposed between the plurality of conductive layers 1L, 2L, 3L, and 4L, and insulating layers SR7 and SR8 which are formed by applying an insulating material (for example, a solder mask insulating ink of an epoxy component) to conductive outer layers 1L and 4L. In an embodiment, the fourth PCB 1990 or 2090 may include a conductive via to electrically connect at least a portion of the plurality of conductive layers 1L, 2L, 3L, and 4L, and the conductive via may include a conductive hole to dispose a connection conductor supporting the electric connection.

In an embodiment, the first conductive layer 1L, the second conductive layer 2L, the third conductive layer 3L, the fourth conductive layer 4L, the plurality of fourth insulating materials PPG5, and the plurality of insulating layers SR7 and SR8 of the fourth PCB 1990 or 2090 may have the same or similar thickness as those of the first conductive layer 1L, the second conductive layer 2L, the third conductive layer 3L, the fourth conductive layer 4L, the plurality of first insulating materials PPG1, the plurality of insulating layers SR1 and SR2 of the above-described second PCB 1920 or 2020, respectively. In addition, the fourth PCB 1990 or 2090 may include a plurality of antenna elements 1980, similarly to the second PCB 1920 or 2020. For example, at least a portion of the first conductive layer 1L, the second conductive layer 2L, and the fourth conductive layer 4L of the fourth PCB 1990 or 2090 may include a dummy element, and the third conductive layer 3L may include an antenna element (for example, a patch antenna) which is electrically connected with the wireless communication circuit 1940 based on the flexible laminate portion 1950 or 2050.

In an embodiment, the first wireless communication circuit 1940, the power management circuit 1960, and the connector 1991 may be disposed on or coupled to the first PCB 1910 or 2010, based on the same or similar conductive bonding member as or to the above-described conductive bonding member 1930 or 2031, 2032, and 2033, to be electrically connected with the first PCB 1910 or 2010. For example, the wireless communication circuit 1940, the power management circuit 1960, and the connector 1991 may be electrically connected with the first PCB 1910 or 2010 through a land which is included in the seventh conductive layer 7L of the first PCB 1910 or 2010.

Referring to FIGS. 19 and 21, the antenna module 1900 or 2100 according to another embodiment may include at least one of a first PCB 1910 or 2110, a second PCB 1920 or 2120, a wireless communication circuit 1940, a flexible laminate portion 1950 or 2150, a power management circuit 1960, a fourth PCB 1990 or 2190, and a connector 1991. The first PCB 1910 or 2110, the second PCB 1920 or 2120, the wireless communication circuit 1940, the power management circuit 1960, the fourth PCB 1990 or 2190, and the connector 1991 may correspond to those described above with reference to FIGS. 19 and 20. Hereinafter, the flexible laminate portion 1950 or 2150 different from that described above will be mainly described.

In an embodiment, the flexible laminate portion 1950 or 2150 may be disposed between the first PCB 1910 or 2110 and the second PCB 1920 or 2120 to couple or electrically connect the first PCB 1910 or 2110 and the second PCB 1920 or 2120, based on the conductive bonding member 1930 or 2131 and 2132. According to an embodiment, the flexible laminate portion 1950 or 2150 may include a first area that overlaps the first PCB 1910 or 2110 and the second PCB 1920 or 2150, and a second area that is extended to the outside not to overlap. The second area may be divided into one area and another area according to the presence or absence of the plurality of insulating layers SR5 and SR6, which will be described below. For example, the plurality of insulating layers SR5 and SR6 may be excluded from the one area of the second area.

In an embodiment, the flexible laminate portion 1950 or 2150 may include a plurality of conductive layers 1L, 2L, 3L, 4L, and 5L, a plurality of third insulating materials PPG3 (for example, a prepreg) disposed between the plurality of conductive layers 1L, 2L, 3L, 4L, and 5L, and insulating layers SR5 and SR6 which are formed by applying an insulating material (for example, a solder mask insulating ink of an epoxy component) to conductive outer layers 1L and 5L. In an embodiment, the flexible laminate portion 1950 or 2150 may include a conductive via based on a conductive hole, which electrically connects at least a portion of the plurality of conductive layers 1L, 2L, 3L, 4L, and 5L).

According to an embodiment, the first conductive layer 1L and the fifth conductive layer L5 of the flexible laminate portion 1950 or 2150 may have a thickness of about 18 micrometers, and the second conductive layer 2L, the third conductive layer 3L, and the fourth conductive layer 4L may have a thickness of about 15 micrometers. According to an embodiment, at least a portion of the plurality of third insulating materials PPG3 disposed between the plurality of conductive layers 1L, 2L, 3L, 4L, and 5L may have the same or different thickness. For example, the third insulating material PPG3 between the first conductive layer 1L and the second conductive layer 2L, and the third insulating material PPG3 disposed between the fourth conductive layer 4L and the fifth conductive layer 5L may have a thickness of about 35 micrometers, and the other third insulating materials PPG3 may have a thickness of about 40 micrometers. The plurality of insulating layers SR5 and SR6 may have a thickness of about 20 micrometers.

According to an embodiment, the first conductive layer 1L of the flexible laminate portion 1950 or 2150 may include a dummy element on the first area that overlaps the first PCB 1910 or 2110 and the second PCB 1920 or 2120, and another area of the second area that does not overlap. The second conductive layer 2L and the fourth conductive layer 4L may include a ground (GND) plane on the first area that overlaps the first PCB 1910 or 2110 and the second PCB 1920 or 2120, and on all of one area and another area of the second area that does not overlap. In an embodiment, the third conductive layer 3L may include a ground (GND) plane or a transmission line (RF line) (or a conductive wire) on the first area, and may include a transmission line (RF line) on one area of the second area, and may include a ground (GND) plane or a transmission line (RF line) on another area of the second area. The fifth conductive layer 5L may include a conductive path related to a logic (for example, a logic regarding a network between the first wireless communication circuit 440 and the second wireless communication module 482 of FIG. 4) which is used for operating the antenna module 1900 or 2100, or a ground (GND) plane on the first area, or may include a ground (GND) plane on another area of the second area.

In the embodiment described above through FIGS. 19, 20 and 21, the first PCB 1910, 2010, or 2110 and the second PCB 1920, 2020, or 2120 may be individually manufactured or designed, and then, may be electrically connected through the flexible laminate portion 1950, 2050, or 2150. In this case, the degree of freedom of manufacturing or designing of the second PCB 1920, 2020 or 2120 including the plurality of antenna elements 1970 can be enhanced. In addition, a mounting space of the fourth PCB 1990, 2090, or 2190 can be ensured based on the flexible laminate portion 1950, 2050, or 2150 at least a portion of which is extended to the outside not to overlap the first PCB 1910, 2010, or 2110 and the second PCB 1920, 2020, or 2120, and characteristics or performance of a signal which is transmitted and received by the antenna module 1900, 2000, or 2100 can be enhanced through the plurality of antenna elements 1980 included in the fourth PCB 1990, 2090 or 2190.

Embodiments of the disclosure suggested in the specification and the drawings are merely for easily describing technical matters according to embodiments of the disclosure and for assisting in understanding of the embodiments of the disclosure, and are not intended to limit the scope of the embodiments of the disclosure. Accordingly, the scope of various embodiments of the disclosure should be interpreted as including all changed or modified shapes derived based on the technical concept of various embodiments of the disclosure, in addition the embodiment disclosure herein.

What is claimed is:

1. A portable communication device comprising:
    a housing;
    a first printed circuit board (PCB) including:
        a first surface and a second surface opposite to each other; and
        at least one insulating layer located between the first surface and the second surface; and
    a second PCB electrically connected with and contacted with the first PCB via a plurality of solders, the second PCB including:
        a third surface and a fourth surface opposite to each other;
        three or more insulating layers located between the third surface and the fourth surface, the three or more insulating layers including a first insulating layer, a second insulating layer and a third insulating layer, wherein the second insulating layer is located between the first insulating layer and the third insulating layer;
        a first antenna array configured to radiate a first beam using a first millimeter wave frequency band, the first antenna array including a first antenna element located on the second insulating layer and a second antenna element located on the third insulating layer; and
        a second antenna array configured to radiate a second beam using a second millimeter wave frequency band,
    wherein the second insulating layer is located between the first antenna element and the second antenna element, and
    wherein the second insulating layer is thicker than each insulating layer of the at least one insulating layer of the first PCB.

2. The portable communication device of claim 1, wherein the second antenna element is electrically connected with a feed of the first antenna array.

3. The portable communication device of claim 1, wherein the first antenna element and the second antenna element are substantially aligned with each other such that, when viewed in a direction substantially perpendicular to the third surface, the first antenna element and the second antenna element are at least partially overlapped with each other.

4. The portable communication device of claim 1, wherein the first antenna array includes:
    a third antenna element located on the first insulating layer, and substantially aligned with the second antenna element when viewed in a direction substantially perpendicular to the third surface.

5. The portable communication device of claim 1, wherein the second PCB includes:

a first ground member and a second ground member located on the second insulating layer such that the first antenna element is located between the first ground member and the second ground member; and a third ground member and a fourth ground member located on the third insulating layer such that the second antenna element is located between the third ground member and the fourth ground member, and wherein the first ground member is electrically connected with the third ground member through a first conductive via formed in the second insulating layer, and the second ground member is electrically connected with the fourth ground member through a second conductive via formed in the second insulating layer.

6. The portable communication device of claim 5, wherein the at least one insulating layer included in the first PCB includes a fourth insulating layer, a fifth insulating layer and a sixth insulating layer, wherein the fifth insulating layer is located between the fourth insulating layer and the sixth insulating layer, and wherein the first PCB includes a fifth ground member located on the fourth insulating layer, the fifth ground member electrically connected with the third ground member of the second PCB via at least one of the plurality of solders.

7. The portable communication device of claim 1, wherein the second insulating layer located between the first antenna element and the second antenna element forms a core layer of the second PCB.

8. The portable communication device of claim 1, further comprising:

a radio frequency integrated circuit mounted on the second surface of the first PCB; and an application processor mounted on a third PCB disposed above and facing toward the first PCB.

9. The portable communication device of claim 1, wherein the at least one insulating layer included in the first PCB includes three or more insulating layers.

10. The portable communication device of claim 1, wherein the first antenna array is configured to radiate the first beam using the first millimeter wave frequency band between 24 Gigahertz (GHz) and 30 GHz, and the second antenna array is configured to radiate the second beam using the second millimeter wave frequency band between 37 GHz and 40 GHz.

11. The portable communication device of claim 1, wherein the at least one insulating layer included in the first PCB is composed of a first material, and the three or more insulating layers included in the second PCB is composed of a second material different from the first material.

12. The portable communication device of claim 1, wherein the first surface and the second surface of the first PCB face a rear surface and a front surface of the portable communication device, respectively.

13. The portable communication device of claim 12, wherein at least one of the first antenna array or the second antenna array is configured to radiate a corresponding one of the first beam and the second beam toward the rear surface.

14. The portable communication device of claim 1, wherein each of the first surface and the second surface of the first PCB faces a side surface of the portable communication device between a front surface and a rear surface thereof.

15. The portable communication device of claim 14, wherein at least one of the first antenna array or the second antenna array is configured to radiate a corresponding one of the first beam and the second beam toward the side surface.

16. The portable communication device of claim 1, further comprising:

a third PCB located between the first PCB and a front surface of the portable communication device, and electrically connected with the first PCB.

17. The portable communication device of claim 1, wherein the second antenna array of the second PCB includes one or more antenna elements that do not overlap with the first antenna element and the second antenna element of the first antenna array of the second PCB when viewed in a direction substantially perpendicular to the third surface.

* * * * *